(12) United States Patent
Kuroda et al.

(10) Patent No.: US 6,457,174 B1
(45) Date of Patent: Sep. 24, 2002

(54) PROGRAM LINKING APPARATUS FOR LINKING AND EXECUTING ONE PROGRAM AND ANOTHER PROGRAM USING A MICROPROCESSOR AND A PROGRAM LINKING METHOD THEREOF

(75) Inventors: Toyoharu Kuroda; Kiyoshi Owada, both of Hirakata; Yoshihiko Motohashi, Osaka, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/426,570

(22) Filed: Oct. 22, 1999

(30) Foreign Application Priority Data

Oct. 23, 1998 (JP) .......................... 10-302998

(51) Int. Cl.⁷ .............................. G06F 9/44
(52) U.S. Cl. ...................... 717/162; 711/221
(58) Field of Search ............. 717/10, 1, 9; 711/1, 711/2, 205, 206, 220, 221; 709/331, 332; 712/248, 203; 714/38

(56) References Cited

U.S. PATENT DOCUMENTS

| | | | | |
|---|---|---|---|---|
| 4,598,354 A | * | 7/1986 | Gum et al. .................... | 714/38 |
| 4,847,755 A | * | 7/1989 | Morrison et al. ............ | 712/203 |
| 5,297,291 A | | 3/1994 | Murphy ....................... | 709/331 |
| 5,369,766 A | | 11/1994 | Nakano et al. ............. | 709/332 |
| 5,375,241 A | | 12/1994 | Walsh ......................... | 709/331 |
| 5,555,418 A | | 9/1996 | Nilsson et al. .............. | 717/153 |
| 5,615,400 A | | 3/1997 | Cowsar et al. .............. | 709/332 |
| 5,625,808 A | * | 4/1997 | Webb et al. ................. | 712/248 |
| 5,659,751 A | | 8/1997 | Heninger .................... | 709/332 |
| 5,812,848 A | | 9/1998 | Cohen ......................... | 709/331 |
| 6,327,704 B1 | * | 12/2001 | Mattson, Jr. et al. ....... | 717/153 |

* cited by examiner

Primary Examiner—Gregory Morse
Assistant Examiner—Hoang-Vu Antony Nguyen-Ba
(74) Attorney, Agent, or Firm—Price & Gess

(57) ABSTRACT

A code export symbol offset table A 1128 stores sets of the identifier and the offset of the area of a code symbol. In an export symbol import step 1160, the identifier that matches the identifier of a symbol is retrieved from the code export symbol offset table A 1128, the offset corresponding to the retrieved identifier is extracted, and a predetermined calculation is performed to create an absolute address.

21 Claims, 53 Drawing Sheets

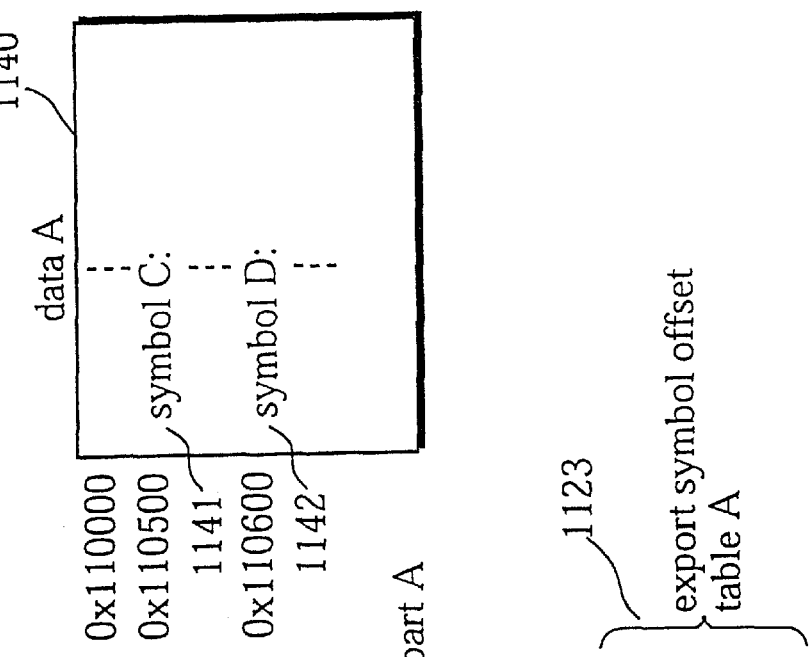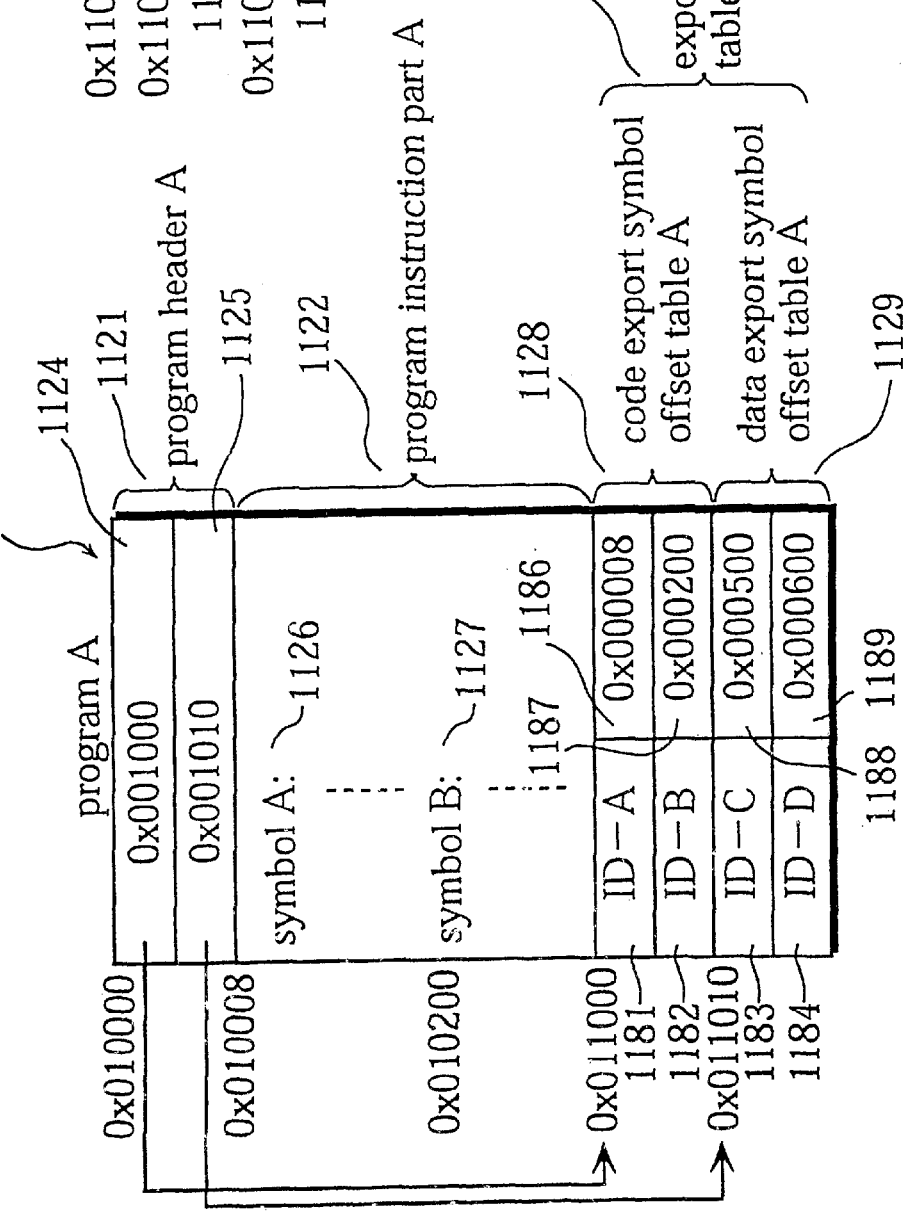

Fig. 4 program block identified by symbol A symbol A:

1301 — import = 0x100000;

1302 — ptrf = (*import)(ID—F);
1303 — (*ptrf)();  /*call import subroutine*/

1304 — ptrg = (*import)(ID—G);
1305 — *ptrg = XXXXX;  /*substitute into import variable*/

1306 — ptrh = (*import)(ID—H);
1307 — *ptrh = YYYYY;  /*substitute into import variable*/

1308 — return();

1309

Fig. 6 program block identified by symbol E symbol E:

1401 —— import = 0x100000;

1402 —— ptrb = (*import)(ID—B);
1403 —— (*ptrb)();    /*call import subroutine*/

1404 —— ptrc = (*import)(ID—C);
1405 —— *ptrc = ZZZZZ;    /*substitute into import variable*/

1406 —— ptrd = (*import)(ID—D);
1407 —— *ptrd = OOOOO;    /*substitute into import variable*/

1408 —— return();

| export symbol reference table | |
|---|---|
| ID – A | 0x010008 |
| ID – B | 0x010200 |
| ID – C | 0x110500 |
| ID – D | 0x110600 |
| ID – E | 0x020008 |
| ID – F | 0x020400 |
| ID – G | 0x120700 |
| ID – H | 0x120800 |
| | |
| | |
| ⋮ | ⋮ |

2141
2140
0x101000
2142

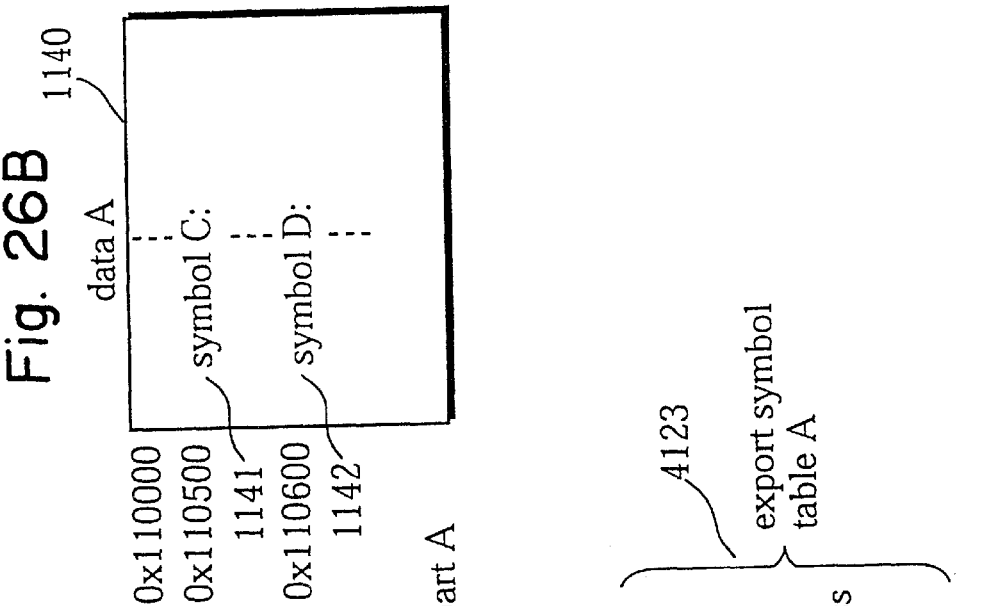
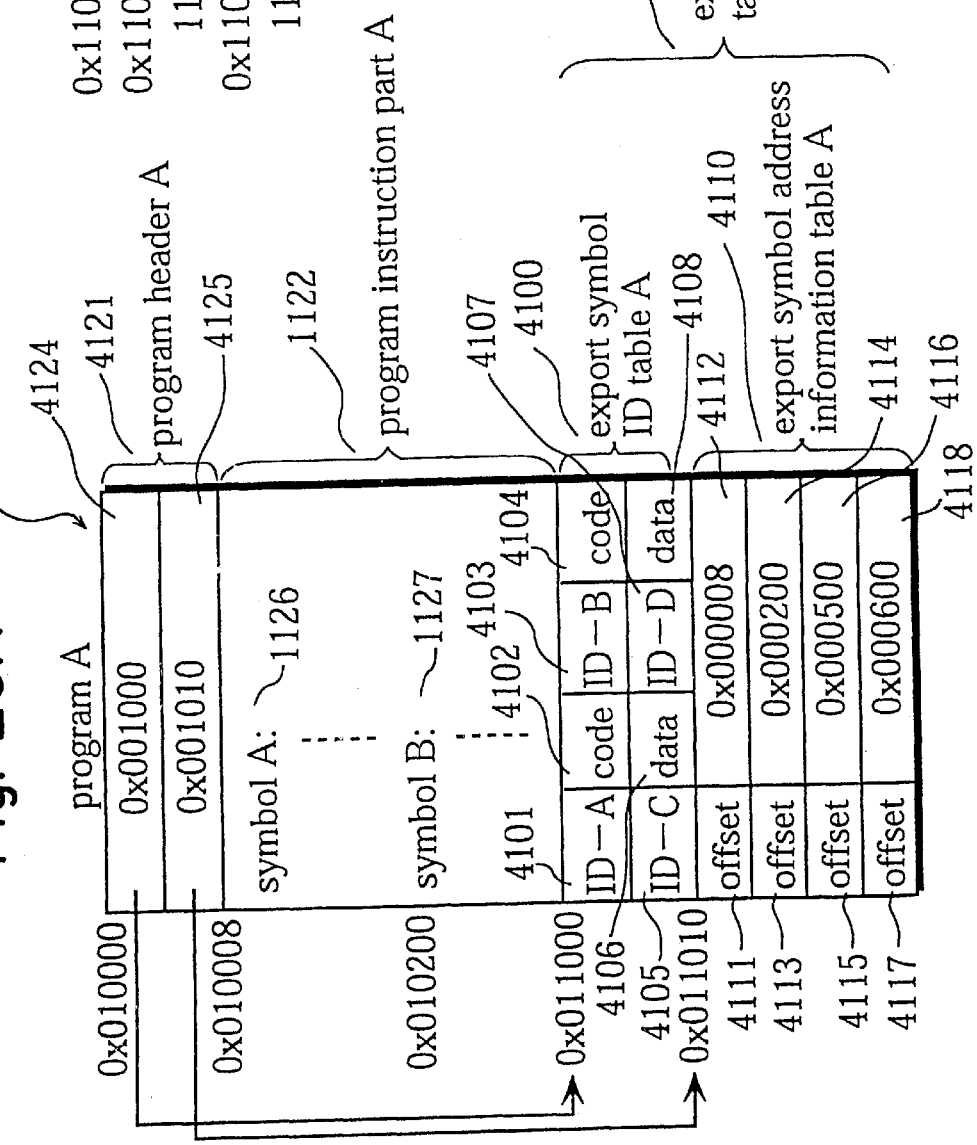

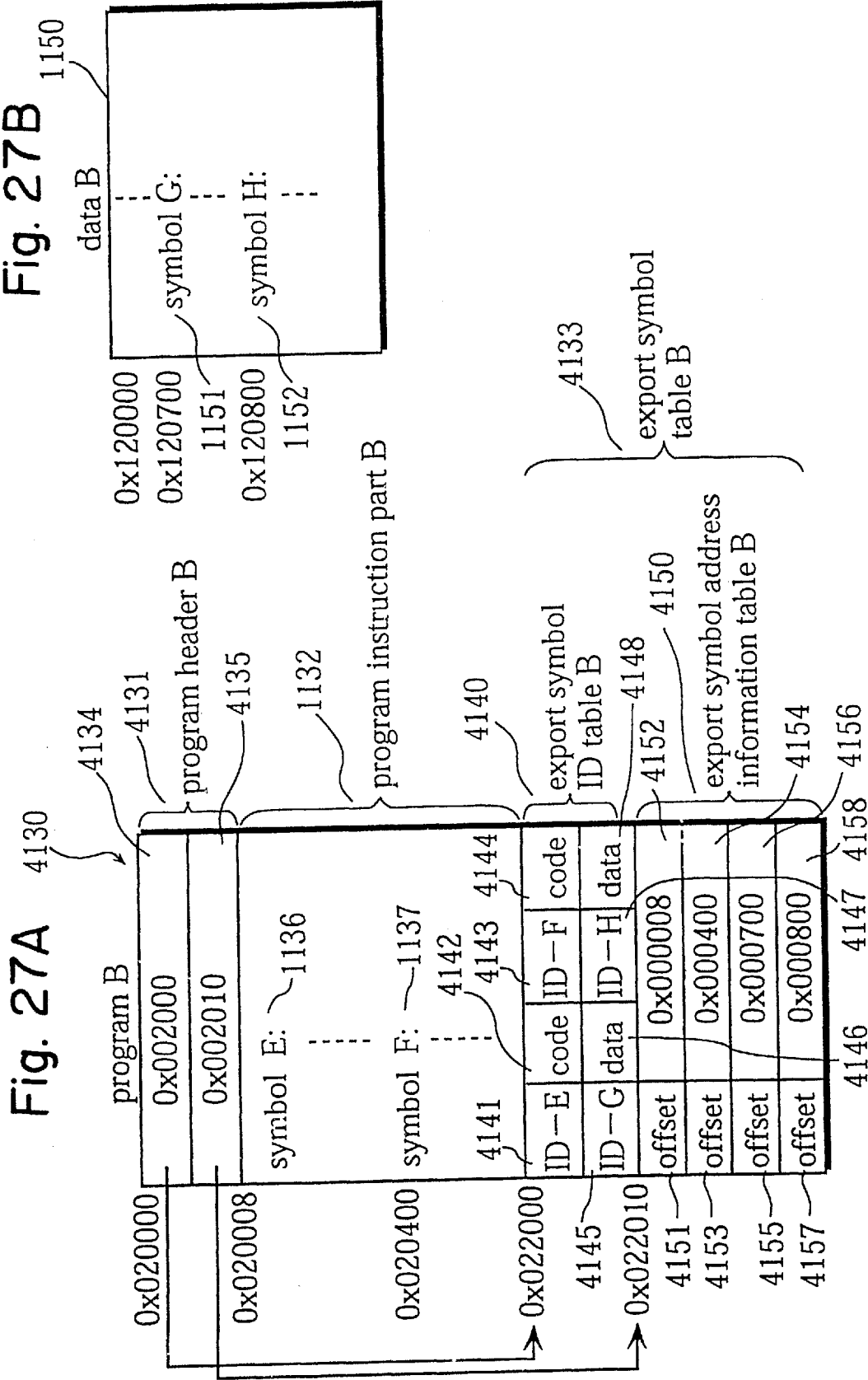

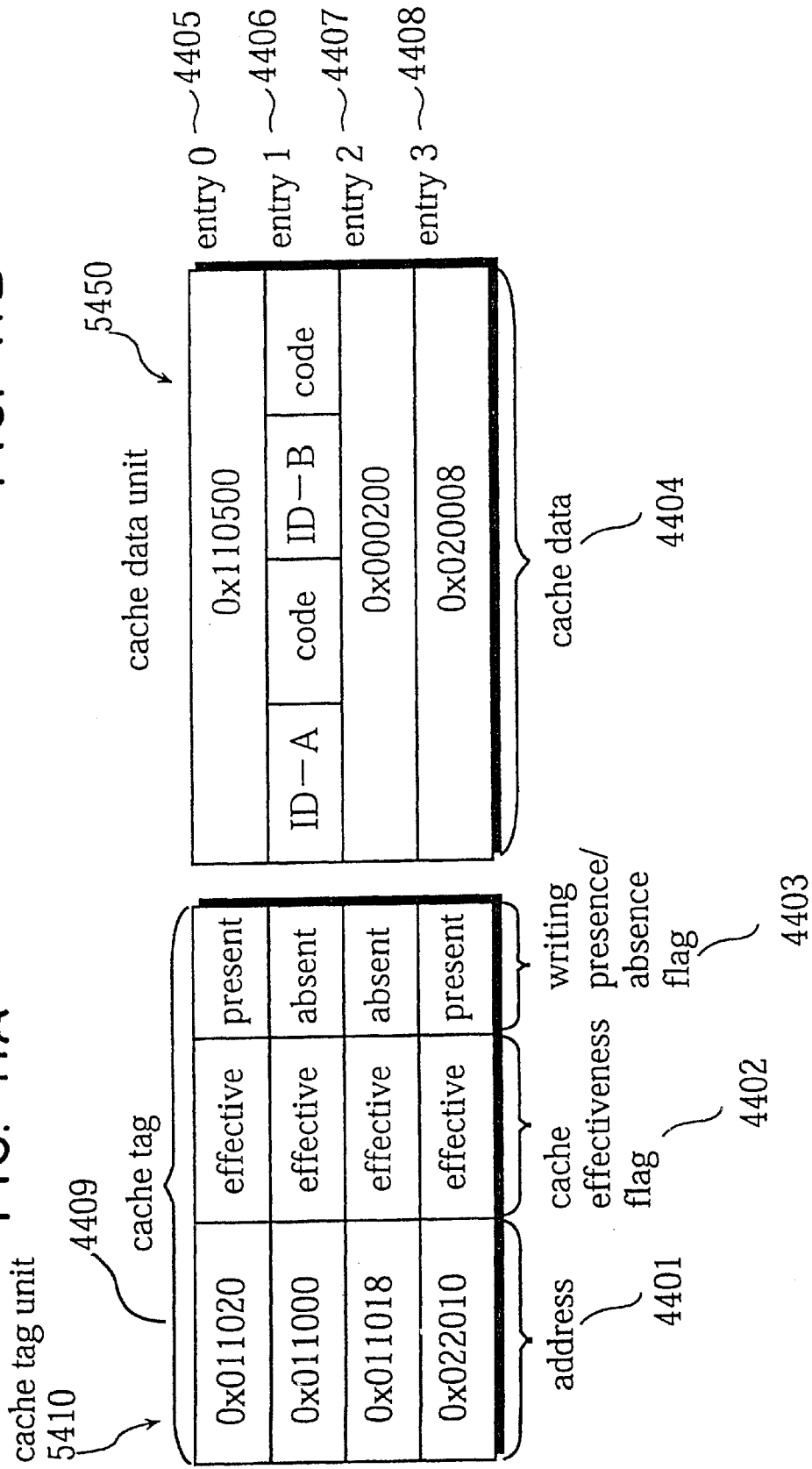

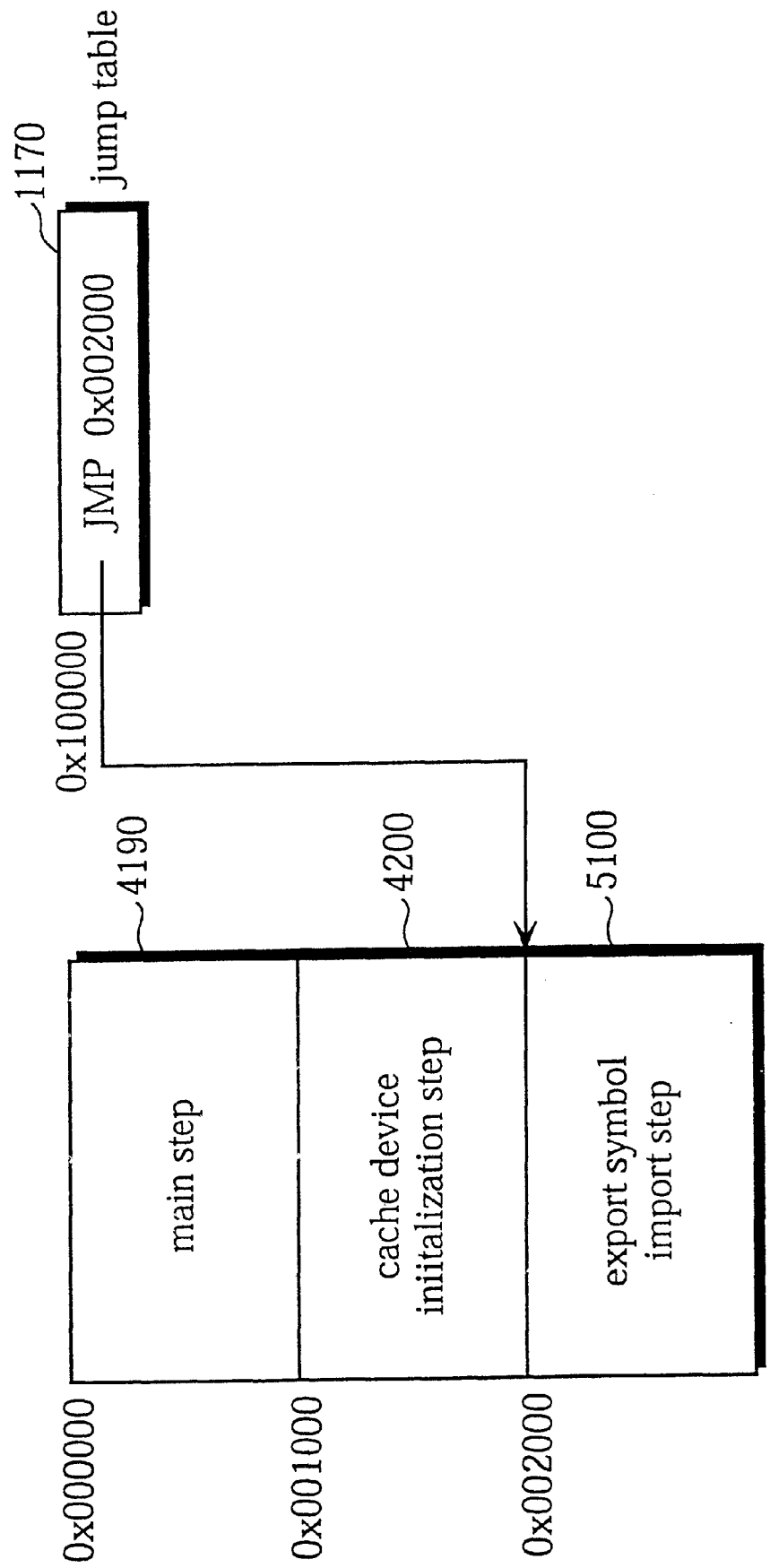

Fig. 52

501 — symbol A:

502 — ptrf = (int(*)())(*(int *)0x020004);
503 — ptrg= (*(int *)(*(int *)0x020008);
504 — ptrh= (int *)(*(int *)0x02000c);

505 — (*ptrf)();   /*call import subroutine*/  ～509
506 — *ptrg = XXXX;   /*substitute into import variable*/  ～510
507 — *ptrh = YYYY;   /*substitute into import variable*/  ～512
508 — return();

Fig. 53

601 —— symbol E:

602 —— ptrb = (int(*)())(*(int*)0x010004);
603 —— ptrc = (int*)(*(int*)0x010008);
604 —— ptrd = (int*)(*(int*)0x02000c);

605 —— (*ptrb)();  /*call import subroutine*/ ～609
606 —— *ptrc = ZZZZZ;  /*substitute into import variable*/ ～610
607 —— *ptrd = OOOOO;  /*substitute into import variable*/ ～611
608 —— return();

PROGRAM LINKING APPARATUS FOR LINKING AND EXECUTING ONE PROGRAM AND ANOTHER PROGRAM USING A MICROPROCESSOR AND A PROGRAM LINKING METHOD THEREOF

This application is based on an application No. 10-302998 filed in Japan, the content of which is hereby incorporated by reference.

BACKGROUND OF THE INVENTION

(1) Field of the Invention

The present invention relates to a program linking apparatus and a program linking method for linking a plurality of programs that are stored in a plurality of read only semiconductor memories and for referring to subroutines and data.

(2) Description of the Related Art

It has been necessary for embedded microcomputer control systems that store program instructions in read only semiconductor memories (referred to "ROMs" in this specification) to add and partially replace software after sale due to the complication of the systems.

In this case, the size of the program to be added or replaced, or the size of the data to be used by the program changes, so that the addresses of subroutines in the program and the data that are to be used by the program also change. As a result, when subroutines and export symbols of the program to be added or replaced and remaining programs are referred to each other, the export symbols need to be linked.

Conventionally, programs recorded in ROMs are linked by indicating the locations of the export symbols in a reference table that has been fixedly allocated in a ROM or a RAM using absolute addresses.

The structure of a conventional apparatus that links programs recorded in ROMs is shown in FIG. 48. The apparatus in FIG. 48 includes a ROM-A 101, a ROM-B 102, a RAM 103, a CPU bus 104, and a CPU 105. The ROM-A 101, the ROM-B 102, the RAM 103, and the CPU 105 are connected with each other by the CPU bus 104.

The ROM-A 101 stores a main step 110 and a program A 120. The ROM-B 102 stores a program B 130. The RAM 103 stores data A 140 and data B 150. The CPU 105 executes the programs stored in the ROM-A 101 and the ROM-B 102.

The memory map and the contents of the program A 120 and the data A 140 that is used by the program A 120 are shown in FIG. 49. As shown in FIG. 49, the program A 120 includes a symbol table A 121 and a program instruction part A 122. The symbol table A 121 stores absolute addresses 123, 124, 125, and 126. The absolute addresses 123 and 124 indicate the locations of code export symbols, symbols A 127 and B 128, respectively. The absolute addresses 125 and 126 indicate the locations of data export symbols, symbols C 141 and 0 142, respectively. The absolute addresses that indicate the locations of the absolute addressed 123, 124, 125, and 126 are "0X01000", "0X010004", "0X010008", and "0X01000C", respectively. The program instruction part A 122 stores a program block that is identified by the symbol A 127 and another program block that is identified by the symbol B 128. The absolute addresses that indicate the locations of the symbols A 127 and B 128 are "0X010010" and "0X010200", respectively. The data A 140 stores a data block that is identified by the symbol C 141 and another data block that is identified by the symbol D 142. The absolute address that indicates the location of the leading data of the data A 140 is "0X11000". The absolute addresses of the locations of the symbols C 141 and D 142 are "0X110500" and "0X110600", respectively. In this specification, the character string "0X" indicates that the following character string is a hexadecimal numeral.

The memory map and the contents of the program B 130 and the data B 150 that is used by the program B 130 are shown in FIG. 50. As shown in FIG. 50, the program B 130 includes a symbol table B 131 and a program instruction part B 132. The symbol table B 131 stores absolute addresses 133, 134, 135, and 136. The program instruction part B 132 stores program blocks that are identified by symbols E 137 and F 138. The data B 150 stores data blocks that are identified by symbols G 151 and H 152. Note that the structure of the program B 130 is the same as the program A 120 and the structure of the data B 150 is the same as the data A 140. More detailed explanation of the program B 130 and the data B 150 will not be given here.

An explanation of operations by the program stored in the main step 110 will be given with reference to the flowchart in FIG. 51. The principle objective of the main step 110 is to control the program block that is identified by the symbol A 127 and the program block that is identified by the symbol E 137 so that the program blocks are executed in this order.

In the main step 110, the content of the address "0X010000", where the absolute address of the symbol A 127 is stored, is extracted and the extracted content is substituted into a variable "ptra" (step s401) The content of the address "0X020000", where the absolute address of the symbol E 137 is stored, is extracted and the extracted content is substituted into a variable "ptre" (step s402). Then, the address that the variable "ptra" indicates is called (step s403), and the address that the variable "ptre" indicates is called (step s404).

FIG. 52 shows a program that is stored in the program block indicated by the symbol A 127 in the C language. The principle objective of this program is to execute the program block that is identified by the symbol F 138, to substitute a variable "XXXXX" into the data block that is identified by the symbol G 151, and to substitute a variable "YYYYY" into the data block that is identified by the symbol H 152.

In FIG. 52, the symbol A is defined in a line 501, the content of the address "0X020004", where the absolute address of the symbol F is stored, is substituted into a variable "ptrf" in a line 502, the content of the address "0X020008", where the absolute address of the symbol G is stored, is substituted into a variable "ptrg" in a line 503, the content of the address "0X02000C", where the absolute address of the symbol H is stored, is substituted into a variable "ptrh" in a line 504, the address that the variable "ptrf" indicates is called in a line 505, the variable "XXXXX" is substituted into the address that the variable "ptrg" indicates in a line 506, the variable "YYYYY" is substituted into the address that the variable "ptrh" indicates in a line 507, and a return is performed in a line 508.

FIG. 53 shows a program that is stored in the program block indicated by the symbol E 137 in the C language. The principle objective of this program is to execute the program block that is identified by the symbol B 128, to substitute a variable "ZZZZZ" into the data block that is identified by the symbol C 141, and to substitute a variable "OOOOO" into the data block that is identified by the symbol D 142. The structure of the program in FIG. 53 is the same as the program in FIG. 52. More detailed explanation will not be given here.

As has been described, the export symbols in programs can be linked to each other by indicating the locations of the export symbols using the absolute addresses in a reference table that has been fixedly allocated in a ROM or a RAM.

According to the aforementioned conventional linking method of programs in a ROM, the export symbols can be statically linked to each other. On the other hand, the locations of the export symbols for mutual reference among programs are indicated using absolute addresses in a reference table that is allocated in a ROM or a RAM, and the absolute addresses of the symbols of a program on the export end are embedded in a program on the import end. As a result, the arrangement of the program on the export end needs to be fixed in the memory space. Meanwhile, the addresses corresponding to symbols are stored using absolute addresses in the reference table, so that the arrangement of the program on the import end needs to be fixed in the memory space. Under the circumstances, a program that is recorded in a ROM is dependent on the memory map of one embedded microcomputer control system, and a program that has been recorded in a ROM in one system cannot be shared by another system having a different memory map.

SUMMARY OF THE INVENTION

It is accordingly the object of the present invention to provide a program linking apparatus, a program linking method, and a storage medium that stores a program linking program that enable the content of a program recorded in a ROM to be independent of the memory map of an embedded microcomputer control system and to be shared by another system having a different memory map.

The above-mentioned object may be achieved by a program linking apparatus that includes a plurality of read only semiconductor memories, the read only semiconductor memories having storage areas, which are located in one storage space indicated with one address system, a storage area including at least one program, the program linking apparatus that links and executes a program in one storage area and a program in another storage area, the program linking apparatus that may include: a first semiconductor memory for including a first storage area, which is located in the storage space, the first storage area storing a first program, which has at least one executable instruction and at least one set, each of which corresponds to a different executable instruction and includes an instruction identifier, which identifies a corresponding executable instruction, and an instruction address, which shows a location in the first program of an area where the corresponding executable instruction is stored and is an offset address indicating a relative location with reference to a beginning location of the first program; a second semiconductor memory for including a second storage area, which is located in the storage space and does not overlap the first storage area, the second storage area storing a second program, which has at least one call instruction, each of which calls an executable instruction and includes an instruction identifier for identifying the executable instruction to be called; an absolute address obtaining unit for storing location information, which indicates the beginning location of the first program in the storage space using an absolute address, and for obtaining an absolute address in the storage space where an executable instruction identified by an instruction identifier in a call instruction is stored using the location information and an instruction address that forms one set with the instruction identifier in the call instruction, wherein an absolute address is an address indicated with the first address system; and an executing unit for executing the executable instruction that has been called with the call instruction by executing an executable instruction that is stored in an area indicated by the absolute address that has been obtained.

In the program linking apparatus, a program containing at least one executable instruction and an offset addresses storing the executable instruction are stored in a predetermined location of the first ROM, and another program containing a call instruction that calls the executable instruction is stored in a predetermined location of the second ROM. In addition, whenever the executable instruction is called by the call instruction, an absolute address where the executable instruction is stored is obtained using the offset address and the location information on the location of the first ROM, and the executable instruction is executed using the absolute address, so that symbols can be linked between the programs. As a result, the programs need not to store the absolute addresses in themselves, and the programs recorded in a ROM are independent of the memory map of an embedded microcomputer control system and can be shared by another system having a different memory map.

The above-mentioned object may be also achieved by the program linking apparatus, wherein the absolute address obtaining unit (1) reads the call instruction from the second storage area and extracts the instruction identifier in the read call instruction, (2) extracts the instruction address from the first storage area that forms one set with an instruction identifier in the first storage area matching the extracted instruction identifier, and (3) adds the location information and the extracted instruction address together to obtain the absolute address in the storage space.

In the program linking apparatus, the offset address and the location information on the location of the first ROM are added together, and the addition result is set as the absolute address. As a result, the absolute address can be obtained by a simple calculation.

The above-mentioned object may be also achieved by the program linking apparatus, wherein the absolute address obtaining unit includes: a reference table;

an absolute address creating unit for reading one call instruction from the second storage area, extracting an instruction identifier in the read call instruction, extracting an instruction address from the first storage area that forms one set with an instruction identifier in the first storage area matching the extracted instruction identifier, and adding the location information and the extracted instruction address together to create an absolute address in the storage space; a reference table writing unit for writing a set of the extracted instruction identifier and the created absolute address in the reference table; a repetition control unit for controlling the absolute address creating unit and the reference table writing unit for the call instructions in the second storage area so that extraction of an instruction identifier, creation of an absolute address, and writing in the reference table are repeated; and an absolute address extraction unit for reading a call instruction from the second storage area, extracting an instruction identifier in the read call instruction, and obtaining an absolute address in the storage space by extracting an absolute address that corresponds to the extracted instruction identifier from the reference table.

In the program linking apparatus, the absolute address of the areas where the executable instructions are stored have been calculated, the reference table has stored all the sets of an instruction identifier and an absolute addresses, and whenever the executable instruction is called by the call instruction, a corresponding absolute address is read from the reference table and the executable instruction is executed using the read absolute address. As a result, the offset address needs not to be converted into an absolute address whenever the executable instruction is called, and the obtainment of the absolute address can be sped up.

The above-mentioned object may be also achieved by the program linking apparatus, wherein the absolute address obtaining unit includes: a reference table that includes an area for storing a predetermined number of sets of an instruction identifier and an absolute address; a judging unit for reading a call instruction from the second storage area, extracting an instruction identifier from the read call instruction, and judging whether the extracted instruction identifier is included in the reference table; a registration unit for extracting an instruction address that forms one set with an instruction identifier in the first storage area matching the extracted instruction identifier from the first storage area, adding the location information and the extracted instruction address to obtain the absolute address in the storage space, and for writing a set of the extracted instruction identifier and the created absolute address in the reference table when the judging unit judges that the extracted instruction identifier is not included in the reference table; and a reading unit for obtaining the absolute address in the storage space by reading an absolute address that corresponds to the extracted instruction identifier from the reference table when the judging unit judges that the extracted instruction identifier is included in the reference table.

The program linking apparatus is provided with the reference table that has the area for storing a predetermined number of sets of an instruction identifier and an absolute address, and whenever the executable instruction is called by the call instruction, it is judged whether the instruction identifier that identifies the executable instruction is included in the reference table. When the instruction identifier is not included in the reference table, the offset address and the location information on the location of the first ROM are added together to obtain the absolute address, and the set of the instruction identifier and the absolute address is written in the reference table. When the instruction identifier is included in the reference table, the absolute address is read from the reference table, and the executable instruction is executed using the obtained, absolute address As a result, all the sets of an instruction identifier and an absolute address need not to be stored in the memory, so that the conversion from an offset address into an absolute address can be sped up and the necessary memory size can be reduced.

The above-mentioned object may be also achieved by the program linking apparatus, wherein each of the sets that are stored in the first storage area further includes an address flag, which indicates that an instruction address in the same set is an offset address, and the absolute address obtaining unit includes: a cache table that has an area for storing a predetermined number of sets of an address flag, an instruction identifier, and an instruction address, wherein an address flag indicates whether an instruction address in the same set is an offset address or an absolute address, an instruction identifier identifies an executable instruction, an instruction address indicates a location of an area where a corresponding executable instruction is stored in the first program, and an instruction address is an offset address when a corresponding address flag indicates an offset address, and an instruction address is an absolute address when a corresponding address flag indicates an absolute address; an instruction identifier extracting unit for reading a call instruction from the second storage area and extracting an instruction identifier in the read call instruction; an address extracting unit for (1) judging whether the extracted instruction identifier is included in the cache table, (2) extracting an address flag and an instruction address that form one set with an instruction identifier matching the extracted instruction identifier from the first storage area when the extracted instruction identifier is not included in the cache table, and (3) extracting an address flag and an instruction address that correspond to the extracted instruction identifier from the cache table when the extracted instruction identifier is included in the cache table; an absolute address creating unit for (1) obtaining the absolute address in the storage space by adding the location information and the extracted instruction address together when the address flag that has been extracted by the address extracting unit indicates an offset address, and (2) obtaining the absolute address in the storage space by setting the extracted instruction address as the absolute address in the storage space when the address flag that has been extracted by the address extracting unit indicates an absolute address; and a cache table writing unit for writing an address flag that indicates an absolute address, the extracted instruction identifier, and the created absolute address in the cache table when the address flag that has been extracted by the address extracting unit indicates an offset address.

In the program linking apparatus, a program stored in the first ROM contains at least one executable instruction, instruction address that stores the executable instruction, and address flag, is provided with a cache table that has an area for storing a predetermined number of sets of an address flag, an instruction identifier, and an instruction address, and whenever the executable instruction is called by the call instruction, it is judged whether the instruction identifier that identifies the executable instruction is included in the cache table. When the instruction identifier is not included in the cache table, the offset address and the location information on the location of the first ROM are added together to obtain the absolute address. When the instruction identifier is included in the cache table, the corresponding address flag and instruction address are extracted from the cache table, it is judged whether the extracted address flag indicates absolute address or offset address. When the extracted instruction address is an offset address, the extracted instruction address and the location information on the location of the first ROM are added together to obtain the absolute address, and the address flag, instruction identifier, and instruction address are written in the cache table. When the extracted instruction address is an absolute address,,the extracted instruction address is used as the absolute address to be obtained. Since the executable instruction is executed using the obtained absolute address, the absolute address of the area of the executable instruction that has been converted in the previous reference may remain in the cache at the time of a following reference even though the sets of the export symbols and the corresponding addresses are not stored in the memory. As a result, the conversion from an offset address into an absolute address can be sped up.

The above-mentioned object may be also achieved by the program linking apparatus, wherein the absolute address obtaining unit includes: a cache table that has an area for storing a predetermined number of sets of a writing flag, an instruction identifier, and an instruction address, wherein a writing flag indicates whether an instruction address in the same set is an offset address or an absolute address, an instruction identifier identifies an executable instruction, an instruction address indicates a location of an area where a corresponding executable instruction is stored in the first program, and an instruction address is an offset address when a corresponding writing flag indicates an offset address, and an instruction address is an absolute address when a corresponding writing flag indicates an absolute address; an instruction identifier extracting unit for reading a call instruction from the second storage area and extracting an instruction identifier in the read call instruction; an address extracting unit for (1) judging whether the extracted instruction identifier is included in the cache table, (2) extracting an instruction address that forms one set with an instruction identifier matching the extracted instruction identifier from the first storage area when the extracted instruction identifier is not included in the cache table, and (3) extracting a writing flag and an instruction address that correspond to the extracted instruction identifier from the cache table when the extracted instruction identifier is included in the cache table; an absolute address creating unit for (1) obtaining the absolute address in the storage space by adding the location information and the extracted instruction address together one of when the extracted instruction identifier is not included in the cache table and when the writing flag that has been extracted by the address extracting unit indicates an offset address, and (2) obtaining the absolute address in the storage space by setting the extracted instruction address as the absolute address in the storage space when the writing flag that has been extracted by the address extracting unit indicates an absolute address; and a cache table writing unit for writing an address flag that indicates an absolute address, the extracted instruction identifier, and the created absolute address in the cache table one of when the extracted instruction identifier is not included in the cache table and when the writing flag that has been extracted by the address extracting unit indicates an offset address.

The program linking apparatus is provided with a cache table having an area for storing a predetermined number of sets of a writing flag, an instruction identifier, and an instruction address, and judges whether the instruction identifier that identifies the executable instruction is included in the cache table whenever the executable instruction is called by the call instruction. When the instruction identifier is not included in the cache table, the offset address and the location information on the location of the first ROM are added together to obtain the absolute address. When the instruction identifier is included in the cache table, the corresponding writing flag and instruction address are extracted from the cache table, and it is judged whether the extracted writing flag indicates absolute address or offset address. When the extracted instruction address is an offset address, the extracted instruction address and the location information on the location of the first ROM are added together to obtain the absolute address, and the writing flag, instruction identifier, and instruction address are written in the cache table. When the extracted instruction address is an absolute address, the extracted instruction address is used as the absolute address to be obtained. Since the executable instruction is executed using the obtained absolute address, the absolute address of the area of the executable instruction that has been converted in the previous reference may remain in the cache at the time of a following reference even though the sets of the export symbols and the corresponding addresses are not stored in the memory. As a result, the conversion from an offset address into an absolute address can be sped up. In addition, the writing flag in the cache table shows whether the address information on the area of the executable instruction is an offset address or an absolute address, so that the export symbol table can be simplified and the export symbol table used in the system that is provided with no cache device can be used. As a result, the same programs can be used regardless of whether a system is provided with a cache device.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings;

FIG. 3 shows the structure of a program A and data A in the program linking apparatus 1000;

FIG. 4 shows a program block that is part of the program A in the program linking apparatus 1000;

FIG. 6 shows a program block that is part of the program B in the program linking apparatus 1000;

FIG. 13 shows the structure of an export symbol reference table in the program linking apparatus 2000;

FIG. 26 shows the structure of a program A and data A in the program linking apparatus 4000;

FIG. 27 shows the structure of a program B and data B in the program linking apparatus 4000;

FIG. 41 shows the internal state of a cache device in the program linking apparatus 5000 when data is written in the cache device;

FIG. 43 shows the arrangement of a jump table and an export symbol import step by the program linking apparatus 5000;

FIG. 52 shows a program block that is part of the program A in the conventional program linking apparatus; and FIG. 53 shows a program block that is part of the program B in the conventional program linking apparatus.

DESCRIPTION OF THE PREFERRED EMBODIMENTS

Explanations of the embodiments of the present invention will be given below.

1. The First Embodiment

An explanation of a program linking apparatus 1000 as an embodiment of the present invention will be given below.

1.1. Structure of Program Linking apparatus 1000

The programs linking apparatus 1000 includes a CPU 1105, a ROM-A 1101, a ROM-B 1102, and a RAM 1103.

The ROM-A 1101, the ROM-B 1102, the RAM 1103, and the CPU 1105 are connected with each other by a CPU bus 1104.

The storage areas of the ROM-A 1101, the ROM-8 1102, and the RAM 1103 are located in one address space (storage space) that is addressed in one address system. As a result, the CPU 1105 can access to data stored in the ROM-A 1101, the ROM-B 1102, and the RAM 1103 using one kind of address, which is called "absolute address".

1.1.1. CPU 1105

The CPU 1105 is a semiconductor device that includes a register,. an arithmetic circuit, and a control circuit. The CPU 1105 decodes commands, performs arithmetic, communicates data between storage devices, performs control, and the like.

The CPU 1105 reads commands stored in the ROM-A 1101, the ROM-B 1102, and the RAM 1103, decodes the read commands, and executes the decoded commands. The CPU 1105 reads data stored in the ROM-A 1101, the ROM-B 1102, and the RAM 1103, and writes data in the RAM 1103.

1.1.2. ROM-A 1101

The ROM-A 1101 is composed of a read only semiconductor memory. In the storage space of the ROM-A 1101, a main step 1110, an export symbol import step 1160, and a program A 1120 are recorded.

1.1.2.1. Main Step 1110

The main step 1110 is located in the address space from the area indicated by an absolute address "0X000000".

Figure 2:
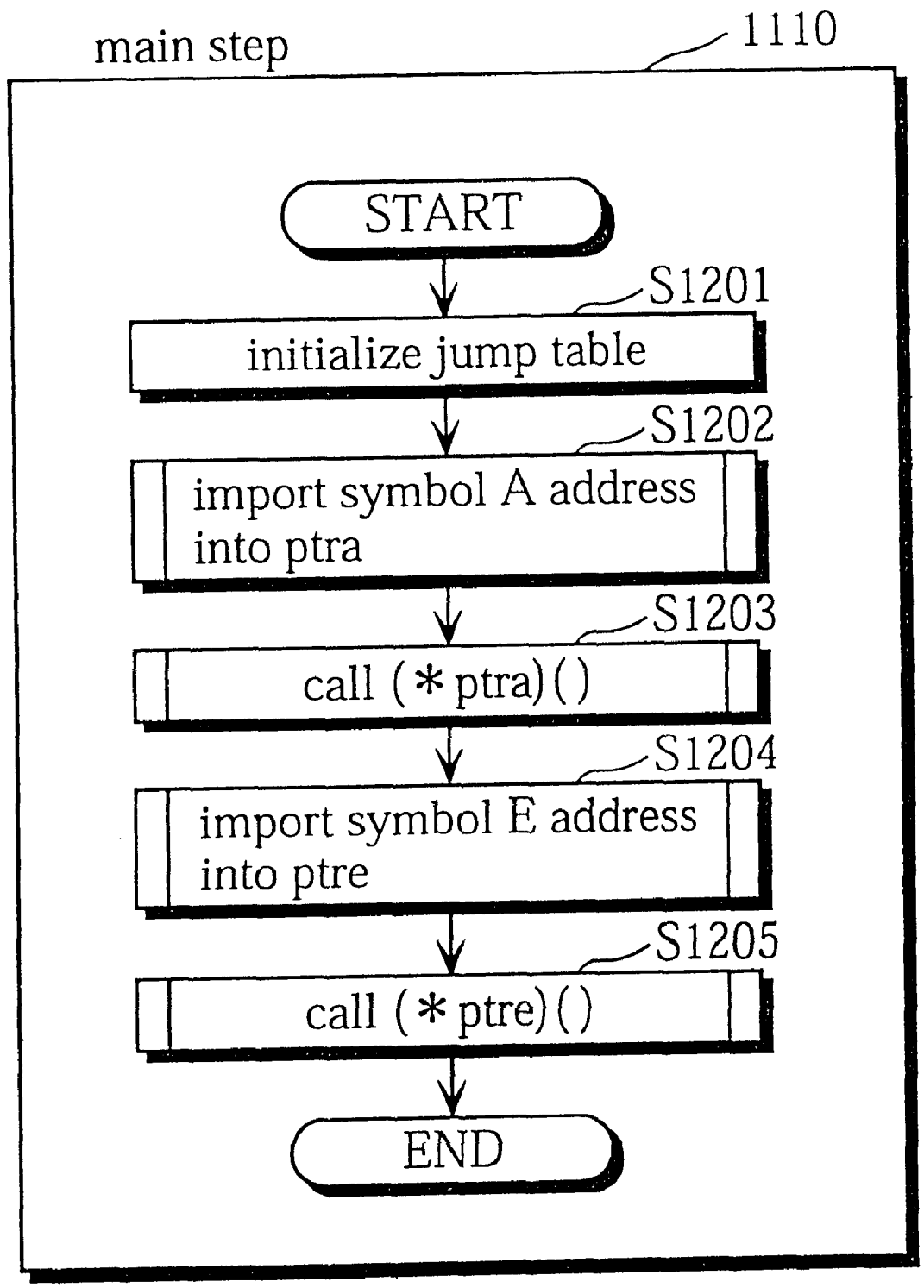
FIG. 2 is a flowchart illustrating the procedure of operations in the main step by the program linking apparatus 1000.

As shown by the flowchart in FIG. 2, the main step 1110 includes procedures given below. A jump command to the export symbol import step 1160 is stored in a jump table 1170 (step s1201). The export symbol import step 1160 is called with the identifier "ID-A" of a symbol A as the argument, the absolute address where the symbol A is stored is calculated, the absolute address where the symbol A is stored is stored in a variable "ptra" (step s1202), and the symbol A is called using the variable "ptra" (step s1203). The export symbol import step 1160 is called with the identifier "ID-E" of a symbol E as the argument, the absolute address where the symbol E is stored is calculated, the absolute address where the symbol E is stored is stored in a variable "ptre" (step s1204), and the symbol E is called using the variable "ptre" (step s1205).

The main step 1110 aims to execute program blocks that are identified with the symbols A and E.

Note that more detailed explanations of the symbols A and E, identifiers "ID-A" and "ID-E", and program blocks that are identified with symbols A and E will be given later.

1.1.2.2. Export Symbol Import Step 1160

The export symbol import step 1160 is located in the address space from the area indicated by an absolute address "0X002000".

The export symbol import step 1160 is called from another program with the identifier of a symbol as the argument. When the export symbol import step 1160 is called from another program with the identifier of a symbol as the argument, in the export symbol import step 1160, the identifier of the symbol is received from the other program, an identifier that matches the received identifier is retrieved from an export symbol offset table A 1123 or an export symbol offset table B 1133. Then, the offset corresponding to the retrieved identifier is fetched, predetermined arithmetic is executed on the fetched offset, an absolute address is created, and the created absolute address is output to the other program.

Note that a more detailed explanation of the export symbol offset table A 1123 and the export symbol offset table B 1133 will be given later.

Symbols come in code symbols for identifying commands and data symbols for identifying data. When a symbol is a code symbol, an absolute address is created using a code export symbol offset table A 1128 or a code export symbol offset table B 1138 in the export symbol import step 1160. When a symbol is a data symbol, an absolute address is created using a data export symbol offset table A 1129 or a data export symbol offset table B 1139 in the export symbol import step 1160.

Note that as described later, the code export symbol offset table A 1128 and the data export symbol offset table A 1129 are included in the export symbol offset table A 1123, and the code export symbol offset table B 1138 and the data export symbol offset table B 1139 are included in the export symbol offset table B 1133.

Here, the predetermined arithmetic for creating an absolute address from an offset corresponding to an identifier will be given.

When a symbol is a code symbol, the absolute address is calculated using an Expression 1.

$$\text{absolute address} = \text{fetched offset} + 0X010000 * k + 0X010000 \quad \text{(Expression 1)}$$

Here, the coefficient "k" is the number identifying a program. The coefficient "k" is "0" for the program A and "1" for program B.

An absolute address can be calculated according to the arithmetic shown in the Expression 1 because the program A and the program B are stored in the areas started from the absolute addresses "0X010000" and "0X020000" in the address space, respectively. In other words, this is because the first program is stored in a predetermined absolute address and the following program is stored at a predetermined interval.

When a symbol is a data symbol, the absolute address is calculated using an Expression 2.

$$\text{absolute address} = \text{fetched offset} + 0X010000 * k + 0X110000 \quad \text{(Expression 2)}$$

Here, as in the case of the Expression 1, the coefficient "k" is the number identifying a program. The coefficient "k" is "0" for the program A and "1" for program B.

An absolute address can be calculated according to the arithmetic shown in the Expression 2 because the data A and the data B are stored in the areas started from the absolute addresses "0X110000" and "0X120000" in the address space, respectively. In other words, this is because the first data is stored in a predetermined absolute address and the following data is stored at a predetermined interval.

1.1.2.3. Program A 1120

Figure 1:
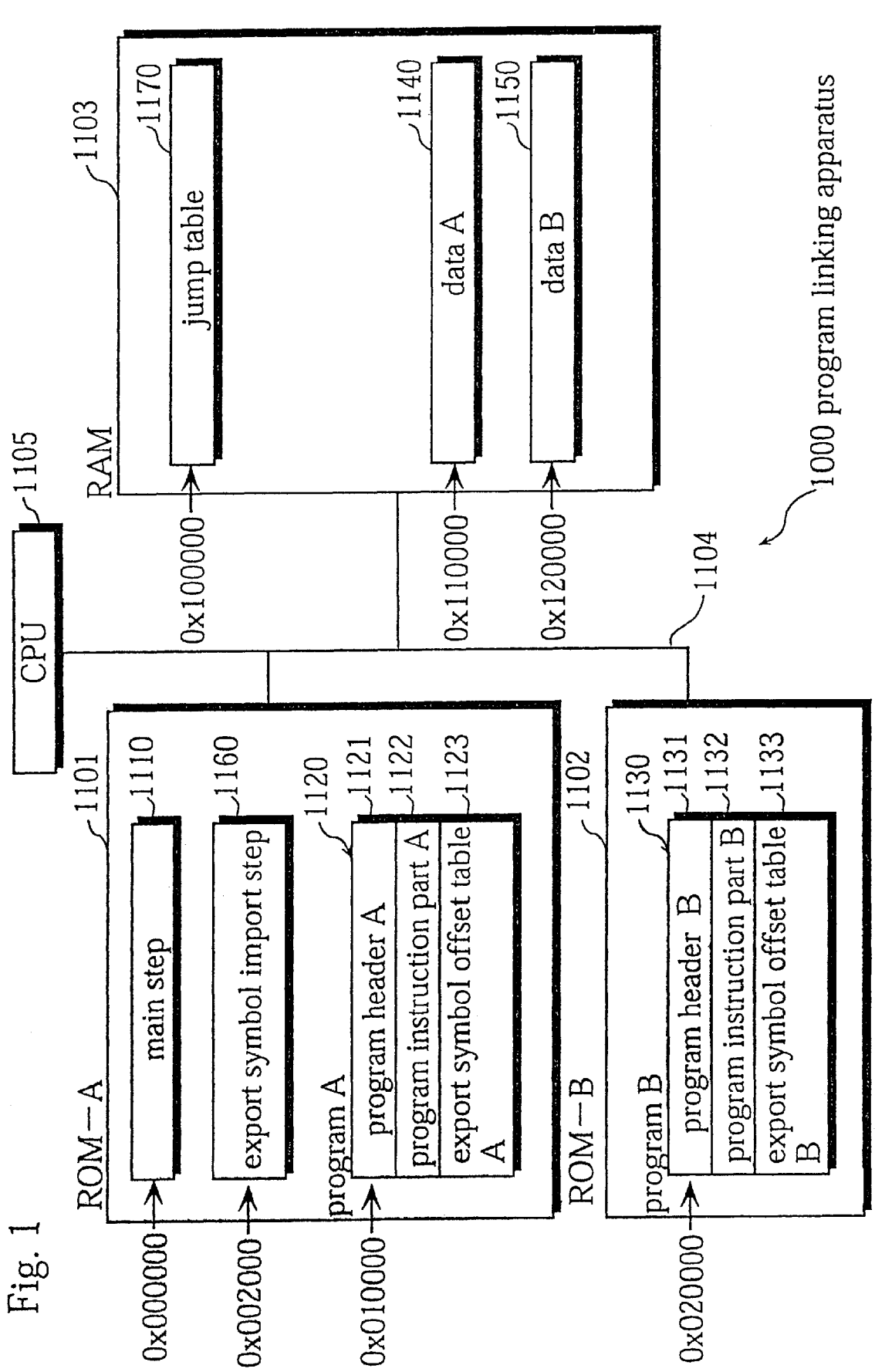
FIG. 1 is a block diagram showing the structure of a program linking apparatus 1000 according to the first embodiment of the present invention.

The program A 1120 includes a program header A 1121, a program instruction part A 1122, and the export symbol offset table A 1123 as shown in FIG. 1.

The program A 1120 is located in the address space from the area indicated by the absolute address "0X010000".

(1) Program Header A 1121

The program header A 1121 is located from the top of the program A 1120, and includes an offset 1124, which indicates the location where the code export symbol offset table A 1128 starts, and an offset 1125, which indicates the location where the data export symbol offset table A 1129 starts, as shown in FIG. 3. Here, an offset is an address with reference to the location where the program A 1120 starts.

As shown in FIG. 3, the offset 1124 is "0X001000", which is the address indicating the starting location of the code export symbol offset table A 1128 in the program A 1120, and the offset 1125 is "0X001010", which is the address indicating the starting location of the data export symbol offset table A 1129 in the program A 1120.

(2) Program Instruction Part A 1122

As shown in FIG. 3, the program instruction part A 1122 is located in the area following the program header A 1121, and includes at least one program block composed of at least one command. In FIG. 3, the program instruction part A 1122 includes two program blocks, which each are identified by symbols A 1126 and B 1127, respectively.

The symbol A 1126 is stored in the area indicated by the absolute address "0X010008", and the symbol B 1127 is stored in the area indicated by an absolute address "0X010200".

(Program Block Identified by Symbol A 1126)

An example of the program block that is identified by the symbol A 1126 is shown in FIG. 4. In FIG. 4, a program block identified by the symbol A 1126 is expressed in the language C.

The program block includes lines 1309, 1301, 1302, 1303, 1304, 1305, 1306, 1307, 1308, and other lines that are not illustrated.

In a line 1309, the symbol A is described.

The line 1301 shows that an absolute address "0X100000" is substituted into a varible "import". The address "0X100000" is the absolute address of the jump table 1170.

The line 1302 shows that a function indicated by the variable "import" is called using the identifier "ID-F" as the argument, the absolute address of the symbol F is obtained as the returned value, and the obtained returned value is substituted into the variable "ptrf".

The line 1303 shows that the address indicated by the variable "ptrf", into which the returned value has been substituted, is called.

The line 1304 shows that the function indicated by the variable "import" is called using the identifier "ID-G" as the argument, the absolute address of the symbol G is obtained as the returned value, and the returned value is substituted into the variable "ptrg".

The line 1305 shows that the variable "XXXXX" is substituted into the area represented by the address that is indicated by the varible "ptrg", into which the returned value has been substituted.

The line 1306 shows that the function indicated by the variable "import" is called using the identifier "ID-H" as the argument, the absolute address of the symbol H is obtained as the returned value, and the returned value is substituted into the variable "ptrh".

The line 1307 shows that the variable "YYYYY" is substituted into the area represented by the address that is indicated by the varible "ptrh", into which the returned value has been substituted.

The line 1308 shows that the control is returned to the program block that has called this program block.

As has been described, when the program block that is identified by the symbol A 1126 is executed, the program block identified by the symbol F is called and executed, the value of the variable "XXXXX" is substituted into the data block identified by the symbol C, and the value of the variable "YYYYY" is substituted into the data block identified by the symbol H.

(Program Block Identified by Symbol B 1127)

Not illustrated, the program block that is identified by the symbol B 1127 includes a plurality of commands as in the case of the program block that is identified by the symbol A 1126.

(3) Export Symbol Offset Table A 1123

The export symbol offset table A 1123 includes the code export symbol offset table A 1128 and the data export symbol offset table A 1129.

The export symbol offset table A 1123 is located in the address space from the area indicated by an absolute address "0X011000".

(Code Export Symbol Offset Table A 1128)

The code export symbol offset table A 1128 is located in the address space from the area indicated by the absolute address "0X011000".

The code export symbol offset table A 1128 stores sets of the identifiers of code symbols and offsets of the areas where the code symbols are stored.

More specifically, the code export symbol offset table A 1128 stores a set of the identifier 1181 "ID-A" and the offset 1186 "0X000008" of the symbol A and a set of the identifier 1182 "ID-B" and the offset 1187 "0X000200" of the symbol B as shown in FIG. 3.

(Data Export Symbol Offset Table A 1129)

The data export symbol offset table A 1129 is located in the address space from the area indicated by an absolute address "0X011010".

The data export symbol offset table A 1129 stores sets of the identifiers of data symbols and offsets of the areas where the data symbols are stored.

Here, an offset is an address with reference to the location where the data A starts.

More specifically, the data export symbol offset table A 1129 stores a set of the identifier 1183 "ID-C" and the offset 1188 "0X000500" of the symbol C and a set of the identifier 1184 "ID-D" and the offset 1189 "0X000600" of the symbol D as shown in FIG. 3.

1.1.3. ROM-B 1102

The ROM-B 1102 is composed of a read only semiconductor memory. In the storage area of the ROM-B 1102, a program B 1130 is recorded.

1.1.3.1. Program B 1130

The program B 1130 includes a program header B 1131, a program instruction part B 1132, and the export symbol offset table B 1133 as shown in FIG. 1.

The program B 1130 is located in the address space from the area indicated by the absolute address "0X020000".

(1) Program Header B 1131

Figure 5B:
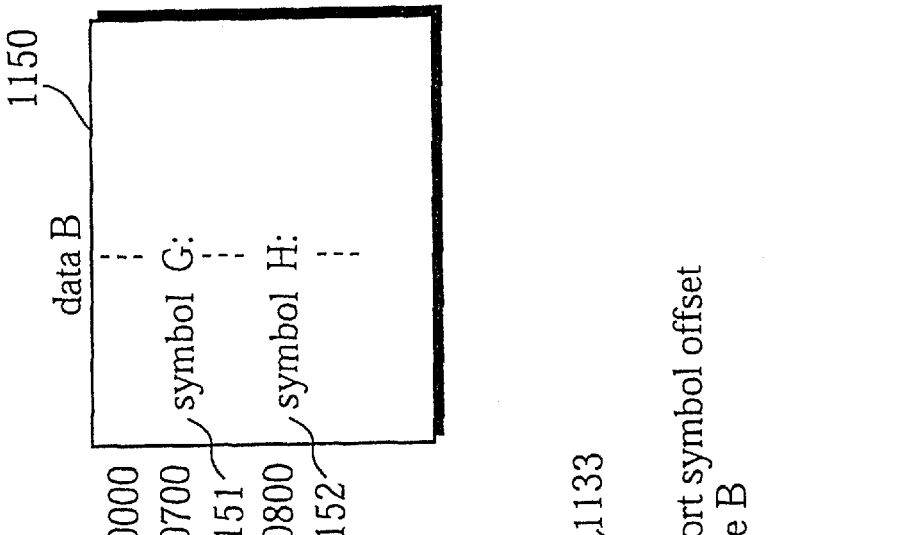
FIG. 5 shows the structure of a program B and data B in the program linking apparatus 1000.
Figure 5A:
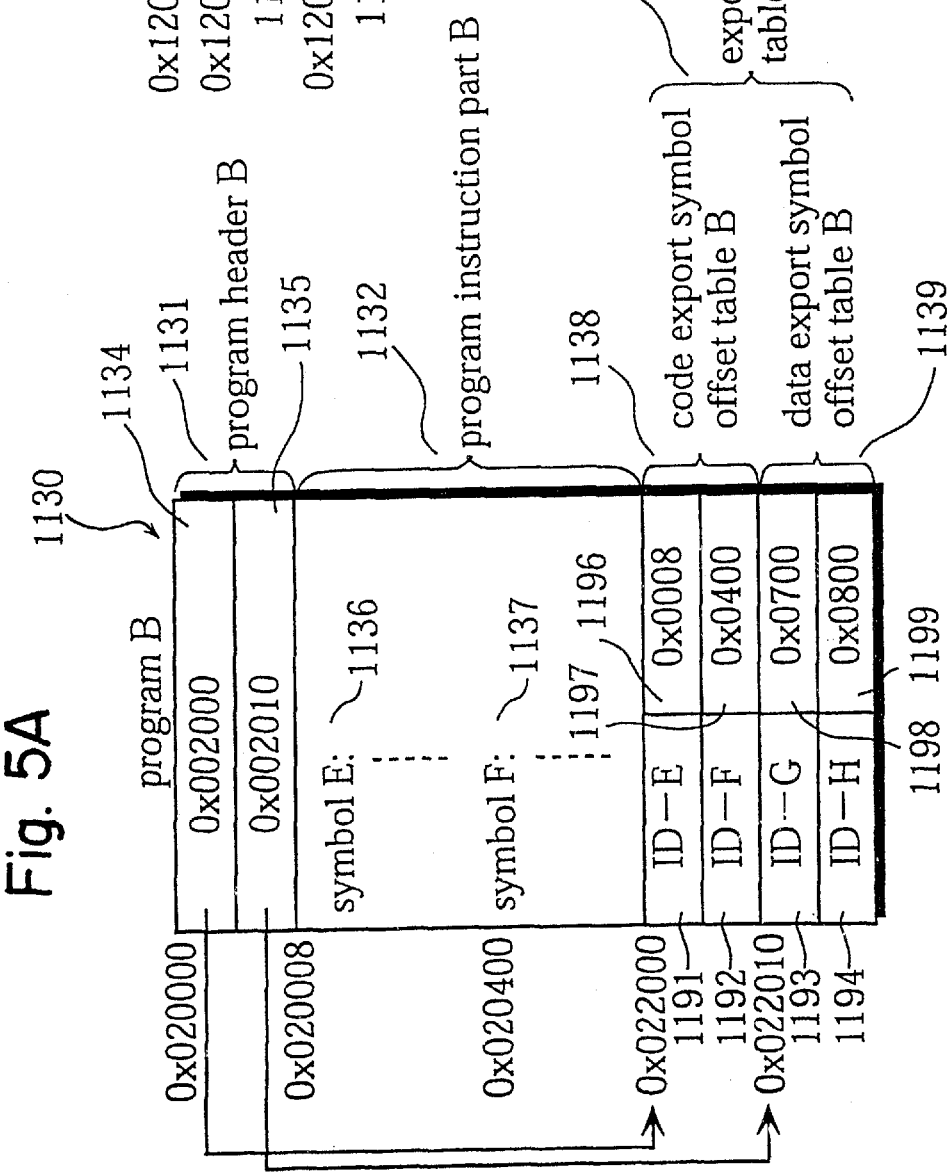

The program header B 1131 is located from the top of the, program B 1130, and includes an offset 1134, which indicates the location where the code export symbol offset table B 1138 starts, and an offset 1155, which indicates the location where the data export symbol offset table B 1139 starts, as shown in FIG. 5. Here, an offset is an address with reference to the location where the program B 1130 starts.

As shown in FIG. 5, the offset 1123 is "0X002000", which is the address indicating the starting location of the code export symbol offset table B 1138 in the program B 1130, and the offset 1135 is "0X002010", which is the address indicating the starting location of the data export symbol offset table B 1139 in the program B 1130.

(2) Program Instruction Part B 1132

As shown in FIG. 5, the program instruction part B 1132 is located in the area following the program header B 1131, and includes at least one program block composed of at least one command. In FIG. 5, the program instruction part B 1132 includes two program blocks, which each are identified by symbols E 1136 and F 1137, respectively.

The symbol E 1136 is stored in the area indicated by the absolute address "0X020008", and the symbol F 1137 is stored in the area indicated by an absolute address "0X020400".

(Program Block Identified by Symbol E 1136)

An example of the program block that is identified by the symbol E 1136 is shown in FIG. 6. In FIG. 6, a program block identified by the symbol E 1136 is expressed in the language C.

The program block includes lines 1409, 1401, 1402, 1403, 1404, 1405, 1406, 1407, 1408, and other lines that are not illustrated.

The content indicated by each of the lines is the same as the content indicated by each of the lines in the program block that is identified by the symbol A 1126, and more detailed explanation will not be given here.

When the program block that is identified by the symbol E 1136 is executed, the program block identified by the symbol B is called and executed, the value of the variable "ZZZZZ" is substituted into the data block identified by the symbol C, and the value of the variable "OOOOO" is substituted into the data block identified by the symbol D.

(Program Block Identified by Symbol F 1137)

Not illustrated, the program block that is identified by the symbol F 1137 includes a plurality of commands as in the case of the program block that is identified by the symbol E 1136.

(3) Export Symbol Offset Table B 1133

The export symbol offset table B 1133 includes the code export symbol offset table B 1138 and the data export symbol offset table B 1139.

(Code Export Symbol Offset Table B 1138)

The code export symbol offset table B 1138 stores sets of the identifiers of code symbols and offsets of the areas where the code symbols are stored.

More specifically, the code export symbol offset table B 1138 stores a set of the identifier 1191 "ID-E" and the offset 1196 "0X000008" of the symbol E and a set of the identifier 1192 "ID-F" and the offset 1197 "0X000400" of the symbol F as shown in FIG. 5.

(Data Export Symbol Offset Table B 1139)

The data export symbol offset table B 1139 stores sets of the identifiers of data symbols and offsets of the areas where the data symbols are stored.

Here, an offset is an address with reference to the location where the data B starts.

More specifically, the data export symbol offset table B 1139 stores a set of the identifier 1193 "ID-G" and the offset 1198 "0X000700" of the symbol G and a set of the identifier 1194 "ID-H" and the offset 1199 "0X000800" of the symbol H as shown in FIG. 5.

1.1.4. RAM 1103

The RAM 1103 is composed of a readable/writeable semiconductor memory. In the storage area of the RAM 1103, the jump table 1170, data A 1140, and data B 1150 are stored.

1.1.4.1. Jump Table 1170

The jump table 1170 is stored in the address space from the area indicated by the absolute address In the jump table 1170, a jump command to the export symbol import step.1160 is stored.

Figure 7:
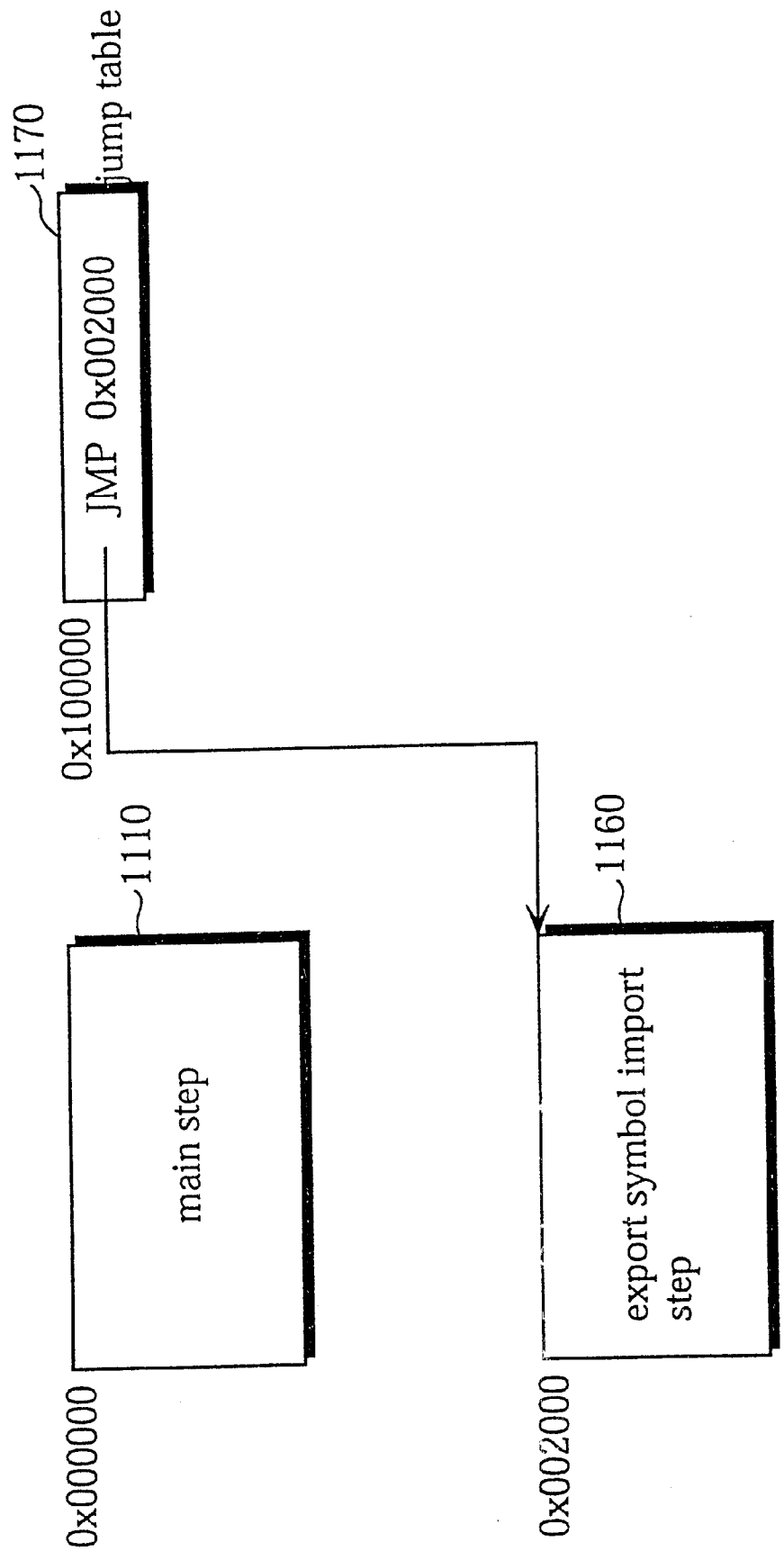
FIG. 7 shows the arrangement of a jump table and an export symbol import step by the program linking apparatus 1000.

The arrangement of the jump table 1170 and the, export symbol import step 1160 in the address space is shown in FIG. 7.

As shown in FIG. 7, a jump command "JMP 0X002000" is stored in the jump table 1170. Here, the character string "0X002000" indicates the absolute address of the area where the export symbol import step 1160 is stored.

The jump table 1170 is stored so that the export symbol import step 1160 could be called using a certain absolute address even if the location of the export symbol import step 1160 changes in the address space.

1.1.4.2. Data A 1140

The data A 1140 is stored in the address space from the area indicated by the absolute address "0X110000" as shown in FIG. 3.

The data A 1140 includes the data blocks that are identified by the symbols C 1141 and D 1142, respectively. These data blocks are used by the program B 1130.

The symbols C 1141 and D 1142 are stored in the areas indicated by the absolute addresses "0X110500" and "0X110600", respectively.

1.1.4.3. Data B 1150

The data B 1150 is stored in the address space from the area indicated by the absolute address "0X120000" as shown in FIG. 5.

The data B 1150 includes the data blocks that are identified by the symbols G 1151 and H 1152, respectively. These data blocks are used by the program A 1120.

The symbols G 1151 and H 1152 are stored in the areas indicated by the absolute addresses "0X120700" and "0X120800", respectively.

1.2. Operations by Program Linking Apparatus 1000

1.2.1. Operations by CPU 1105

Figure 8:
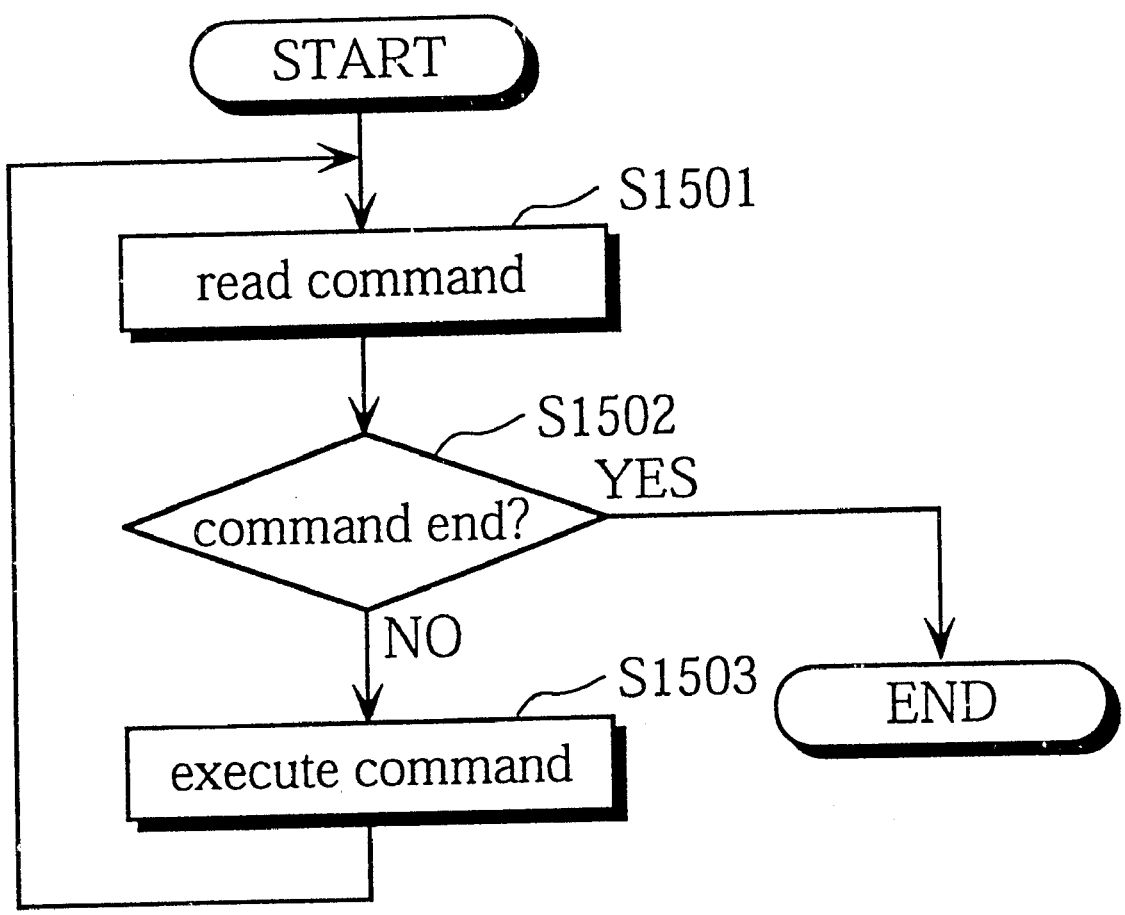
FIG. 8 is a flowchart illustrating operations by a CPU in the program linking apparatus 1000.

An explanation of operations by the CPU 1105 will be given with reference to the flowchart shown in FIG. 8.

The CPU 1105 reads the commands in the program instruction part A 1122, the main step 1110, and the export symbol import step 1160, which each are recorded in the ROM-A 1101, and the commands in the program instruction part B 1132, which is recorded in the ROM-B 1102 (step s1501). When all the commands have been read (step s1502), the processing ends. When not all the commands have been read (step s1502), the CPU 1105 executes the command that has been read (step s1503). Then, the processing returns to step s1501, and commands are read and executed until all the commands have been read.

1.2.2. Operation in Export Symbol Import Step 1160

An explanation of operations in the export symbol import step 1160 will be given with reference to the flowchart shown in FIG. 9.

In the export symbol import step 1160, the processing described below is performed. The value "0" is substituted into a number "k" that identifies a program (step s1601), and the number "k" is compared with the number of all the programs. When the number "k" is equal to or larger than the number of the programs (step s1602), no identifier was found, an error arises, and the processing ends.

On the other hand, when the number "k" is no greater than the number of the programs (step s1602), the value "0" is substituted into a number "i" that identifies a symbol (step s1603), and the number "i" is compared with the number of all the code symbols. When the number "i" is equal to or larger than the number of the code symbols (step s1604), the control is transferred to step s1611.

On the other hand, when the number "i" is no greater than the number of code symbols (step s1604), the "i"th identifier in the code export symbol offset table is compared with the identifier that is to be retrieved. when the "i"th identifier is the same as the identifier to be retrieved (step s1605), the "i"th offset in the code export symbol offset table, a value "0X010000*k", and a value "0X010000" are added together, and the result of the addition is substituted into a variable "ret" (step s1606). Then, the variable "ret" and the control are returned to the caller program.

On the other hand, when the "i"th identifier is not the same as the identifier to be retrieved (step s1605), the value "1" is added to the number "i" (step s1607), the control is returned to step s1604, and the comparison between the "i"th identifier and the identifier to be retrieved is repeated.

Meanwhile, when the number "i" is equal to or greater than the number of all the code symbols at step s1604, the value "0" is substituted into the number "i" (step s1611). At step s1612, when the number "i" is equal to or greater than the number of all the code symbols, the value "1" is added to the number of "k" (step s1616), the control is returned to step s1602, and the symbol is retrieved for the number of the next program.

On the other hand, when the number "i" is no greater than the number of the code symbols (step s1612), the "i"th identifier in the data export symbol offset table is compared with the identifier to be retrieved. When the "i"th identifier is the same as the identifier to be retrieved (step s1613), the "i"th offset in the data export symbol offset table, a value "0X010000*k", and a value "0X110000" are added together, the result of the addition is substituted into the variable "ret" (step s1615), and the variable "ret" and the control are returned to the caller program.

On the other hand, when the "i"th identifier is not the same as the identifier to be retrieved (step s1613), the value "1" is added to the number "i" (step s1614), the control is returned to step s1612, and the "i"th identifier and the identifier to be retrieved is compared.

1.3. Summary

As has been described, each of the programs and the data is stored in a predetermined location, the offsets of the symbols are stored in the programs, and the absolute address of one symbol is calculated by converting the stored corresponding offset into an absolute address using a predetermined standard when the symbol is called, so that linkage between programs can be realized via the symbol according to the present embodiment As a result, programs need not to store the absolute addresses in themselves, so that the programs recorded in a ROM are independent of the memory map of an embedded microcomputer control system and can be shared by another system having a different memory map.

2. The Second Embodiment

An explanation of a program linking apparatus 2000 as another embodiment of the present invention will be given below.

2.1. Structure of Program Linking Apparatus 2000

Figure 10:
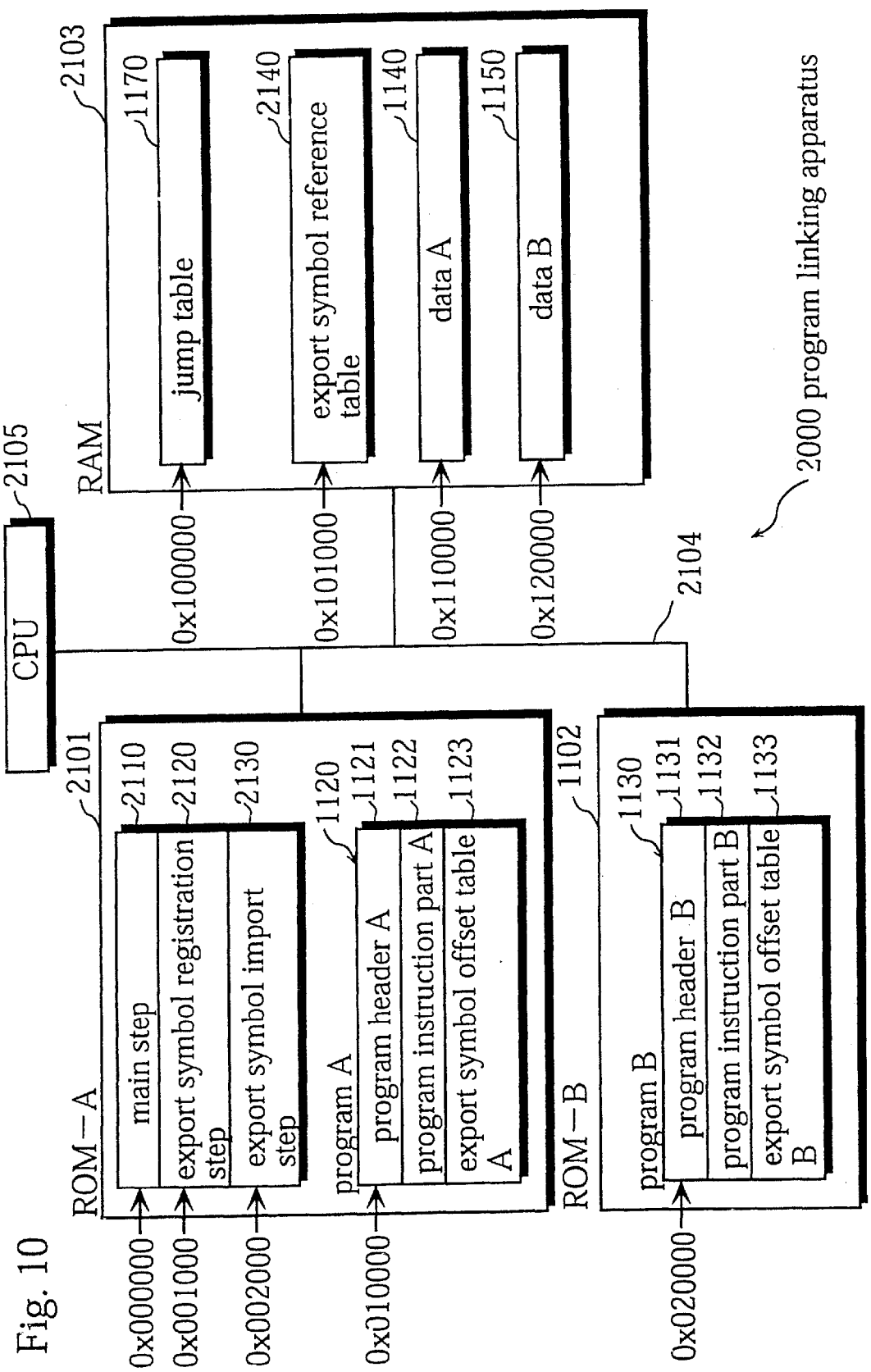
FIG. 10 is a block diagram showing the structure of a program linking apparatus 2000 according to the second embodiment of the present invention.

As shown in FIG. 10, the program linking apparatus 2000 includes a CPU 2105, a ROM-A 2101, a ROM-B 1102, and a RAM 2103.

The ROM-A 2101, the ROM-B 1102, the RAM 2103, and the CPU 2105 are connected with each other by a CPU bus 2104.

The storage areas of the ROM-A 2101, the ROM-B 1102, and the RAM 2103 are located in one address space as in the case of the first embodiment. As a result, the CPU 2105 can access to data stored in the ROM-A 2101, the ROM-B 1102, and the RAM 2103 using one kind of address.

The elements given the same reference numbers as in the first embodiment have the same functions as in the first embodiment. For these elements, no more explanations will given below. The descriptions given below will focus on differences from the first embodiment.

2.1.1. CPU 2105

As in the case of the CPU 1105, the CPU 2105 is a semiconductor device that includes a register, an arithmetic circuit, and a control circuit, and the CPU 2105 decodes commands, performs arithmetic, communicates data between storage devices, performs control, and the like.

The CPU 2105 reads commands stored in the ROM-A 2101, the ROM-B 1102, and the RAM 2103, decodes the read commands, and executes the decoded commands. The CPU 2105 reads data stored in the ROM-A 2101, the ROM-B 1102, and the RAM 2103, and writes data in the RAM 2103.

2.1.2. ROM-A 2101

The ROM-A 2101 is composed of a read only semiconductor memory. In the storage space of the ROM-A 2101, a main step 2110, an export symbol registration step 2120, an export symbol import step 2130, and a program A 120 are recorded.

2.1.2.1. Main Step 2110

Figure 11:
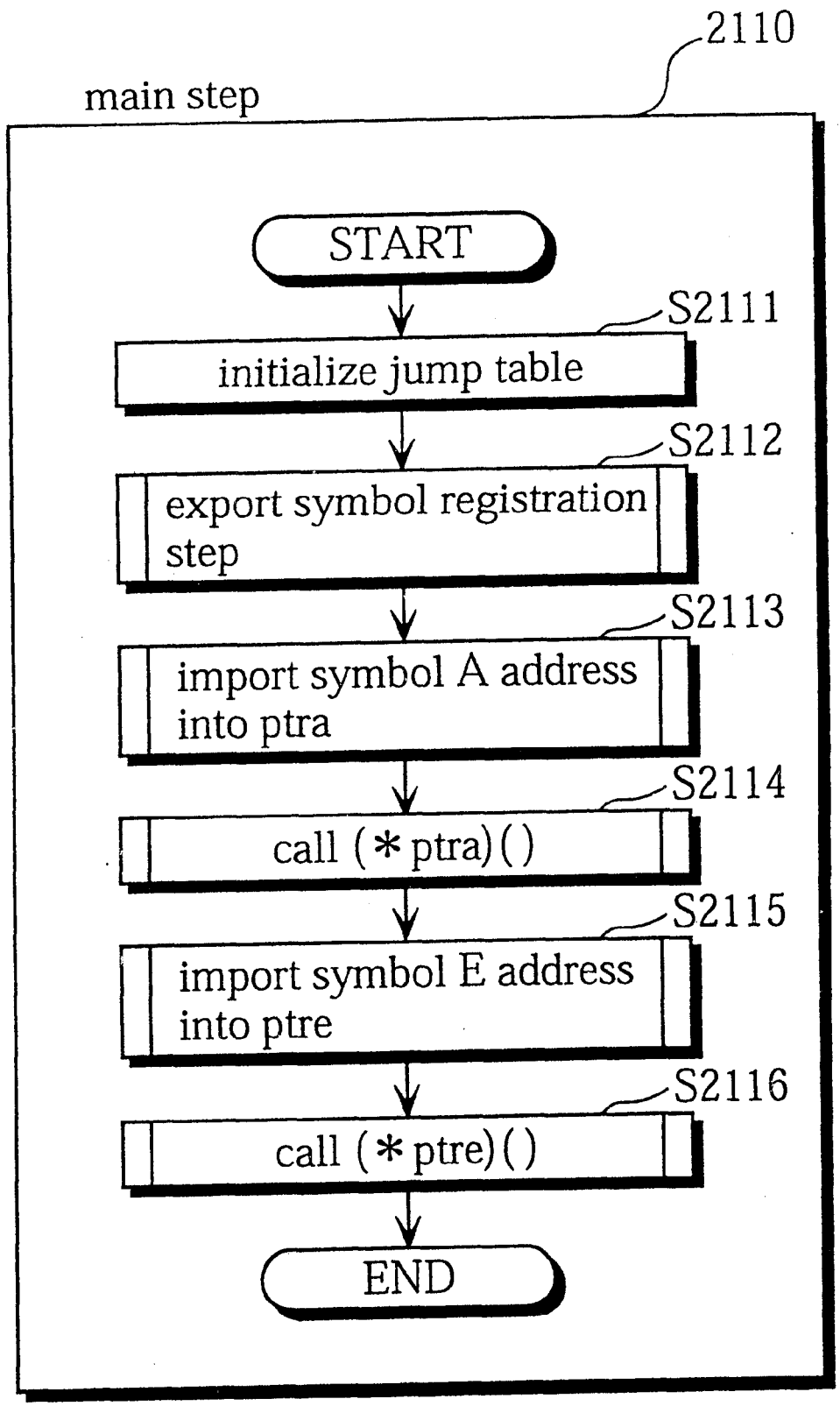
FIG. 11 is a flowchart illustrating the procedure of operations in the main step by the program linking apparatus 2000.

The main step 2110 is located in the address space rom the area indicated by the absolute address As shown by the flowchart in FIG. 11, the main step 2110 includes procedures given below. A jump command to the export symbol import step 2130 is stored in a jump table 1170 (step s2111). The export symbol registration step 2120 is called and executed (step s2112). The export symbol import step 2130 is called with the identifier "ID-A" of a symbol A as the argument, the absolute address where the symbol A is stored is calculated, the absolute address where the symbol A is stored is stored in a variable "ptra" (step s2113), and the symbol A is called using the variable "ptra" (step s2114). The export symbol import step 2130 is called with the identifier "ID-E" of a symbol E as the argument, the absolute address where the symbol E is stored is calculated, the absolute address where the symbol E is stored is stored in a variable "ptre" (step s2115), and the symbol E is called using the variable "ptre" (step s2116).

As in the case of the first embodiment, the main step 2110 aims to execute program blocks that are identified with the symbols A and E.

Given in the first embodiment, more detailed explanations of the symbols A and E, identifiers "ID-A" and "ID-E", and program blocks that are identified with symbols A and E will not be given in the present embodiment.

2.1.2.2. Export Symbol Registration Step 2120

The export symbol registration step 2120 is located in the address space from the area indicated by an absolute address "0X001000".

The export symbol registration step 2120 is called from the main step 2110 only once.

When the export symbol registration step 2120 is called from the main step 2110, in the export symbol registration step 2120, sets of identifiers of symbols and the offsets corresponding to the identifiers, which are stored in the export symbol offset table, are extracted for each program. Then, predetermined arithmetic is executed on the extracted offsets, absolute addresses are created, and the created absolute addresses are written in an export symbol reference table 2140.

In the export symbol registration step 2120, an absolute address is created and the created absolute address is written in the export symbol reference table 2140 for each set of symbol identifier and corresponding offset included in each program.

As in the case of the first embodiment, symbols come in code symbols for identifying commands and data symbols for identifying data. In the export symbol registration step 2120, when a symbol is a code symbol, an absolute address is created using a code export symbol offset table A 1128 or a code export symbol offset table B 1138. On the other hand, when a symbol is a data symbol, an absolute address is created using a data export symbol offset table A 1129 or a data export symbol offset table B 1139. Note that, as in the case of the first embodiment, the code export symbol offset table A 1128 and the data export symbol offset table A 1129 are included in the export symbol offset table A 1123, and the code export symbol offset table B 1138 and the data export symbol offset table B 1139 are included in the export symbol offset table B 1133.

Here, an explanation of the predetermined arithmetic for creating an absolute address from an offset corresponding to an identifier will be given below.

When a symbol is a code symbol, the absolute address is calculated using the Expression 1 as in the case of the first embodiment.

On the other hand, when a symbol is a data symbol, the absolute address is calculated using an Expression 2 as in the case of the first embodiment.

2.1.2.3. Export Symbol Import Step 2130

The export symbol import step 2130 is located in the address space from the area indicated by an absolute address "0X002000".

The export symbol import step 2130 is called from another program with the identifier of a symbol as the argument. When the export symbol import step 2130 is called from another program with the identifier of a symbol as the argument, in the export symbol import step 2130, the identifier of the symbol is received from the other program, an identifier that matches the received identifier is retrieved from the export symbol reference table 2140, an absolute address corresponding to the retrieved identifier is fetched, and the fetched absolute address is output to the other program.

2.1.2.4. Program A 1120

The program A 1120 is the same as in FIG. 1, so that no more explanation will be given in the present embodiment.

2.1.3. ROM-B 1102

The ROM-B 1102 is the same as in FIG. 1, so that no more explanation will be given in the present embodiment.

2.1.4. RAM 2103

The RAM 2103 is composed of a readable/writeable semiconductor memory. In the storage area of the RAM 2103, a jump table 1170, an export symbol reference table 2140, data A 1140, and data B 1150 are stored.

2.1.4.1. Jump Table 1170

The jump table 1170 is the same as in FIG. 1, so that no more explanation will be given in the present embodiment.

Figure 12:
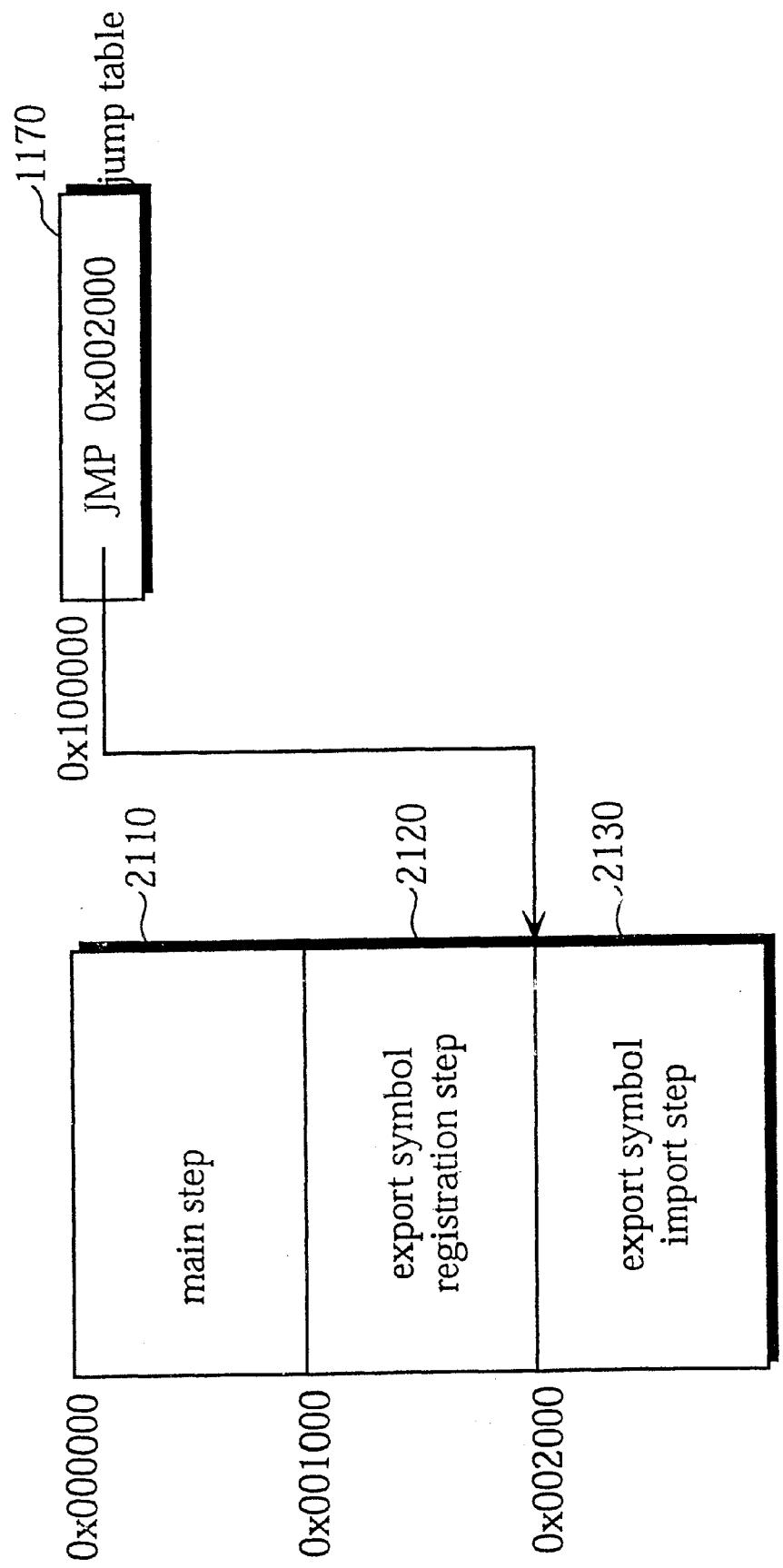
FIG. 12 shows the arrangement of a jump table and an export symbol import step by the program linking apparatus 2000.

The arrangement of the jump table 1170 and the export symbol import step 2130 is shown in FIG. 12.

As shown in FIG. 12, a jump command "JMP 0X002000" is stored in the jump table 1170. Here, the character string "0X002000" indicates the absolute address of the area where the export symbol import step 2130 is stored.

2.1.4.2. Export Symbol Reference Table 2140

The export symbol reference table 2140 is stored in the address space from the area indicated by the absolute address "0X101000".

As shown in FIG. 13, the export symbol reference table 2140 has an area in which a plurality of sets of a symbol identifier 2141 and an absolute address 2142, where the corresponding symbol is stored, is stored.

2.1.4.3. Data A 1140

The data A 1140 is the same as in the first embodiment, so that no more explanation will be given in the present embodiment.

2.1.4.4. Data B 1150

The data B 1150 is the same as in the first embodiment, so that no more explanation will be given in the present embodiment.

2.2. Operations by Program Linking Apparatus 2000

2.2.1. Operations by CPU 2105

Operations by the CPU 2105 are the same as by the CPU 1105 that are shown by the flowchart in FIG. 8, so that no more explanation will be given in the present embodiment.

2.2.2. Operations in Export Symbol Registration Step 2120

Figure 14:
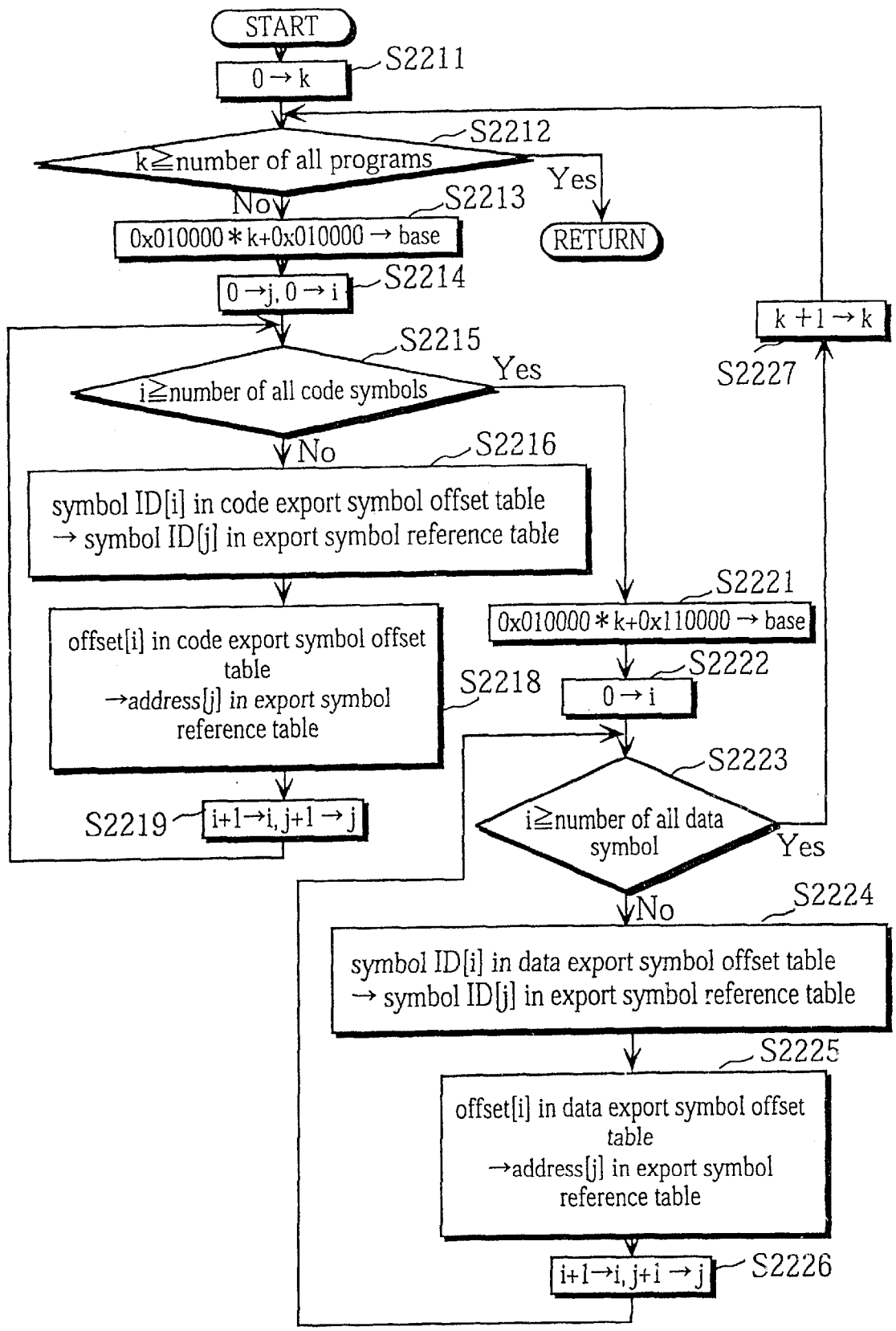
FIG. 14 is a flowchart illustrating operations in an export symbol registration step by the program linking apparatus 2000.

An explanation of operations in the export symbol registration step 2120 will be given with reference to the flowchart shown in FIG. 14.

In the export symbol registration step 2120, the value "0" is substituted into a number "k" that identifies a program (step s2211), and the number "k" is compared with the number of all the programs. When the number "k" is equal to or larger than the number of the programs (step s2212), the processing ends and returns to the program that called the export symbol registration step 2120.

On the other hand, when the number "k" is no greater than the number of the programs (step s2212), values "0X010000*k", and "0X010000" are added together, and the result of the addition is substituted into a variable "base" (step s2213). Then, the value "0" is substituted into a number "i", which identifiers a symbol, and the value "0" is substituted into a variable "j", which indicates the number of the export symbol reference table (step s2214).

At step s2215, the number "i" is compared with the number of all the code symbols. When the number "i" is equal to or greater than the number of the code symbols, the control is transferred to step s2221.

On the other hand, when the number "i" is no greater than the number of the code symbols (step s2215), the "i"th identifier in the code export symbol offset table is substituted into the "j"th identifier in the export symbol reference table (step s2216). Then, the "i"th offset in the code export symbol offset table and the variable "base" that has been calculated are added together, the result of the addition is substituted into the "j"th absolute address in the export symbol reference table (step s2218), and the value "1" is added to the number "i" and the variable "j" (step s2219). Then, the control is returned to step s2215, and the substitution of an identifier and an absolute address in the export symbol reference table is performed for each of the code symbols in the program.

Meanwhile, when the number "i" is equal to or greater than the number of all the code symbols (step s2215), values "0X010000*k" and "0X110000" are added together, the result of the addition is substituted into the variable "base" (step s2221), and the value "0" is substituted into the number "i" (step s2222).

At step s2223, when the number "i" is equal to or greater than the number of all the data symbols, the value "1" is added to the number "k" (step s2227), and the control is returned to step s2212. Then, the substitution of an identifier and an absolute address is performed in the export symbol reference table for each of the code symbols and data symbols in each of the programs.

On the other hand, the number "i" is no greater than the number of the data symbols (step s2223), the "i"th identifier in the data export symbol offset table is substituted into the "j"th identifier in the export symbol reference table (step s2224). Then, the "i"th offset in the data export symbol offset table and the variable "base" that has been calculated are added together, the result of the addition is substituted into the "j"th absolute address in the export symbol reference table (step s2225), and the value "1" is added to the number "i" and the variable "j" (step s2226). Then, the control is returned to step s2223, and the substitution of an identifier and an absolute address is performed in the export symbol reference table for each of the data symbols in the program.

2.2.3. Operations in Export Symbol Import Step 2130

Figure 15:
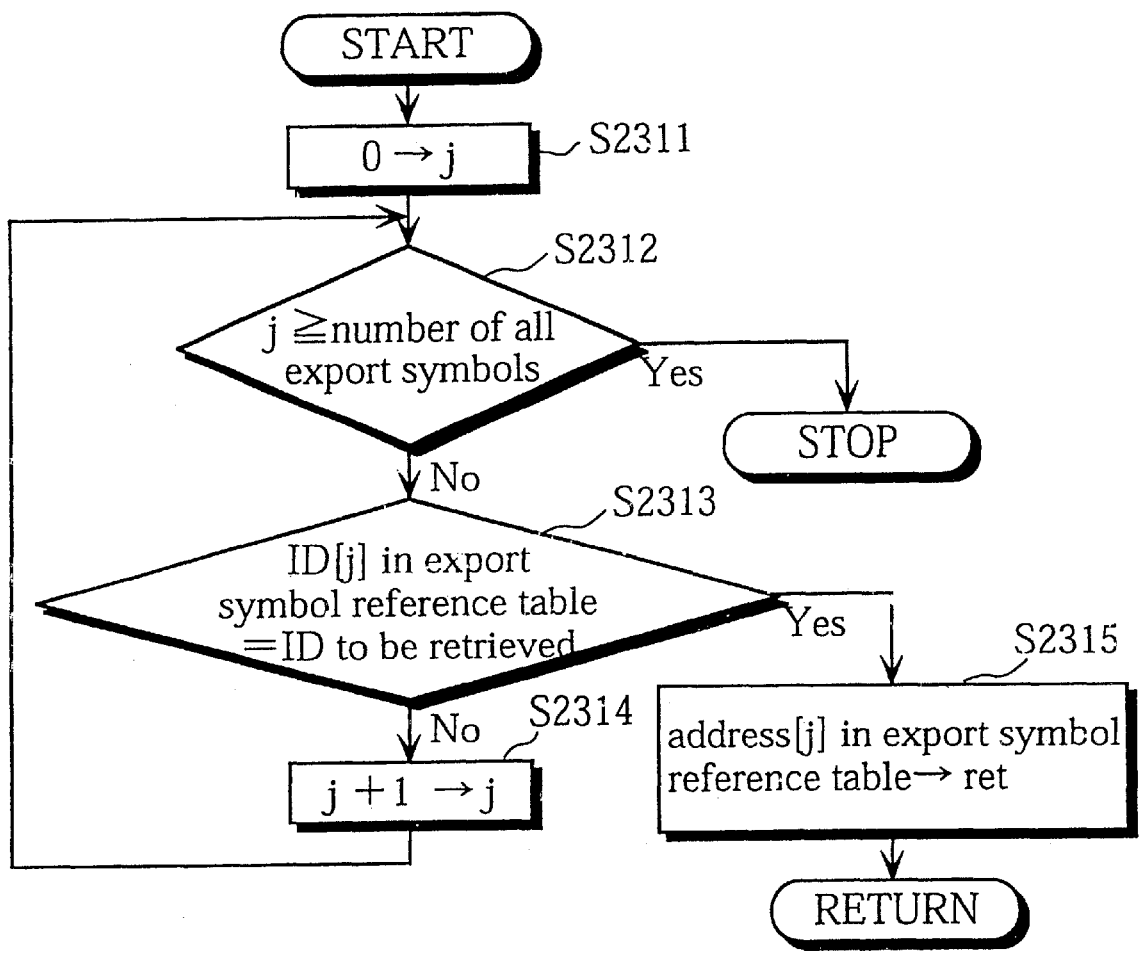
FIG. 15 is a flowchart illustrating operations in the export symbol import step by the program linking apparatus 2000.

An explanation of operations in the export symbol import step 2130 will be given with reference to the flowchart shown in FIG. 15.

In the export symbol import step 2130, the value "0" is substituted into a variable "j", which indicates the number of an identifier in the export symbol reference table (step s2311), and the variable "j" is compared with the number of all the export symbols. When the variable "j" is equal to or greater than the number of all the export symbols, no identifier was found (step s2312), an error arises, and the processing ends.

On the other hand, when the variable "j" is no greater than the number of the export symbols (step s2312), the identifier to be retrieved is compared with the "j"th identifier in the export symbol reference table. When the two identifiers are the same one (step s2313), the "j"th address in the export symbol reference table is substituted into a variable "ret" (step s2315), and the processing returns to the program that has called the export symbol import step 2130 with the variable "ret".

Meanwhile, when the identifier to be retrieved is not the same as the "j"th identifier in the export symbol reference table (step s2313), the value "1" is added to the variable "j" (step s2314), and the control is transferred to step s2312. The processing is repeated until an identifier that matches the identifier to be retrieved is found in the export symbol reference table.

2.3. Summary

As has been described, each of the programs and the data is stored in a predetermined location, the offsets of the symbols are stored in the programs, and the offset that have been stored are converted into absolute addresses using a predetermined standard for all the symbols, the absolute addresses are stored along with the identifiers of the symbols, and a corresponding absolute addresses that has been stored is read whenever a symbol is called, so that linkage between programs can be realized via the symbol according to the present embodiment.

As a result, programs need not to store the absolute addresses in themselves, so that the programs recorded in a ROM are independent of the memory map of an embedded microcomputer control system and can be shared by another system having a different memory map.

In addition, symbol offsets do not need to be converted into absolute addresses whenever the export symbol import step is called unlike the first embodiment, so that the operations in the export symbol import step can be sped up in the present embodiment.

3. The Third Embodiment

An explanation of a program linking apparatus 3000 as one embodiment of the present invention will be given below.

3.1. Structure of Program Linking Apparatus 3000

Figure 16:
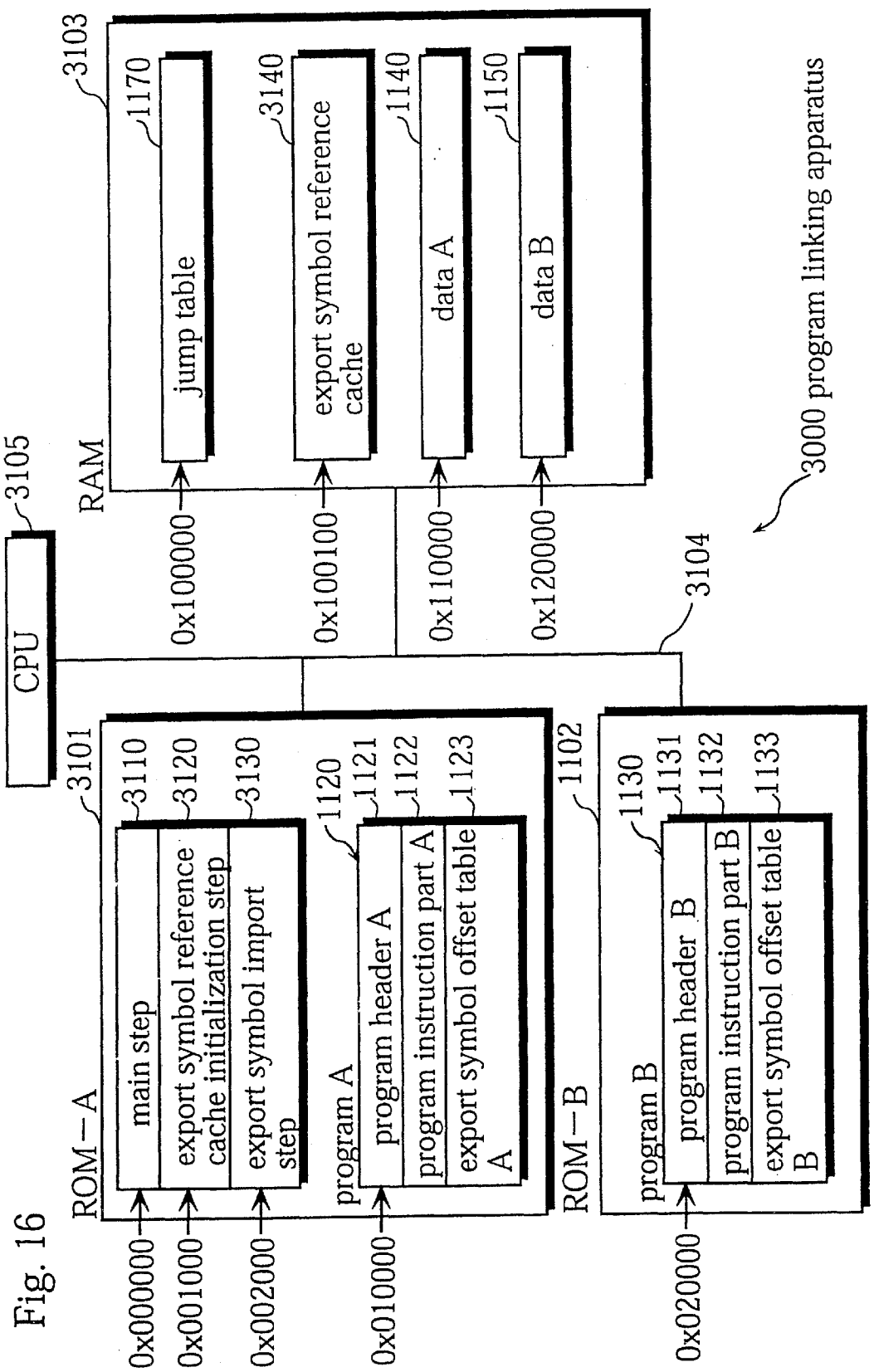
FIG. 16 is a block diagram showing the structure of a program linking apparatus 3000 according to the third embodiment of the present invention.

As shown in FIG. 16, the program linking apparatus 3000 includes a CPU 3105, a ROM-A 3101, a ROM-B 1102, and a RAM 3103.

The ROM-A 3101, the ROM-B 1102, the RAM 3103, and the CPU 3105 are connected with each other by a CPU bus 3104.

The storage areas of the ROM-A 3101, the ROM-B 1102, and the RAM 3103 are located in one address space as in the case of the first embodiment. As a result, the CPU 3105 can access to data stored in the ROM-A 3101, the ROM-B 1102, and the RAM 3103 using one kind of address.

The elements given the same reference numbers as in the first embodiment have the same functions as in the first embodiment. For these elements, no more explanations will given below. The descriptions given below will focus on differences from the first embodiment.

3.1.1. CPU 3105

As in the case of the CPU 1105, the CPU 3105 is a semiconductor device that includes a register, an arithmetic circuit, and a control circuit, and the CPU 3105 decodes commands, performs arithmetic, communicates data between storage devices, performs control, and the like.

The CPU 3105 reads commands stored in the ROM-A 3101, the ROM-B 1102, and the RAM 3103, decodes the read commands, and executes the decoded commands. The CPU 3105 reads data stored in the ROM-A 3101, the ROM-B 1102, and the RAM 3103, and writes data in the RAM 3103.

3.1.2. ROM-A 3101

The ROM-A 3101 is composed of a read only semiconductor memory. In the storage space of the ROM-A 3101, a main step 3110, an export symbol reference cache initialization step 3120, an export symbol import step 3130, and a program A 1120 are recorded.

3.1.2.1, Main Step 3110

The main step 3110 is located in the address space rom the area indicated by the absolute address "0X000000".

Figure 17:
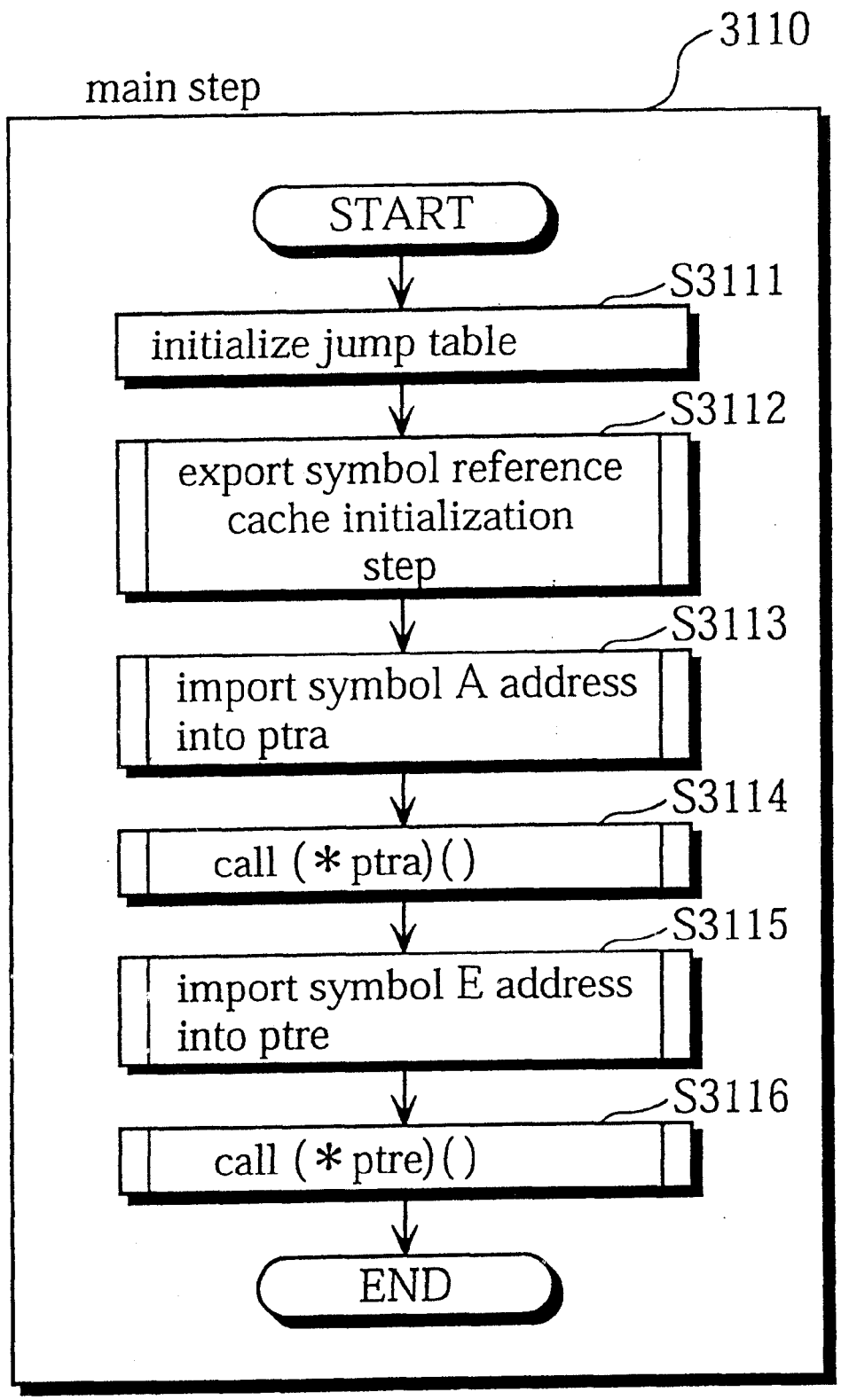
FIG. 17 is a flowchart illustrating the procedure of operations in the main step by the program linking apparatus 3000.

As shown by the flowchart in FIG. 17, the main step 3110 includes procedures given below. A jump command to the export symbol import step 3130 is stored in a jump table 1170 (step s3111). The export symbol reference cache initialization step 3120 is called and executed (step s3112). The export symbol import step 3130 is called with the identifier "ID-A" of a symbol A as the argument, the absolute address where the symbol A is stored is calculated, the absolute address where the symbol A is stored is stored in a variable "ptra" (step s3113), and the symbol A is called using the variable "ptra" (step s3114). The export symbol import step 3130 is called with the identifier "ID-E" of a symbol E as the argument, the absolute address where the symbol E is stored is calculated, the absolute address where the symbol E is stored is stored in a variable "ptre" (step s3115), and the symbol E is called using the variable "ptre" (step s3116).

As in the case of the first embodiment, the main step 3110 aims to execute program blocks that are identified with the symbols A and E.

Given in the first embodiment, more detailed explanations of the symbols A and E, identifiers "ID-A" and "ID-E", and program blocks that are identified with symbols A and E will not be given in the present embodiment.

3.1.2.2. Export Symbol Reference Cache Initialization Step 3120

In the export symbol reference cache initialization step 3120, an export symbol reference cache 3140, which will be described later, will be initialized.

More specifically, in the export symbol reference cache initialization step 3120, null values are set for all the identifiers in a symbol ID storage unit of the export symbol reference cache 3140.

3.1.2.3. Export Symbol Import Step 3130

The export symbol import step 3130 is located in the address space from the area indicated by an absolute address "0X002000".

The export symbol import step 3130 is called from another program with the identifier of a symbol as the argument. When the export symbol import step 3130 is called from another program with the identifier of a symbol as the argument, in the export symbol import step 3130, the identifier of the symbol is received from the other program, an identifier that matches the received identifier is retrieved from the export symbol reference ache 3140, an absolute address corresponding to the retrieved identifier is fetched, and the fetched absolute address is output to the other program.

Figure 9:
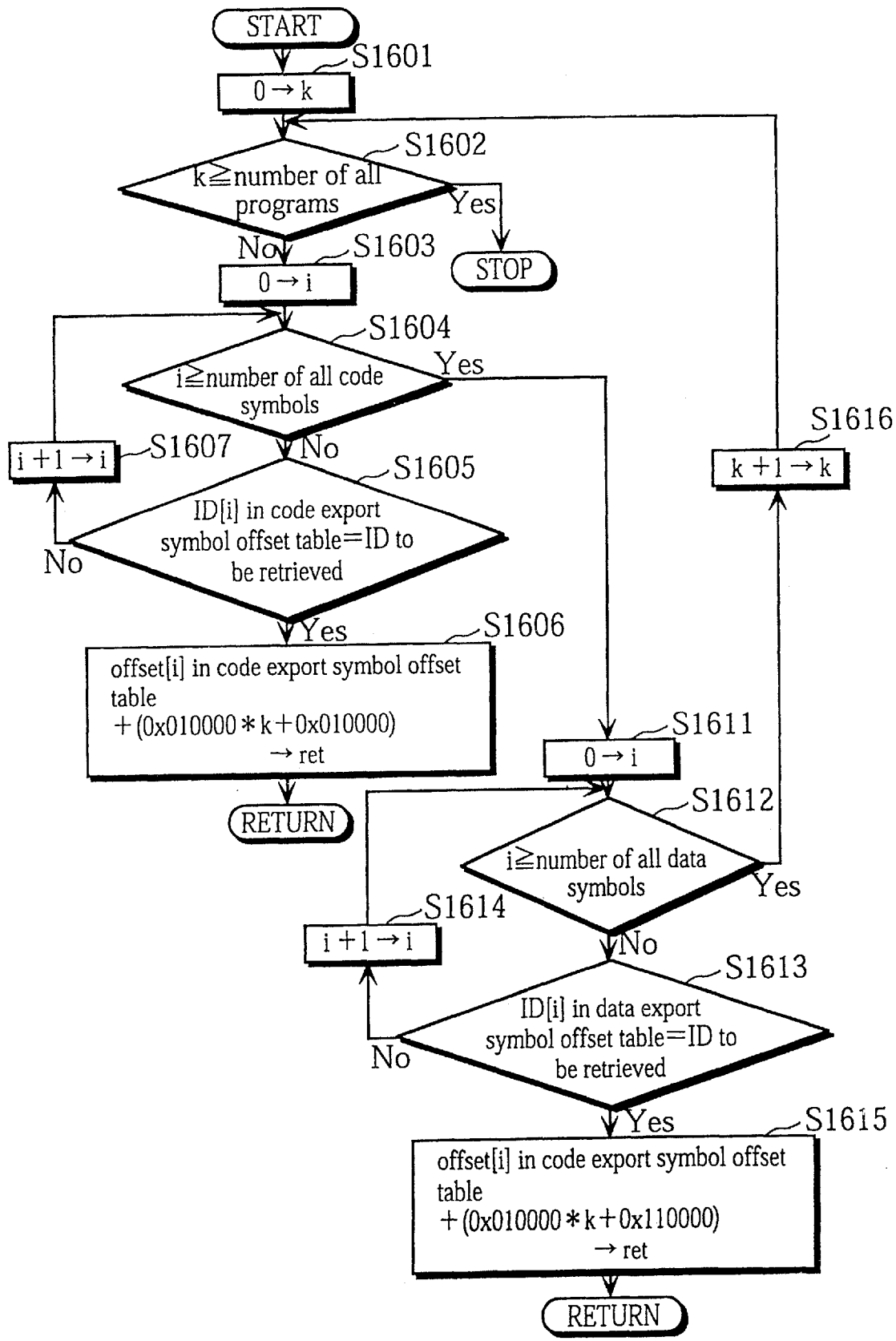
FIG. 9 is a flowchart illustrating operations in the export symbol import step by the program linking apparatus 1000.

In the export symbol import step 3130, when the identifier of the received symbol is not found in the export symbol reference cache 3140, the export symbol import step 1160 shown in FIG. 9 in the first embodiment is executed, and the absolute address where the received symbol is stored is created. Then, the identifier of the received symbol and the created absolute address are written in the export symbol reference cache 3140, and the created absolute address is returned to the program that has called the export symbol import step 3130.

3.1.2.4. Program A 1120

The program A 1120 is the same as in FIG. 1, so that no more explanation will be given in the present embodiment.

3.1.3. ROM-B 1102

The ROM-B 1102 is the same as in FIG. 1, so that no more explanation will be given in the present embodiment.

3.1.4. RAM 3103

The RAM 3103 is composed of a readable/writeable semiconductor memory. In the storage area of the RAM 3103, a jump table 1170, an export symbol reference cache 3140, data A 1140, and data B 1150 are stored.

3.1.4.1. Jump Table 1170

The jump table 1170 is the same as in FIG. 1, so that no more explanation will be given in the present embodiment.

Figure 18:
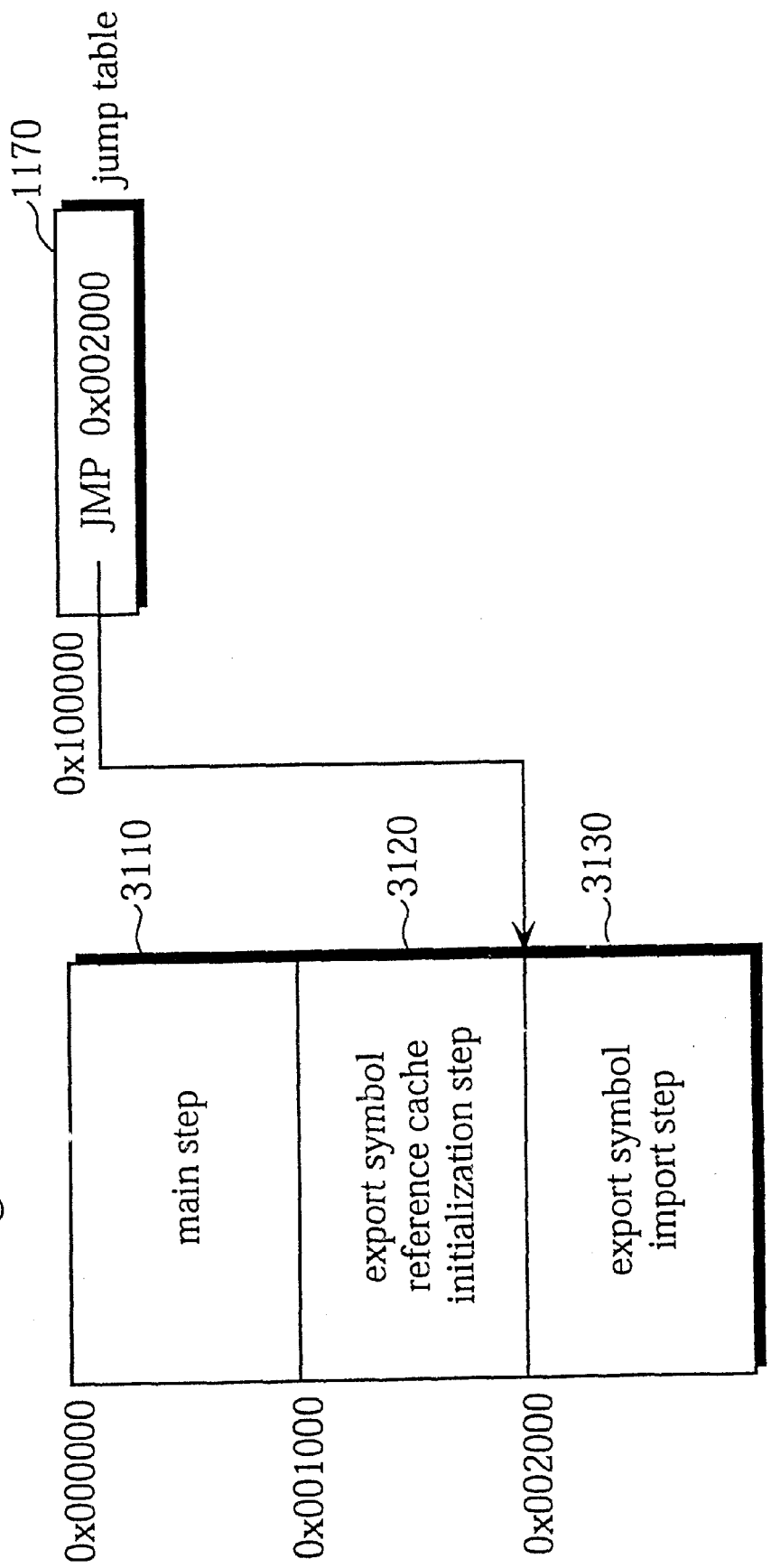
FIG. 18 shows the arrangement of a jump table and an export symbol import step by the program linking apparatus 3000.

The arrangement of the jump table 1170 and the export symbol import step 3130 is shown in FIG. 18.

As shown in FIG. 18, a jump command "JMP 0X002000" is stored in the jump table 1170. Here, the character. string "0X002000" indicates the absolute address of the area where the export symbol import step 3130 is stored.

3.1.4.2. Export Symbol Reference Cache 3140

The export symbol reference cache 3140 is stored in the address space from the area indicated by the absolute address "0X100100".

Figure 19:
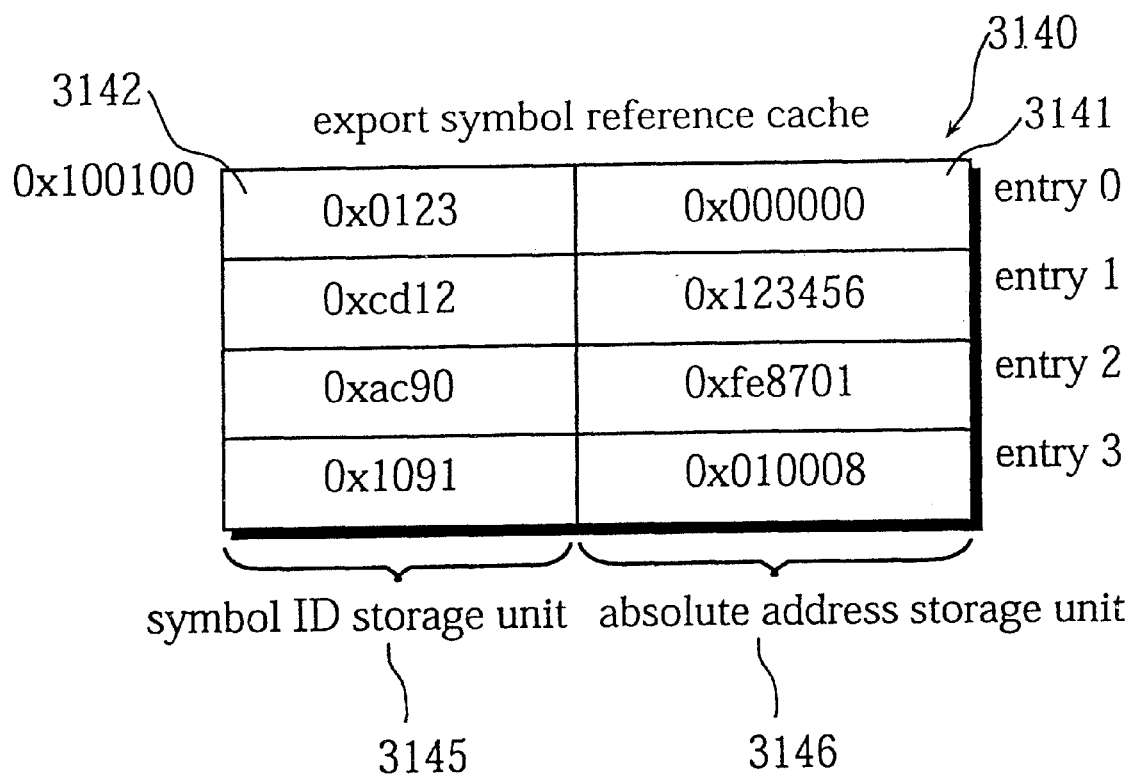
FIG. 19 shows an example of the structure of an export symbol reference cache in the program linking apparatus 3000.

As shown in FIG. 19, the export symbol reference cache 3140 has an area in which four entries, each of which includes the identifier and the absolute address of a symbol. The four entries are called an entry "0", an entry "1", an entry "2", and an entry "3" in order from the top. In FIG. 19, a symbol identifier of the entry "0" is stored in an area 3142, and a symbol absolute address of the entry "0" is stored in an are 3141.

FIG. 19 shows the export symbol reference cache 3140 before the initialization of the areas where symbol identifiers are stored. Undefined values are stored in the areas where the symbol identifiers and the symbol absolute addresses of the entries are stored.

Figure 20:
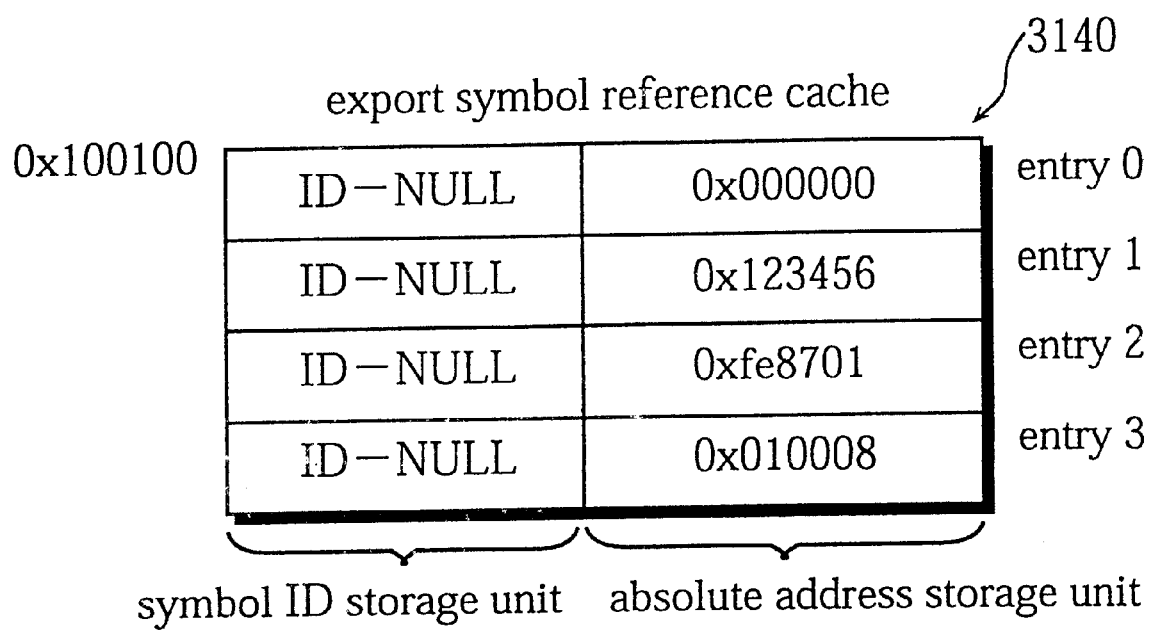
FIG. 20 shows an example of the structure of the export symbol reference cache in the program linking apparatus 3000 when the export symbol reference cache is initialized.

FIG. 20 shows the export symbol reference cache 3140 just after the areas of symbol identifiers have been initialized in the export symbol reference cache initialization step 3120. As shown in FIG. 20, null values are stored in the areas where symbol identifiers are to be stored, and undefined values are stored in the areas where symbol absolute addresses are to be stored. Note that a character string "ID-NULL" indicates a null value in FIG. 20.

Figure 21:
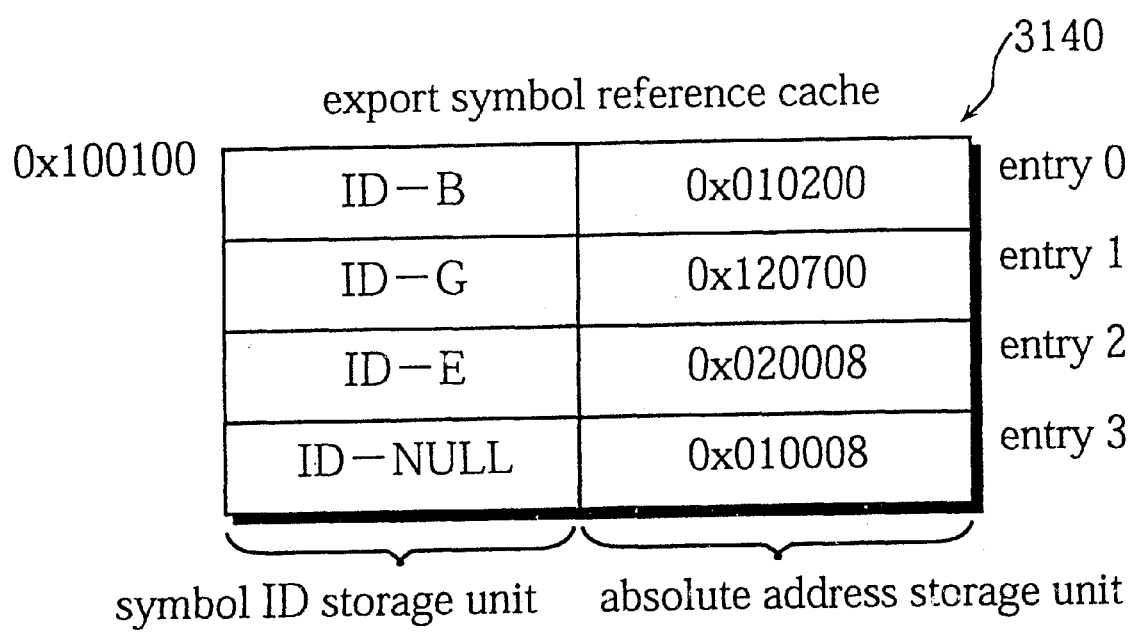
FIG. 21 shows an example of the structure of the export symbol reference cache in the program linking apparatus 3000 when data is written in the export symbol reference cache.

FIG. 21 shows the export symbol reference cache 3140 where symbol identifiers and absolute addresses have been written in the export symbol import step 3130. In FIG. 21, the identifier of the symbol B "ID-B" is stored in the area of the symbol identifier of the entry "0", and the absolute address "0X010200" of the symbol B is stored in the area of the absolute address of the entry "0". The identifier of the symbol G "ID-G" is stored in the area of the symbol identifier of the entry "1", and the absolute address "0X120700" of the symbol G is stored in the area of the absolute address of the entry "1". The identifier of the symbol E "ID-E" is stored in the area of the symbol identifier of the entry "2", and the absolute address "0X020008" of the symbol E is stored in the area of the absolute address of the entry "2". The absolute address "0X010008" is stored in the area of the absolute address of the entry "3", and a null value is stored in the area of the symbol identifier of the entry "3", so that the entry "3" is not used.

3.1.4.3. Data A 1140

The data A 1140 is the same as in the first embodiment, so that no more explanation will be given in the present embodiment.

3.1.4.4. Data B 1150

The data B 1150 is the same as in the first embodiment, so that no more explanation will be given in the present embodiment.

3.2. Operations by Program Linking Apparatus 3000

3.2.1. Operations by CPU 3105

Operations by the CPU 3105 are the same as by the CPU 1105 that are shown by the flowchart in FIG. 8, so that no more explanation will be given in the present embodiment.

3.2.2, Operations in Export Symbol Reference Initialization Step 3120

Figure 22:
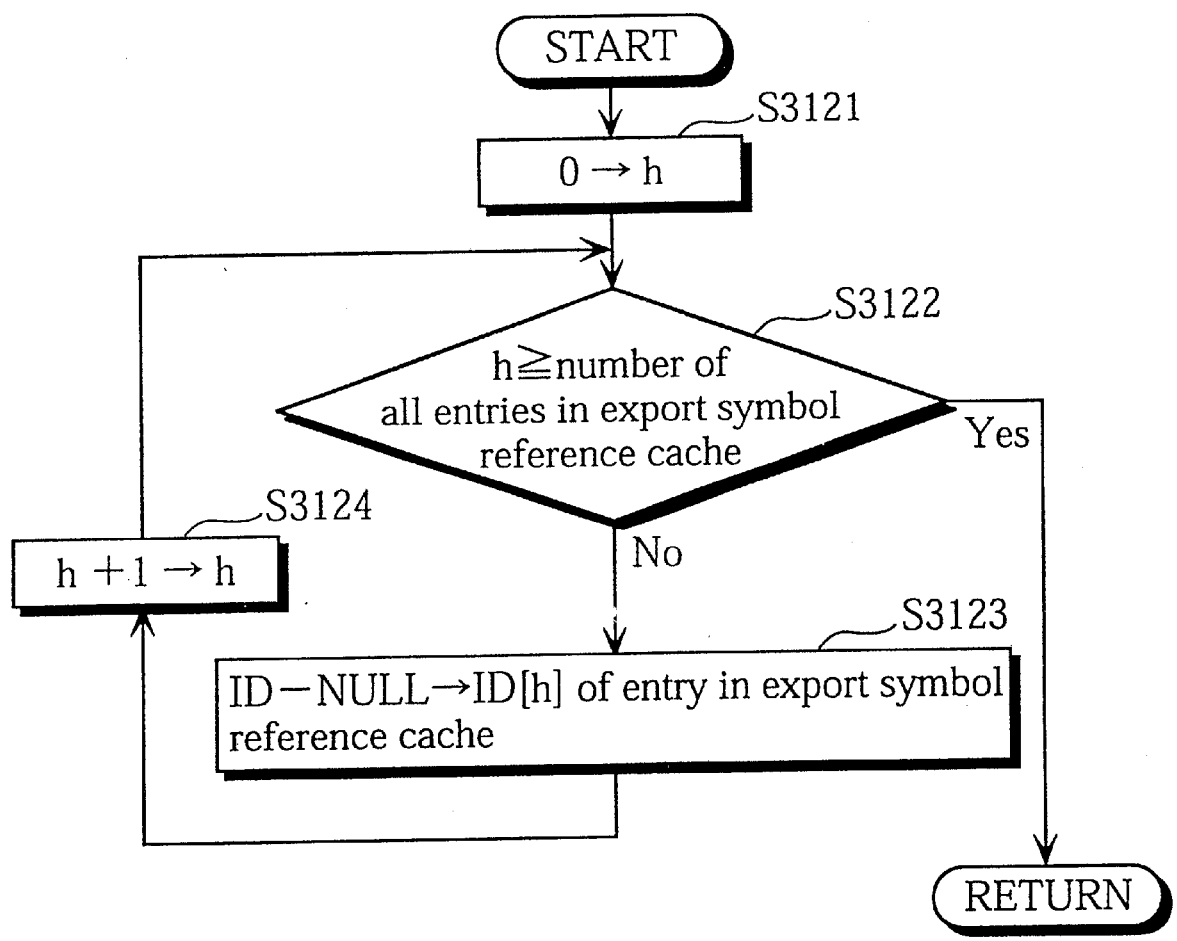
FIG. 22 is a flowchart illustrating operations in an export symbol reference cache initialization step by the program linking apparatus 3000.

An explanation of operations in the export symbol reference initialization step 3120 will be given with reference to the flowchart shown in FIG. 22.

In the export symbol reference initialization step 3120, the value "0" is substituted into a variable "h" that indicates an entry number of the export symbol reference cache 3140 (step s3121). When the variable "h" is equal to or larger than the number of all the entry numbers (step s3122), the control is returned to the program that has called the export symbol reference cache initialization step 3120.

On the other hand, when the variable "h" is no greater than the entry numbers (step s3122), a null value is stored in the area of the symbol identifier of the "h"th entry in the export symbol reference cache 3140 (step s3123). Then, the value "1" is added to the variable "h" (step s3124), and the control is returned to step s3122. A null value is stored in each area of symbol identifier.

3.2.3 Operations in Export Symbol Import Step 3130

Figure 23:
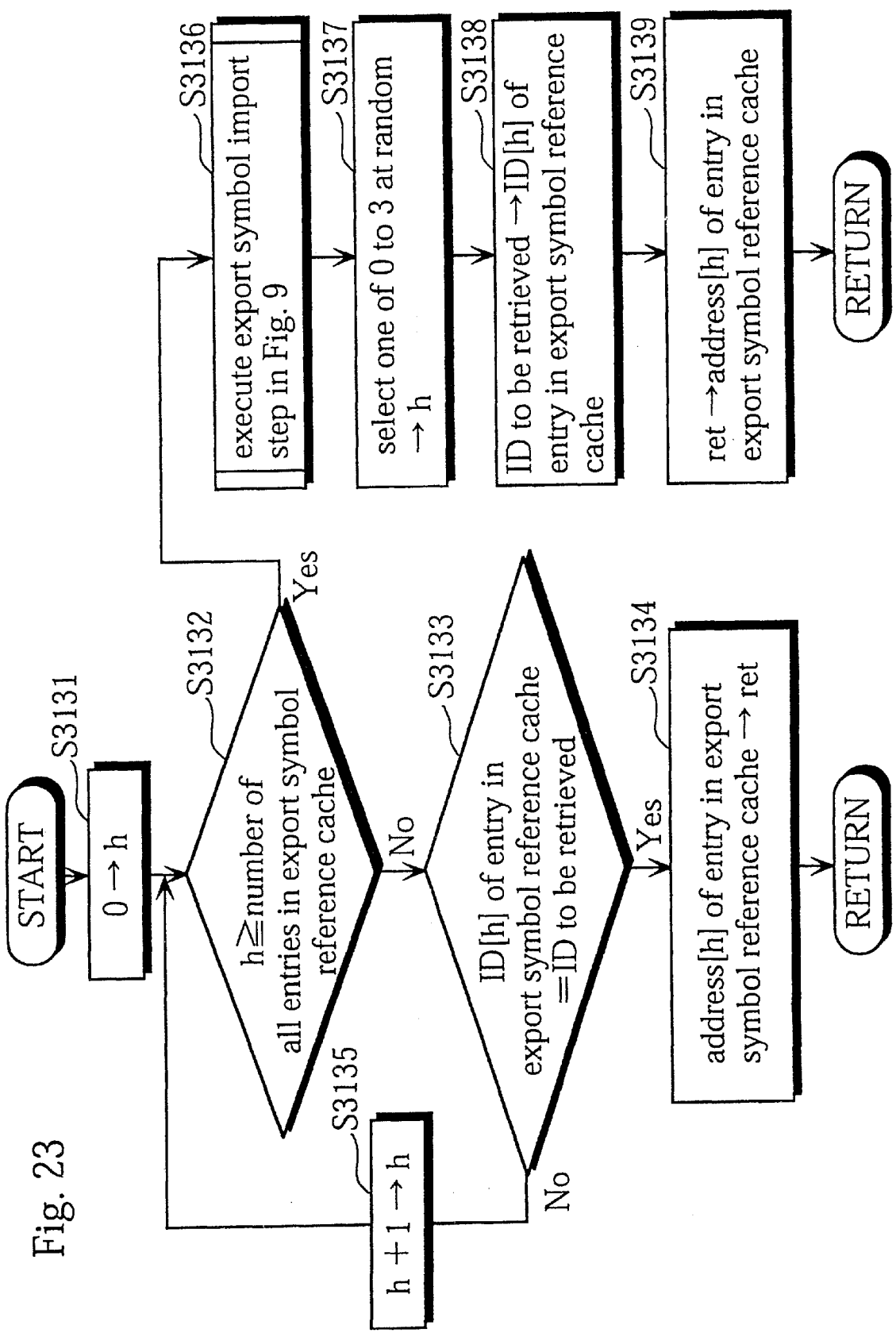
FIG. 23 is a flowchart illustrating operations in the export symbol import step by the program linking apparatus 3000.

An explanation of operations in the export symbol import step 3130 will be given with reference to the flowchart shown in FIG. 23.

In the export symbol import step 3130, the value "0" is substituted into the variable "h", which indicates an entry number in the export symbol reference cache 3140 (step s3131). When the variable "h" is equal to or greater than the number of all the entries (step s3132), the control is transferred to step s3136.

On the other hand, when the variable "h" is no greater than the number of the entries (step s3132), and when the identifier to be retrieved and the identifier of the "h"th entry are the same one (step s3133), the absolute address of the "h"th entry in the export symbol reference cache 3140 is returned to the program that has called the export symbol import step 3130, and the processing ends (step s3134).

On the other hand, when the identifier to be retrieved and the identifier of the "h"th entry are not the same one (step s3133), the value "1" is added to the variable "h" (step s3135), and the control is returned to step s3132.

Meanwhile, when the variable "h" is equal to or greater than the number of entries in the export symbol reference cache 3140 (step s3132), the export symbol import step 1160 of the first embodiment shown in FIG. 9 is executed to create the absolute address where the symbol to be retrieved is stored (step s3136). Then, one of the numbers "0" to "3" is selected at random, the elected number is substituted into the variable "h" (step s3137), and the identifier of the symbol to be retrieved is stored in the area of the symbol identifier of the "h"th entry in the export symbol reference cache 3140 (step s3138). The created absolute address is stored in the area of the absolute address of the "h"th entry in the export symbol reference cache 3140 (step s3139).

3.3. Summary

As has been described, each of the programs and the data is stored in a predetermined location, the offsets of the symbols are stored in the programs, and an export symbol reference cache having a predetermined number of entries is included. In addition, an absolute address of each symbol is created using a predetermined standard and the identifier of the called symbol and the created address are written in the export symbol reference cache whenever a symbol is called. As a result, when a symbol that has been referred to is referred to again, linkage between programs can be realized via the symbol using the absolute address that has been stored in the export symbol reference cache according to the present embodiment.

Accordingly, programs need not to store the absolute addresses in themselves, so that the programs recorded in a ROM are independent of the memory map of an embedded microcomputer control system and can be shared by another system having a different memory map.

In addition, the sets of the export symbols and the corresponding addresses are not stored in the memory unlike the second embodiment, so that the size of the memory can be reduced and the operations in the export symbol import step can be sped up in the present embodiment.

4. The Fourth Embodiment

An explanation of a program linking apparatus 4000 as one embodiment of the present invention will be given below.

4.1. Structure of Program Linking Apparatus 4000

Figure 24:
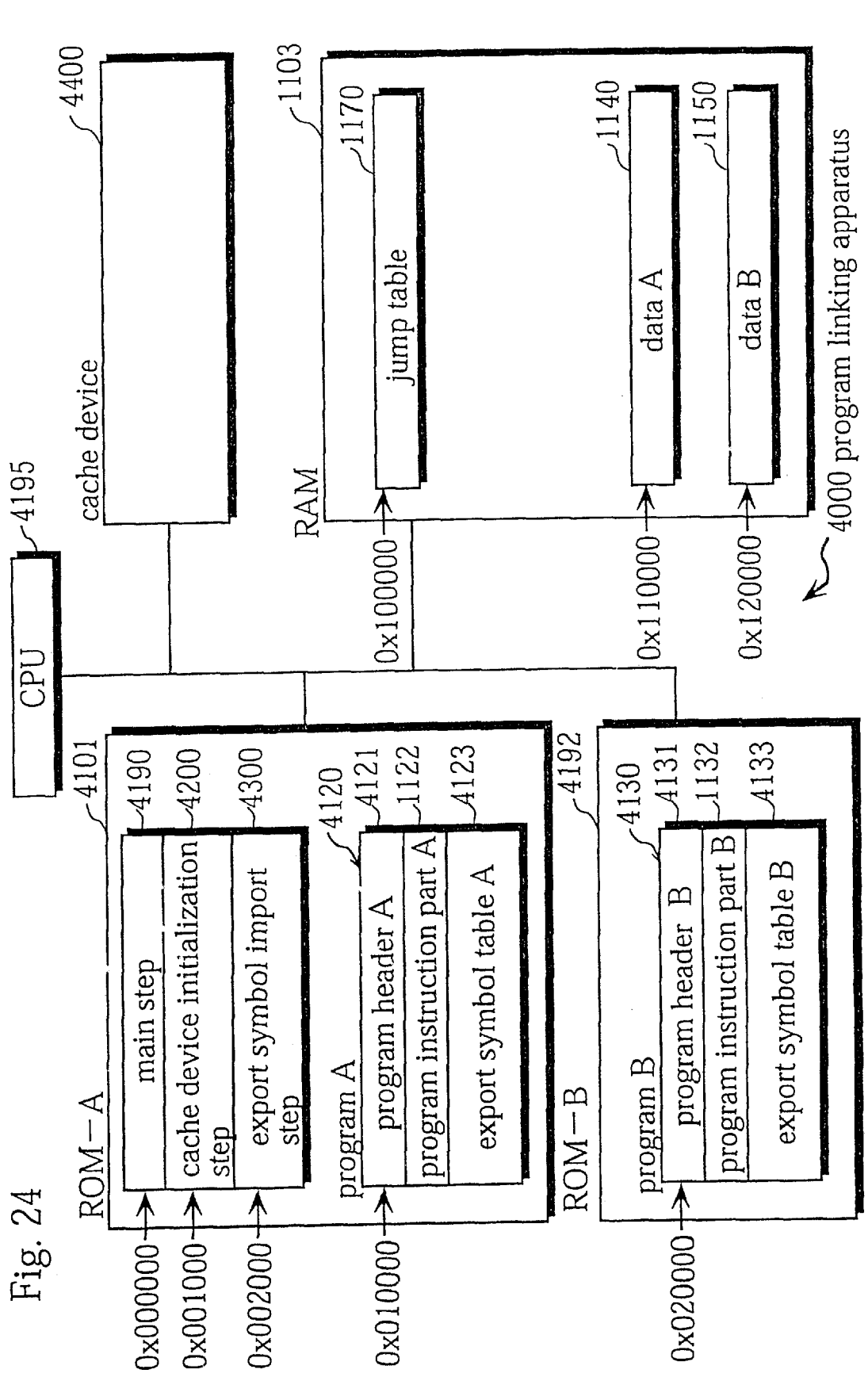
FIG. 24 is a block diagram showing the structure of a program linking apparatus 4000 according to the fourth embodiment of the present invention.

As shown in FIG. 24, the program linking apparatus 4000 includes a CPU 4195, a ROM-A 4101, a ROM-B 4192, a cache device 4400, and a RAM 1103.

The ROM-A 4101, the ROM-B 4192, the cache device 4400, the RAM 1103, and the CPU 4195 are connected with each other by a CPU bus 4194.

The storage areas of the ROM-A 4101, the ROM-B 4192, and the RAM 1103 are located in one address space as in the case of the first embodiment. As a result, the CPU 4195 can access to data stored in the ROM-A 4101, the ROM-B 4192, and the RAM 4103 using one kind of address.

The elements given the same reference numbers as in the first embodiment have the same functions as in the first embodiment. For these elements, no more explanations will given below. The descriptions given below will focus on differences from the first embodiment.

4.1.1. CPU 4195

As in the case of the CPU 1105, the CPU 4195 is a semiconductor device that includes a register, an arithmetic circuit, and a control circuit, and the CPU 4195 decodes commands, performs arithmetic, communicates data between storage devices, performs control, and the like.

The CPU 4195 reads commands stored in the ROM-A 4101, the ROM-B 4192, and the RAM 1103, decodes the read commands, and executes the decoded commands. The CPU 4195 reads data stored in the ROM-A 4101, the ROM-B 4192, and the RAM 1103, and writes data in the RAM 1103.

4.1.2. ROM-A 4101

The ROM-A 4101 is composed of a read only semiconductor memory. In the storage space of the ROM-A 4101, a main step 4190, a cache device initialization step 4200, an export symbol import step 4300, and a program A 4120 are recorded.

4.1.2.1. Main Step 4190

The main step 4190 is located in the address space from the area indicated by the absolute address "0X000000".

Figure 25:
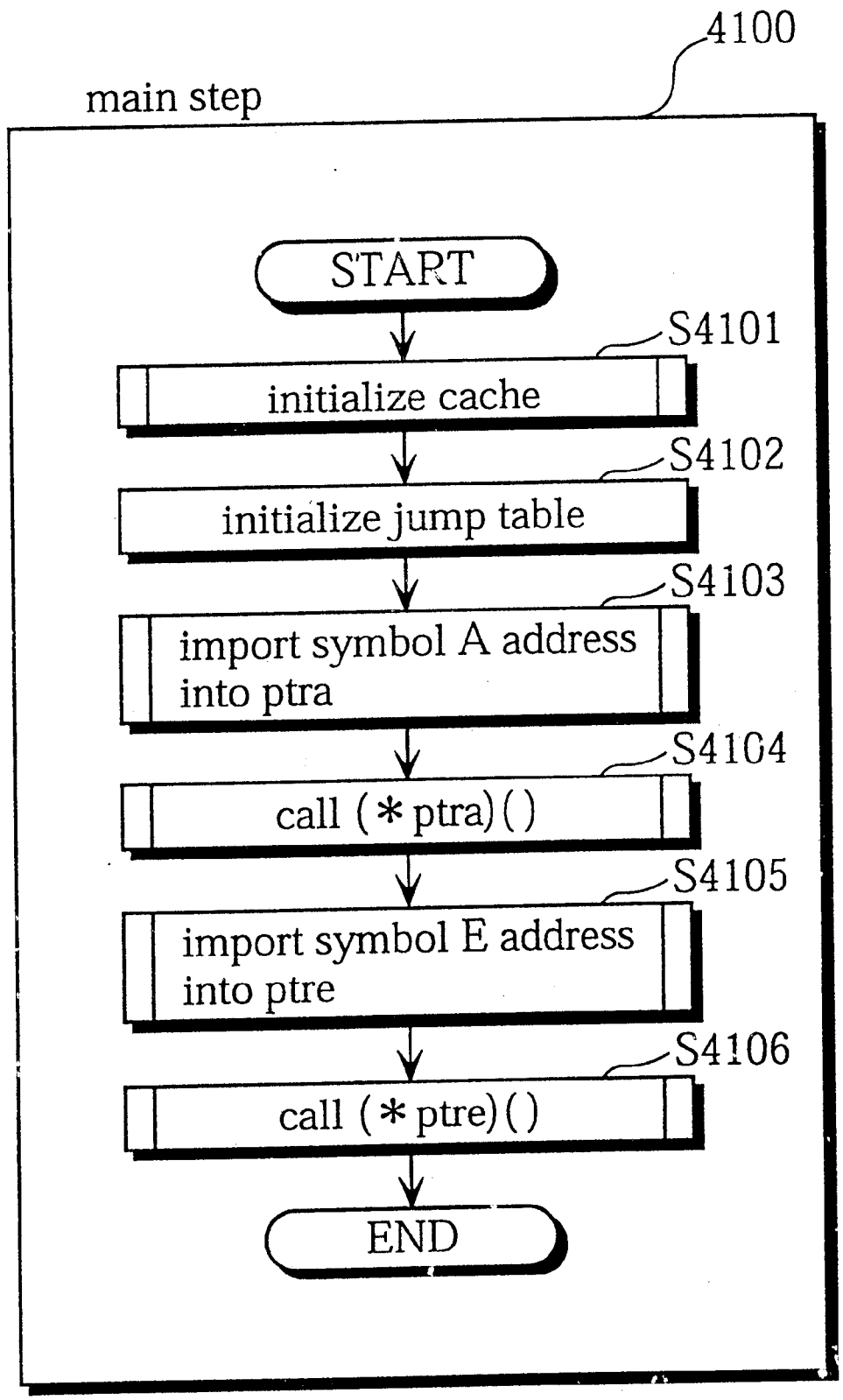
FIG. 25 is a flowchart illustrating the procedure of operations in the main step by the program linking apparatus 4000.

As shown by the flowchart in FIG. 25, the main step 4190 includes procedures given below. The cache device 4400 is initialized (step s4101), a jump command to the export symbol import step 4300 is stored in a jump table 1170 (step s4102). The export symbol import step 4300 is called with the identifier "ID-A" of a symbol A as the argument, the absolute address where the symbol A, is stored is calculated, the absolute address where the symbol A is stored is stored in a variable "ptra" (step s4103), and the symbol A is called using the variable "ptra" (step s4104). The export symbol import step 4300 is called with the identifier "ID-E" of a symbol E as the argument, the absolute address where the symbol E is stored is calculated, the absolute address where the symbol E is stored is stored in a variable "ptre" (step s4105), and the symbol E is called using the variable "ptre" (step s4106).

As in the case of the first embodiment, the main step 4190 aims to execute program blocks that are identified with the symbols A and E.

Given in the first embodiment, more detailed explanations of the symbols A and E, identifiers "ID-A" and "ID-E", and program blocks that are identified with symbols A and E will not be given in the present embodiment.

4.1.2.2. Cache Device Initialization Step 4200

The cache device initialization step 4200 is located in the address space from the area indicated by the absolute address "0X001000".

In the cache device initialization step 4200, the cache device 4400 is initialized.

More specifically, in the cache device initialization step 4200, all the cache effectiveness flags 4402 in a cache tag unit 4410 of the cache device 4400 are set as "void".

4.1.2.3. Export Symbol Import Step 4300

The export symbol import step 4300 is located in the address space from the area indicated by an absolute address "0X002000".

The export symbol import step 4300 is called from another program with the identifier of a symbol as the argument. When the export symbol import step 4300 is called from another program with the identifier of a symbol as the argument, in the export symbol import step 4300, the identifier of the symbol is received from the other program, an identifier that matches the received identifier is retrieved from an export symbol ID table, and an address flag corresponding to the retrieved identifier is fetched.

In the export symbol import step 4300, when the fetched address flag indicates "offset" and the data flag in the export symbol ID table indicates "code", an absolute address is calculated according to an Expression 3.

absolute address=data in export symbol address information table+ 0$X$010000*$k$+0$X$010000     (Expression 3)

Here, the coefficient "k" is the number identifying a program. The coefficient "k" is "0" for the program A and "1" for program B.

On the other hand, when the data flag in the export symbol ID table indicates "data", an absolute address is calculated according to an Expression 4.

absolute address=data in export symbol address information table+ 0$X$010000* $k$+0$X$110000     (Expression 4)

In the export symbol import step 4300, the calculated absolute address is returned to the program that has called the export symbol import step 4300.

Then, in the export symbol import step 4300, the calculated absolute address is written as data in the export symbol address information table, and the address flag in the export symbol address information table is set as a flag that indicates "absolute address".

Meanwhile, when the fetched address flag indicates "absolute address", data that is stored in the export symbol address information is fetched, and the fetched data is returned to the program that has called the export symbol import step 4300 as the absolute address in the export symbol import step 4300.

In the export symbol import step 4300, when information recorded in the ROM-A 4101, the ROM-B 4192, and the RAM 1103 is referred to, the absolute address to be referred to is searched for in the cache tag unit of the cache device 4400. When the absolute address is present in the cache tag unit of the cache device 4400, the cache effectiveness flag is referred to. When the cache effectiveness flag is "effective", the content of the corresponding entry is fetched from a cache data unit. On the other hand, when the cache effectiveness flag is "void", the data in the area indicated by the absolute address is fetched from the ROM-A 4101, the ROM-B 4192, or the RAM 1103. Then, the absolute address is written as the address, and a cache effectiveness flag "effective" and a writing presence/absence flag "present" are written in the cache data unit.

Meanwhile, when the absolute address to be referred to is not present in the cache tag of the cache device 4400, the data in the area indicated by the absolute address is fetched from the ROM-A 4101, the ROM-B 4192, or the RAM 1103. Then, the absolute address is written as the address, and a cache effectiveness flag "effective" and a writing presence/absence flag "present" are written in the cache tag in which the cache effectiveness flag is "void". In addition, the fetched data is written in the cache data unit. When the cache effectiveness flag is "effective" for all the entries, one of the entries is selected at random, the absolute address to be referred to is written in the cache tag as the address, a cache effectiveness flag "effective" and a writing presence/absence flag "present" are written in the cache tag for the selected entry, and the fetched data is written in the cache data unit.

In the export symbol import step 4300, when data is written in the cache tag unit and the cache data unit of the cache device 4400, and when the absolute address of the data is present in the cache tag unit, the absolute address of the data, a cache effectiveness flag "effective", a writing presence/absence flag "present", and the data are written in the cache tag.

On the other hand, when the absolute address of the data is absent from the cache tag unit, and when a cache tag in which the cache effectiveness flag is "void" is included in the cache tag unit, the absolute address of the data, a cache effectiveness flag "effective", a writing presence/absence flag "present", and the data are written in the cache tag.

Meanwhile, when no cache tag in which the cache effectiveness flag is "void" is included in the cache tag unit, one of the entries is selected at random, and the absolute address of the data, a cache effectiveness flag "effective", a writing presence/absence flag "present", and the data are written in the cache tag for the selected entry.

4.1.2.4. Program A 4120

The program A 4120 includes a program header A 4121, a program instruction part A 1122, and an export symbol table A 4123 as shown in FIG. 26.

The program A 4120 is located in the address space from the area indicated by the absolute address "0X010000".

(1) Program Header A 4121

The program header A 4121 is located from the top of the program A 4120, and includes an offset 4124, which indicates the location where an export symbol ID table A 4100 starts, and an offset 4125, which indicates the location where an export symbol address information table A 4110 starts, as shown in FIG. 26. Here, an offset is an address with reference to the location where the program A 4120 starts.

As shown in FIG. 26, the offset 4124 is "0X001000", which is the address indicating the starting location of the export symbol ID table A 4100 in the program A 4120, and the offset 4125 is "0X001010", which is the address indicating the starting location of the export symbol address information table A 4110 in the program A 4120.

(2) Program Instruction Part A 1122

The program instruction part A 1122 is the same as in FIG. 3, so that no more explanation will be given in the present embodiment.

(3) Export Symbol Table A 4123

The export symbol table A 4123 includes the export symbol ID table A 4100 and the export symbol address information table A 4110.

The export symbol table A 4123 is located in the address space from the area indicated by an absolute address "0X011000".

(Export Symbol ID Table A 4100)

The export symbol ID table A 4100 is located in the address space from the area indicated by the absolute address "0X011000".

The export symbol ID table A 4100 stores sets of symbol identifiers and code flags, each of which indicates whether the corresponding symbol is a code symbol or a data symbol.

More specifically, the export symbol ID table A 4100 stores a set of the identifier 4101 "ID-A" and the code flag 4102 "code" of the symbol A 1126, a set of the identifier 4103 "ID-B" and the code flag 4104 "code" of the symbol B 1127, a set of the identifier 4105 "ID-C" and the code flag 4106 "data" of the symbol C 1141, and a set of the identifier 4107 "ID-D" and the code flag 4108 "data" of the symbol D 1142 as shown in FIG. 26.

(Export Symbol Address Information Table A 4110)

The export symbol address information table A 4110 is located in the address space from the area indicated by an absolute address "0X011010".

The export symbol address information table A 4110 stores sets of the area addresses of symbols in the program A 4120 and address flags, which each indicates whether the corresponding address is an offset or an absolute address.

Here, an offset is an address with reference to the location where the program A 4120 starts.

More specifically, the export symbol address information table A 4110 stores a set of an address flag 4111, which indicates an offset, and an address 4112, which indicates the offset of the area where the symbol A 1126 is stored, a set of an address flag 4113, which indicates an offset, and an address 4114, which indicates the offset of the symbol B 1127, a set of an address flag 4115, which indicates an offset, and an address 4116, which indicates the offset of the symbol C 1141, and a set of an address flag 4117, which indicates an offset, and an address 4118, which indicates the offset of the area of the symbol D 1142.

4.1.3. ROM-B 4192

The ROM-B 4192 is composed of a react only semiconductor memory. In the storage space of the ROM-B 4192, the program B 4130 is recorded.

4.1.3.1 Program B 4130

The program B 4130 includes a program header B 4131, a program instruction part B 1132, and an export symbol table B 4133 as shown in FIG. 27.

The program B 4130 is located in the address space from the area indicated by the absolute address "0X020000".

(1) Program Header B 4131

The program header B 4131 is located from the top of the program 8 4130, and includes an offset 4134, which indicates the location where the export symbol ID table B 4140 starts, and an offset 4135, which indicates the location where the export symbol address information table B 4150 starts, as shown in FIG. 27. Here, an offset is an address with reference to the location where the program B 4130 starts.

As shown in FIG. 27, the offset 4134 is "0X002000", which is the address indicating the starting location of the export symbol ID table B 4140 in the program B 4130, and the offset 4135 is "0X002010", which is the address indicating the starting location of the export symbol address information table B 4150 in the program B 4130.

(2) Program Instruction Part B 1132

The program instruction part B 1132 is the same as in FIG. 5, so that no more explanation will be given in the present embodiment.

(3) Export Symbol Table B 4133

The export symbol table B 4133 includes the export symbol ID table B 4140 and the export symbol address information table B 4150.

The export symbol table B 4133 is located in the address space from the area indicated by the absolute address "0X022000".

(Export Symbol ID Table B 4140)

The export symbol ID table B 4140 is located in the address space from the area indicated by the absolute address "0X0220000".

The export symbol ID table B 4140 stores sets of the symbol identifiers and code flags, each of which indicates whether the corresponding symbol is a code symbol or a data symbol.

More specifically, the export symbol ID table B 4140 stores a set of the identifier 4141 "ID-E" of the symbol E 1136 and the code flag 4142 "code", a set of the identifier 4143 "ID-F" of the symbol F 1137 and the code flag 4144 "code", a set of the identifier 4145 "ID-G" of the symbol G 1151 and the code flag 4146 "data", and a set of the identifier 4147 "ID-H" of the symbol H 1152 and the code flag 4148 "data" as shown in FIG. 27.

(Export Symbol Address Information Table B 4150)

The export symbol address information table B 4150 is located in the address space from the area indicated by the absolute address "0X022010".

The export symbol address information table B 4150 stores sets of the addresses of the areas in the program B 4130 where symbols are stored and address flags, each of which indicates whether the corresponding address is an offset or an absolute address.

Here, an offset is an address with reference to the location where the program B 4130 starts.

More specifically, the export symbol address information table B 4150 stores a set of the address flag 4151, which indicates an offset, and the address 4152, which indicates the offset of the area where the symbol E 1136 is stored, a set of the address flag 4153, which indicates an offset, and the address 4154, which indicates the offset of the area of the symbol F 1137, a set of the address flag 4155, which indicates an offset, and the address 4156, which indicates the offset of the area of the symbol G 1151, and a set of the address flag 4157, which indicates an offset, and the address 4158, which indicates the offset of the area of the symbol H 1152 as shown in FIG. 27.

4.1.4. Cache Device 4400

Figure 28A:
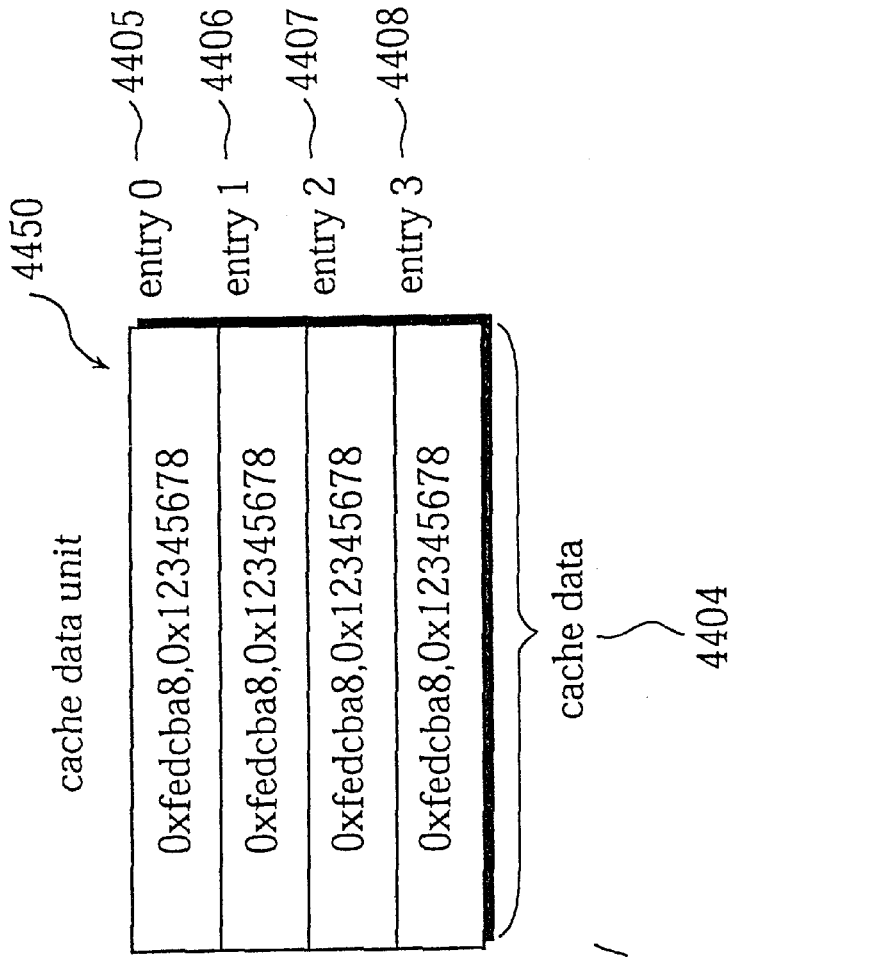
FIG. 28 shows the internal state of a cache device in the program linking apparatus 4000.
Figure 28B:
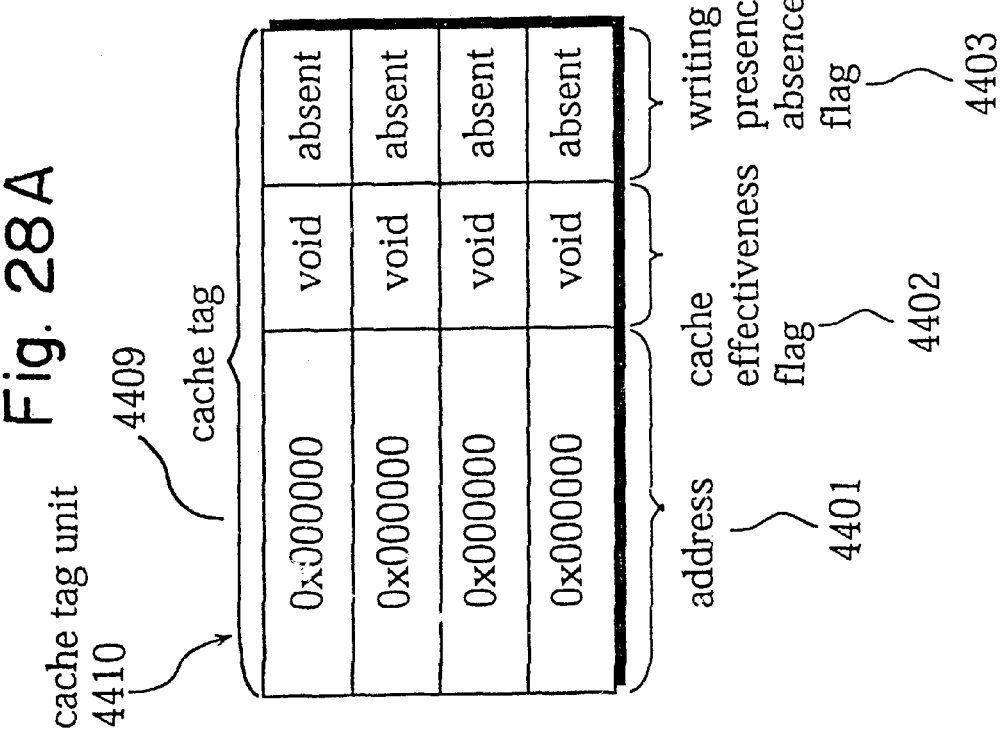

The cache device 4400 includes the cache tag unit 4410 and a cache data unit 4450 as shown in FIG. 28.

The cache tag unit 4410 includes an area where four cache tags 4409 are to be recorded. Each of the cache tags 4409 has an address 4401, a cache effectiveness flag 4402 and a writing presence/absence flag 4403.

The cache data unit 4450 has four entries. The four entries are called an entry "0", an entry "1", an entry "2", and an entry "3" in order from the top. In FIG. 28, the entries "0" to "3" are indicated by reference numbers "4405", "4406", "4407", and "4408", respectively. The entries record data in the ROM-A 4101, the ROM-B 4192, and the RAM 1103.

In addition, the four entries correspond to the four cache tags, respectively.

An address 4401 indicates the absolute address of data in the ROM-A 4101, the ROM-B 4192, or the RAM 1103 that has been recorded in the entry that corresponds to the cache tag including the address 4401.

A cache effectiveness flag 4402 indicates whether the cache tag including the cache effectiveness flag 4402 and the corresponding entry is effective.

A writing presence/absence flag 4403 indicates whether data has been written in the entry that corresponds to the cache tag including the writing presence/absence flag 4403.

FIG. 28 shows. the states of the cache tag unit 4410 and the cache data unit 4450 just after the initialization of the cache data unit 4450 in the cache device initialization step 4200.

As shown in FIG. 28, all the addresses 4401 in the cache tag unit 4410 indicate an address "0X000000", all the cache effectiveness flags 4402 indicate "void", and all the writing presence/absence flags 4403 indicate "absent" In each of the entries in the cache data unit 4450, an undefined value is stored.

Figure 29B:
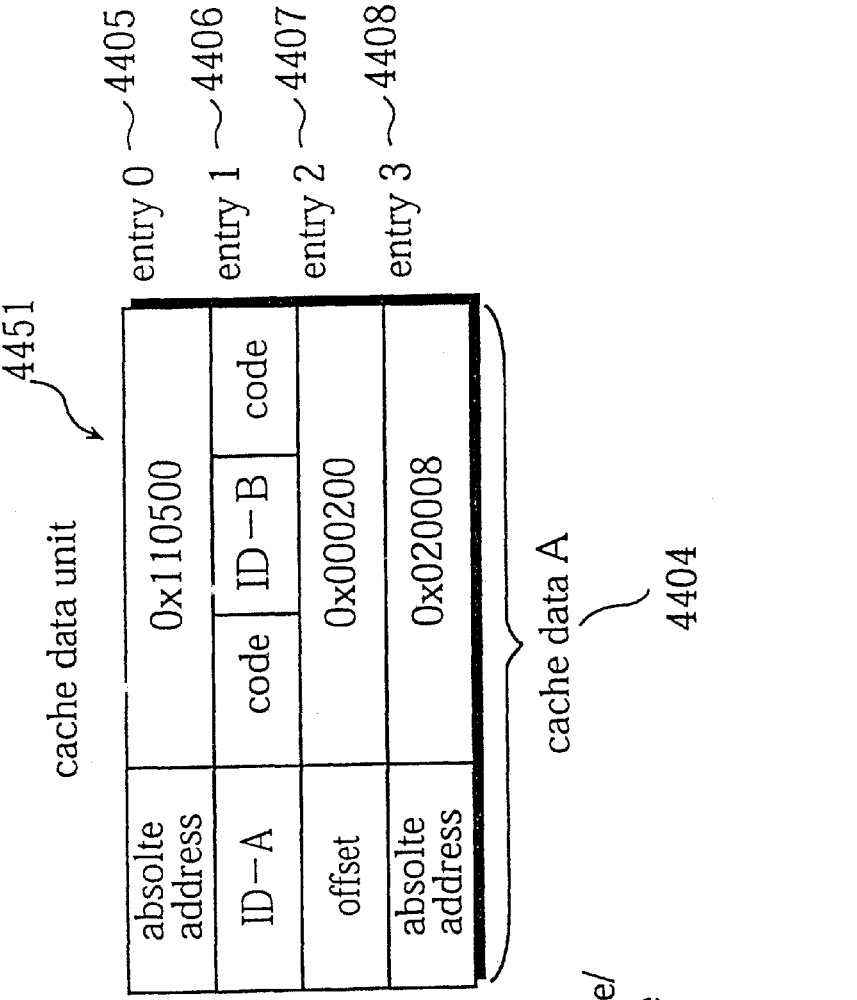
FIG. 29 shows the internal state of a cache device in the program linking apparatus 4000 when data is written in the cache device.
Figure 29A:
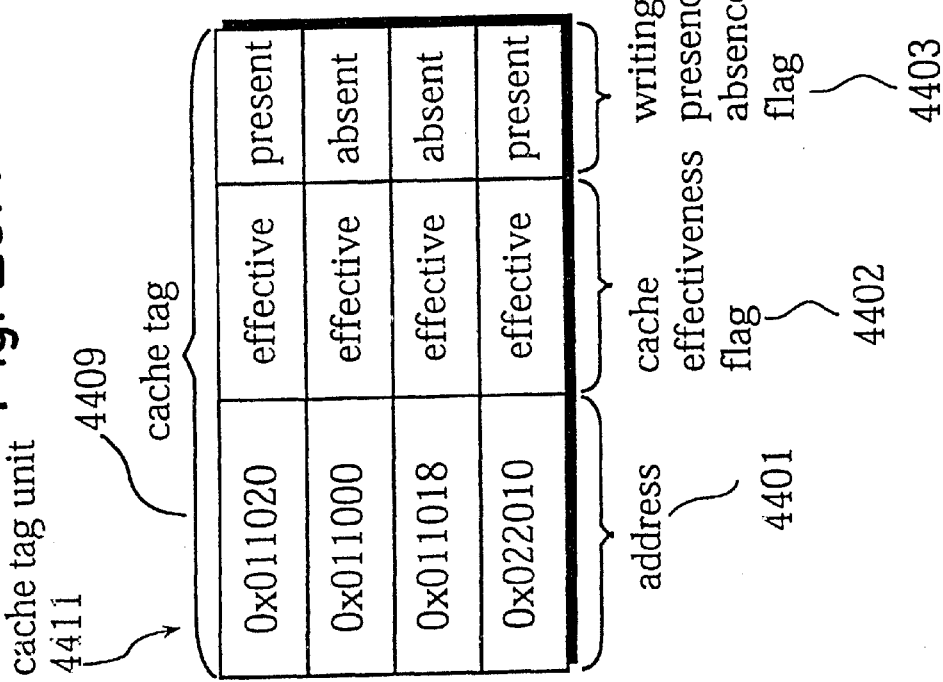

On the other hand, FIG. 29 shows the states of a cache tag unit 4411 and a cache data unit 4451 after data in the ROM-B 4192 and the RAM 1103 have been referred to and data are written in the cache device 4411.

As shown in FIG. 29, the address 4401 in the "0"th cache tag indicates the address "0X011020", the cache effectiveness flag 4402 indicates "effective", and the writing presence/absence flags 4403 indicate "present". In the entry "0" 4405, an address flag, which indicates an absolute address, and data "0X110500" are stored.

In the first cache tag, the address 4401 indicates the address "0X011000", the cache effectiveness flag 4402 indicates "effective", and the writing presence/absence flag 4403 indicates "absent". In the entry "1" 4406, data is stored including the identifier "ID-A" of the symbol A, a code flag that indicates a code, the identifier "ID-B" of the symbol B, and a code flag that indicates a code.

In the second cache tag, the address 4401 indicates the address "0X011018", the cache effectiveness flag 4402 indicates "effective", and the writing presence/absence flag 4403 indicates "absent". In the entry "2" 4407, data is stored including an address flag that indicates an offset and an address "0X000200".

In the third cache tag, the address 4401 indicates the address "0X022010", the cache effectiveness flag 4402 indicates "effective", and the writing presence/absence flag 4403 indicates "present". In the entry "3" 4408, data is stored including an address flag that indicates an absolute address and an address "0X020008".

Figure 30B:
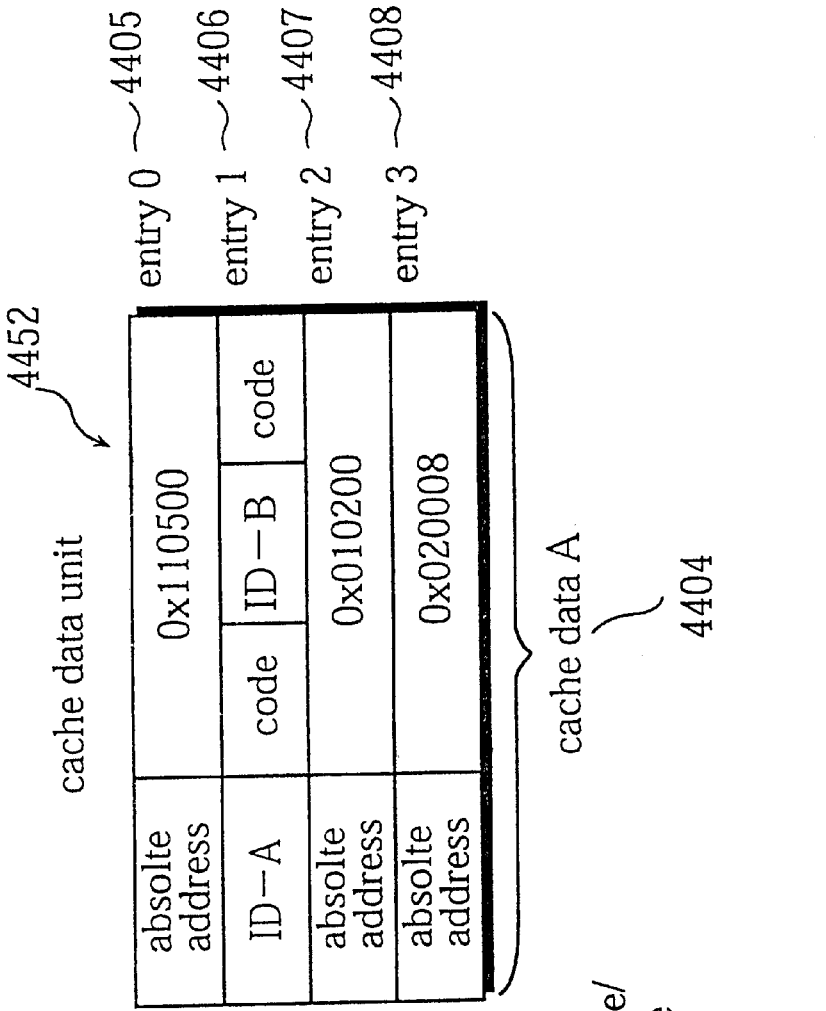
FIG. 30 shows the internal state of a cache device in the program linking apparatus 4000 when data is further written in the cache device.
Figure 30A:
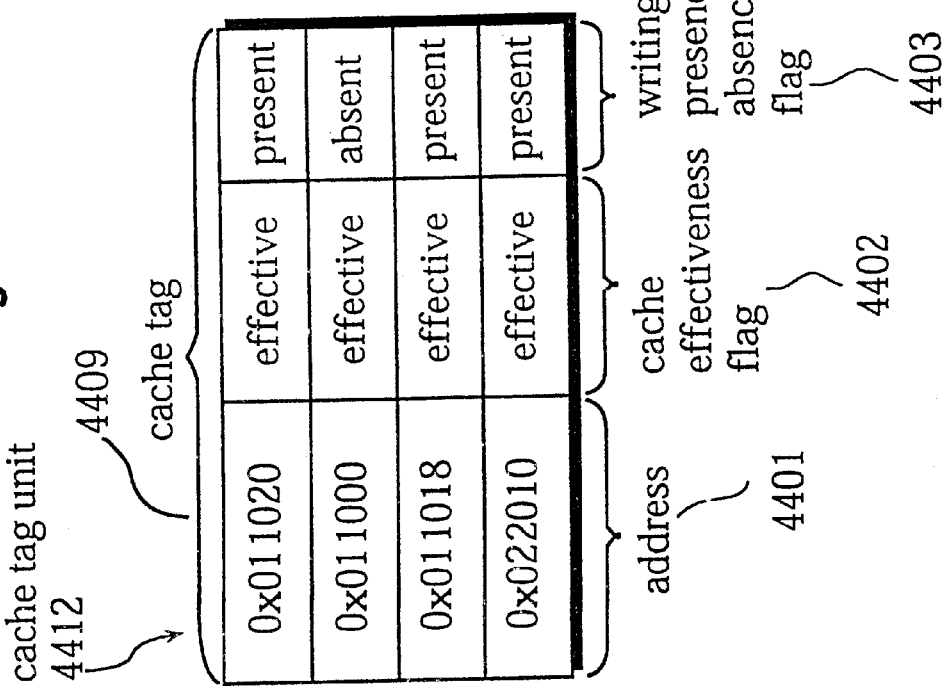

Meanwhile, FIG. 30 shows the states of a cache tag unit 4412 and a cache data unit 4452 after data are written in the entry "2" 4407.

As shown in FIG. 30, the writing presence/absence flag 4403 of the third cache tag indicates "present", and data including an address flag that indicates an absolute address and an address "0X010200" is stored in the entry "2" 4407.

4.1.5. RAM 1103

The RAM 1103 is composed of a readable/writeable semiconductor memory. In the storage area of the RAM 1103, a jump table 1170, data A 1140, and data B 1150 are stored.

The RAM 1103, the jump table 1170, the data A 1140, and the data B 1150 are the same as in the first embodiment, so that no more explanation will be given in the present embodiment.

Figure 31:
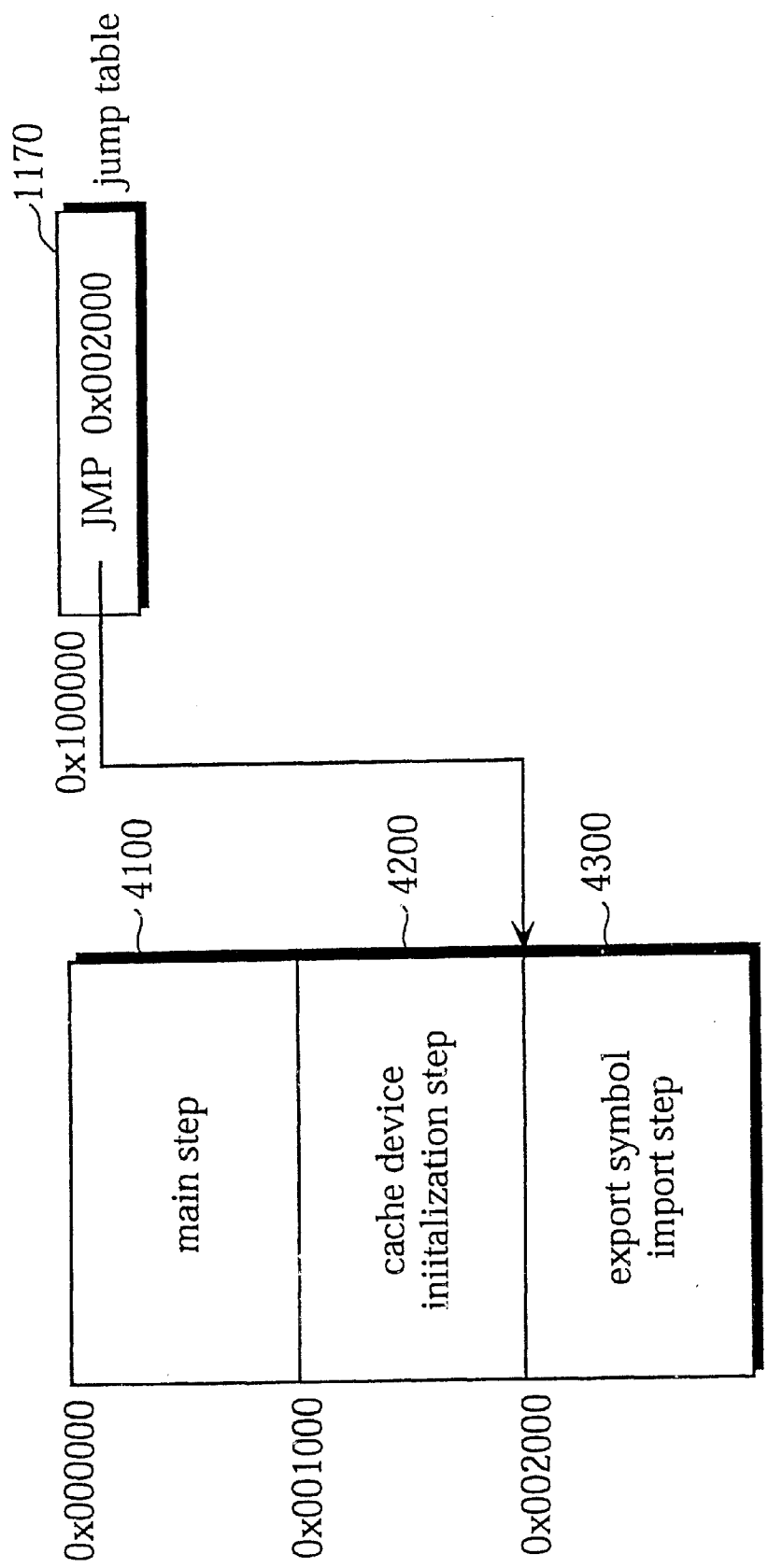
FIG. 31 shows the arrangement of a jump table and an export symbol import step by the program linking apparatus 4000.

The arrangement of the jump table 1170 and the export symbol import step 4300 is shown in FIG. 31.

As shown in FIG. 31, a jump command "JMP 0X002000" is stored in the jump table 1170. Here, the character string "0X002000" indicates the absolute address of the area where the export symbol import step 4300 is stored.

4.2. Operations by Program Linking Apparatus 4000

4.2.1. Operations by CPU 4195

Operations by the CPU 4195 are the same as by the CPU 1105 that are shown by the flowchart in FIG. 8, so that no more explanation will be given in the present embodiment.

4.2.2. Operations in Cache Device Initialization Step 4200

Figure 32:
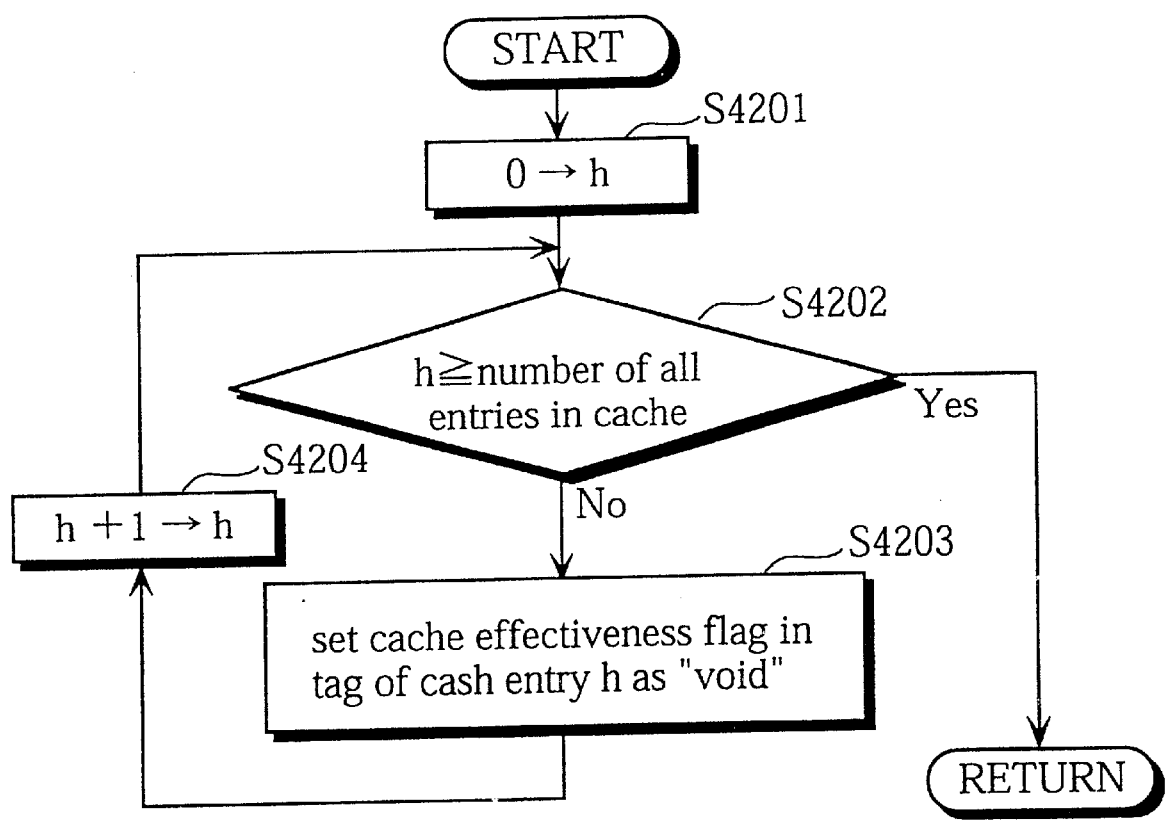
FIG. 32 is a flowchart illustrating operations in a cache initialization step by the program linking apparatus 4000.

An explanation of operations in the cache device initialization step 4200 will be given with reference to the flowchart shown in FIG. 32.

In the cache device initialization step 4200, the value "0" is substituted into the variable "h", which indicates the number of a cache tag in the cache tag unit in the cache device 4400 (step s4201), and when the variable "h" is equal to or greater than all the number of entries in the cache device 4400 (step s4202), the control is returned to the program that has called the cache device initialization step 4200.

On the other hand, when the varible "h" is no greater than the number of entries (step s4202), the cache effectiveness flag of the "h"th cache tag in the cache unit is set as "void"

(step s4203), the value "1" is added to the variable "h" (step S4204), and the control is returned to step s4202 to repeat the processing.

4.2.3. Operations in Export Symbol Import Step 4300

Figure 33:
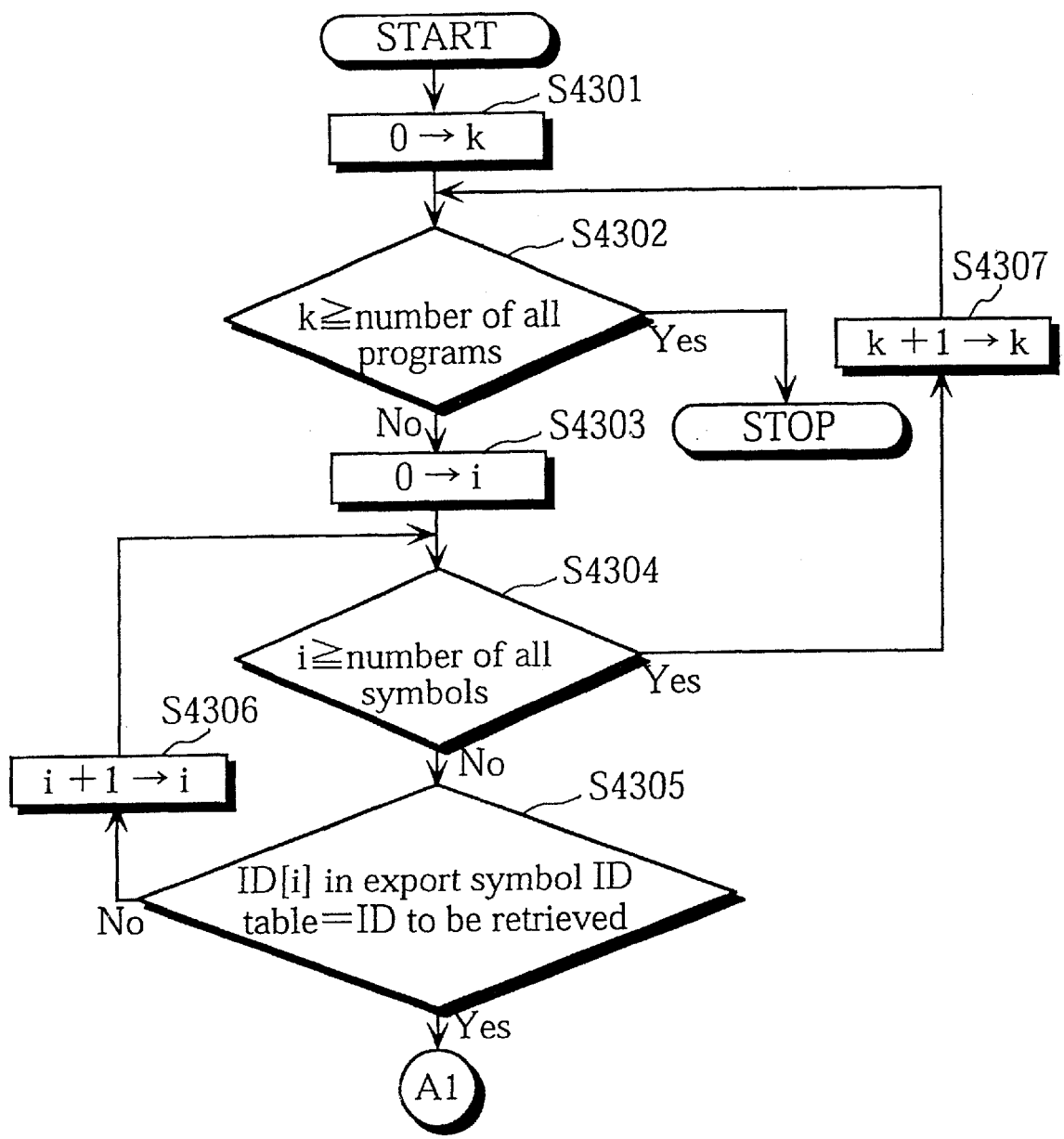
FIG. 33 is a flowchart illustrating operations in the export symbol import step by the program linking apparatus 4000.
Figure 34:
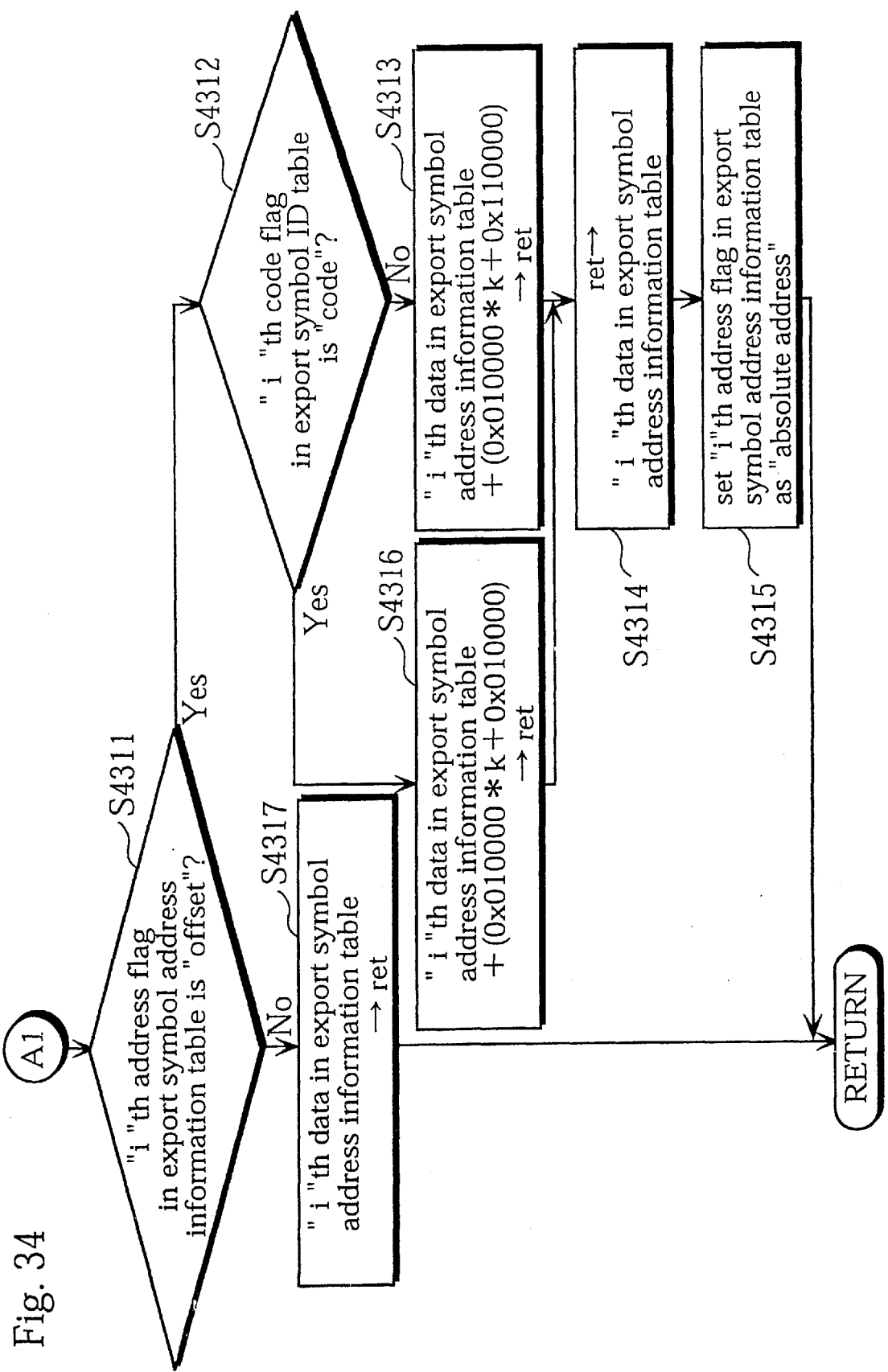
FIG. 34 is a flowchart illustrating operations in the export symbol import step by the program linking apparatus 4000 following the operations in FIG. 33.

An explanation of operations in the export symbol import step 4300 will be given with reference to the flowcharts shown in FIGS. 33 and 34.

In the export symbol import step 4300, the value "0" is substituted into the number "k", which identifies a program (step s4301), the number "k" is compared with the number of all the programs, and when the number "k" is equal to or greater than the number of programs (step s4302), the processing ends.

On the other hand, when the number "k" is no greater than the number of the programs (step s4302), the value "0" is substituted into a variable "i", which indicates the number of a symbol (step s4303).

Then, the variable "i" is compared with the number of symbols When the variable "i" is equal to or greater than the number of all the symbols (step s4304), the value "1" is added to the number "k" (step s4307), and the control is returned to step s4302.

On the other hand, when the variable "i" is no greater than the number of the symbols (step s4304), and when the identifier of the symbol to be retrieved does not match the "i"th identifier in the export symbol ID table (step s4305), the value "1" is added to the variable "i" (step s4306), and the control is returned to step s4304.

Meanwhile, when the identifier of the symbol to be retrieved matches the "i"th identifier in the export symbol ID table (step s4305), when the "i"th address flag in the export symbol address information table indicates an "offset" (step s4311), and when "i"th code flag in the export symbol ID table indicates a "code" (step s4312), the "i"th data in the export symbol address information table, and values "0X010000*k" and "0X010000" are added together, and the result of the addition is substituted into a variable "ret" (step s4316). On the other hand, when the "i"th code flag in the export symbol ID table does not indicate a "code" (step s4312), the "i"th data in the export symbol address information table, values "0X010000* k" and "0X110000" are added together, and the result of the addition is substituted into the variable "ret" (step s4313). Then, the variable "ret" is written in the "i"th data in the export symbol address information table (step s4314), the "i"th address flag in the export symbol address information table is set as an absolute address (step s4315), and the processing returns to the program that has called the export symbol import step 4300 with the variable "ret".

Meanwhile, when the "i"th address flag in the export symbol address information table does not indicate an "offset" (step s4311), the "i"th data in the export symbol address information table is substituted into the variable "ret" (step s4317), and the processing is returned to the program that has called the export symbol import step 4300 with the variable "ret".

Figure 35:
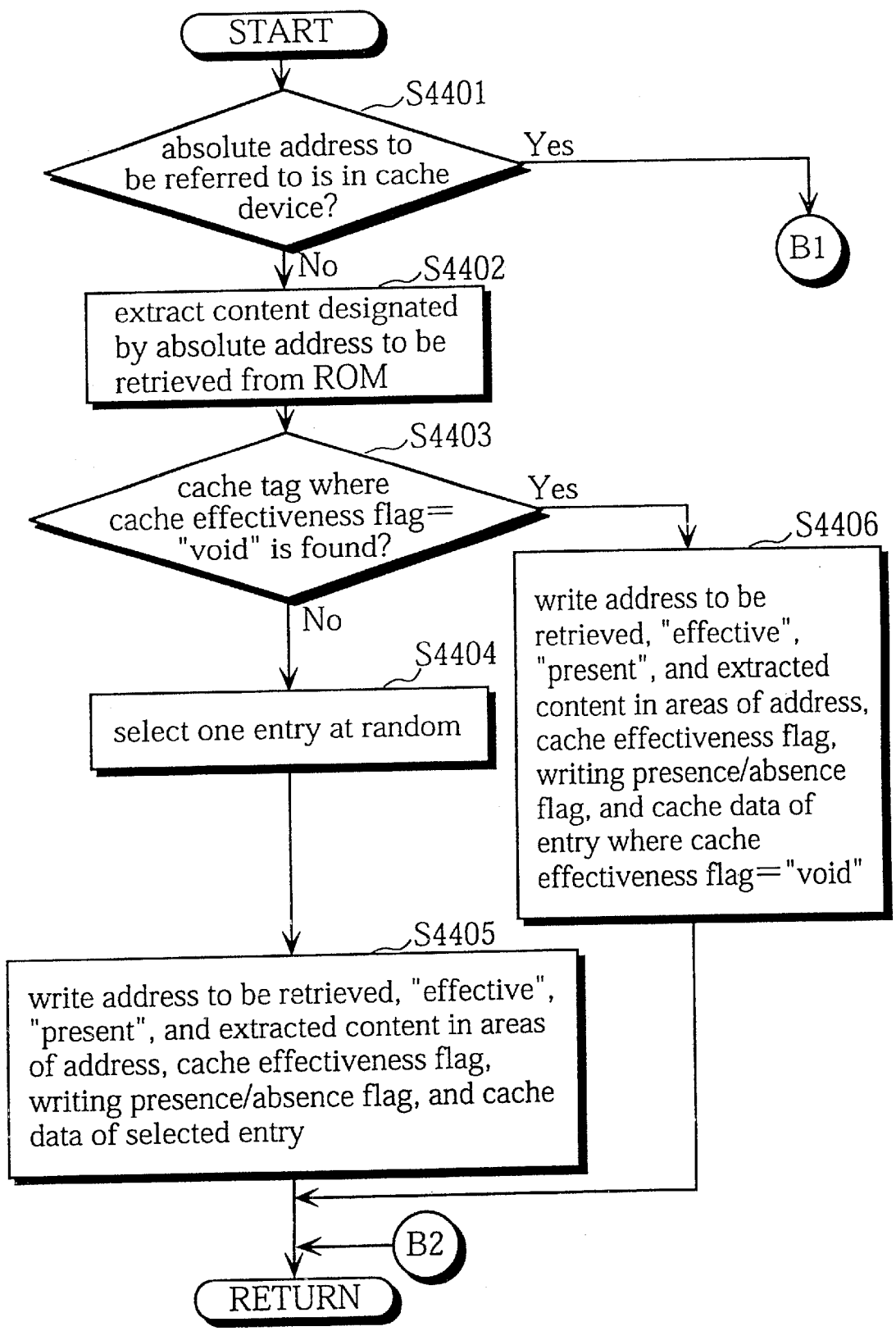
FIG. 35 is a flowchart illustrating operations in the export symbol import step by the program linking apparatus 4000.
Figure 36:
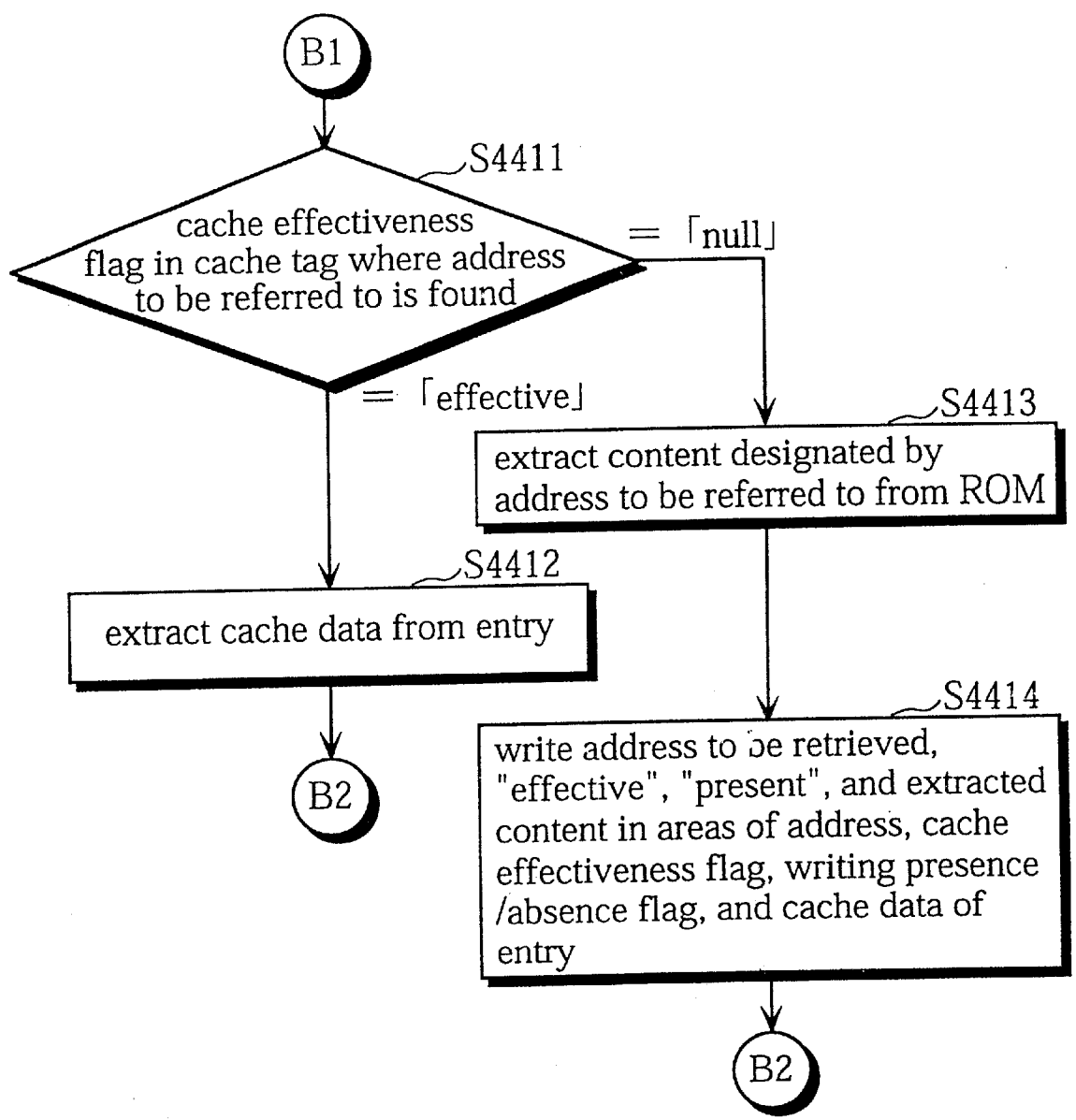
FIG. 36 is a flowchart illustrating operations in the export symbol import step by the program linking apparatus 4000 following the operations in FIG. 35.

Here, an explanation of operations performed when information recorded in the ROM-A 4101, the ROM-B 4192, and the RAM 1103 are referred to in the export symbol import step 4300 will be given with reference to flowcharts shown in FIGS. 35 and 36.

When information recorded in the ROM-A 4101, the ROM-B 4192, and the RAM 1103 are referred to in the export symbol import step 4300, an absolute address to be referred to is searched for in the cache tag unit in the cache device 4400. When the absolute address is found in the cache tag unit in the cache device 4400 (step s4401), and when the cache effectiveness flag indicates "effective" (step s4411), the content of the corresponding entry is extracted from the cache data unit (step s4412), and the processing returns.

On the other hand, when the cache effectiveness flag is "void" (step s4411), the data in the area indicated by the absolute address is extracted from the ROM-A 4101, the ROM-B 4192, or the RAM 1103 (step s4413). Then, the absolute address is written as the address, the cache effectiveness flag is changed to "effective", and the writing presence/absence flag is changed to "present" in the cache tag, the extracted data is written in the cache data unit (step s4414), and the processing returns.

Meanwhile, when the absolute address to be referred to is not found in the cache tag unit in the. cache device 4400 (step s4401), the data in the area indicated by the absolute address is extracted from the ROM-A 4101, the ROM-B 4192, or the RAM 1103 (step s4402). When a cache tag in which the cache effectiveness flag indicates "void" is found (step s4403), the absolute address is written as the address, the cache effectiveness flag is changed to "effective", and the writing presence/absence flag is changed to "present" in the cache tag, the extracted data is written in the cache data unit (step 4406), and the processing returns.

When the cache effectiveness flag indicates "effective" for all the entry (step s4403), one of the entries is selected at random (step s4404). For the selected entry, the absolute address is written as the address, the cache effectiveness flag is changed to "effective", and the writing presence/absence flag is changed to "present" in the cache tag, the extracted data is written in the cache data unit (step 4405), and the processing returns.

Note that although information recorded in the ROM-A 4101, the ROM-B 4192, and the RAM 1103 is directly referred to and updated in the export symbol import step 4300 in the afore-mentioned description, the information is referred to and updated via the cache device 4400. An explanation given below will focus on this point.

Figure 37:
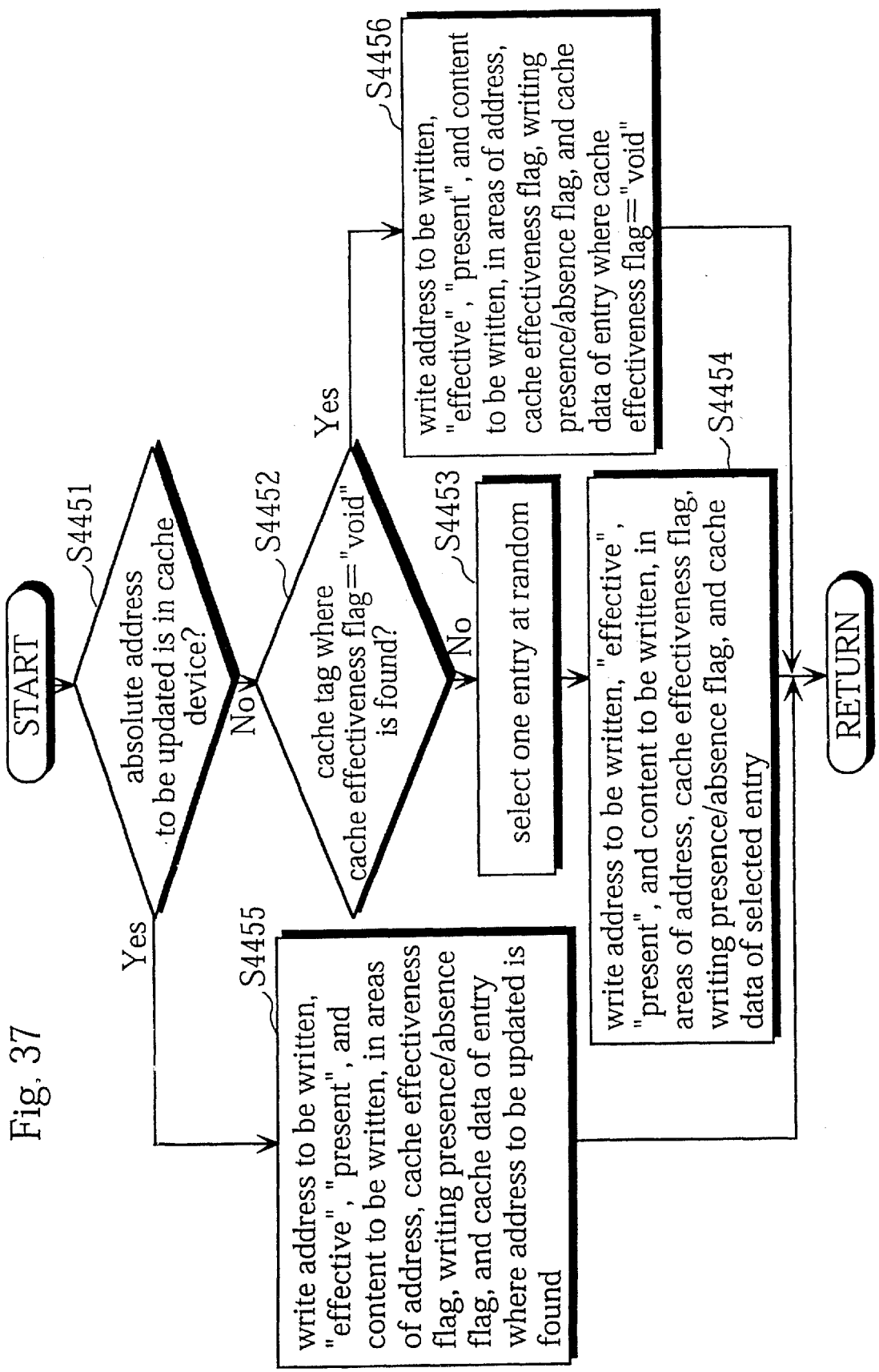
FIG. 37 is a flowchart illustrating operations in the export symbol import step by the program linking apparatus 4000.

Here, an explanation of operations when information in the ROM-A 4101, the ROM-B 4192, and the RAM 1103 is updated in the export symbol import step 4300 will be given with reference to the flowchart shown in FIG. 37.

In the export symbol import step 4300, when data is written in the cache tag unit and the cache data unit in the cache device 4400, and when an absolute address for which data is to be written is found in the cache tag unit (step s4451), a cache effectiveness flag "effective, a writing presence/absence flag "present", and data to be newly written are written in each corresponding area in the cache tag (step s4455), and the processing returns.

On the other hand, when no absolute address for which data is to be written is found in the cache tag unit (step s4451), and when a cache tag that includes a cache effectiveness flag "void" is found (step s4452), an absolute address, a cache effectiveness flag "effective, a writing presence/absence flag "present", and data to be newly written are written in each corresponding area in the cache tag (step s4456), and the processing returns.

Meanwhile, when no cache tag includes a cache effectiveness flag "void" (step s4452), an entry is selected at random (step s4453), an absolute address, a cache effectiveness flag "effective, a writing presence/absence flag "present", and data to be newly written are written in each corresponding area in the cache tag (step s4456), and the processing returns.

4.3. Summary

As has been described, each of the programs and the data is stored in a predetermined location in ROMs, the offsets of the symbols are stored in the programs and a cache device having a predetermined number of entries is included. In addition, an absolute address of each symbol is created using a predetermined standard and the identifier of the called symbol and the created address are written in the cache device whenever a symbol is called. As a result, when a symbol that has been referred to is referred to again, linkage between programs can be realized via the symbol using the absolute address that has been stored in the cache device according to the present embodiment.

Accordingly, programs need not to store the absolute addresses in themselves, so that the programs recorded in a ROM are independent of the memory map of an embedded microcomputer control system and can be shared by another system having a different memory map.

In addition, even though the sets of the export symbols and the corresponding addresses are not stored in the memory unlike the second and third embodiment, the absolute address of the export symbol that has been converted in the previous reference may remain in the cache at the time of second reference. As a result, the operations in the export symbol import step can be sped up in the present embodiment.

5. The Fifth Embodiment

An explanation of a program linking apparatus 5000 as one embodiment of the present invention will be given below.

5.1. Structure of Program Linking Apparatus 5000

Figure 38:
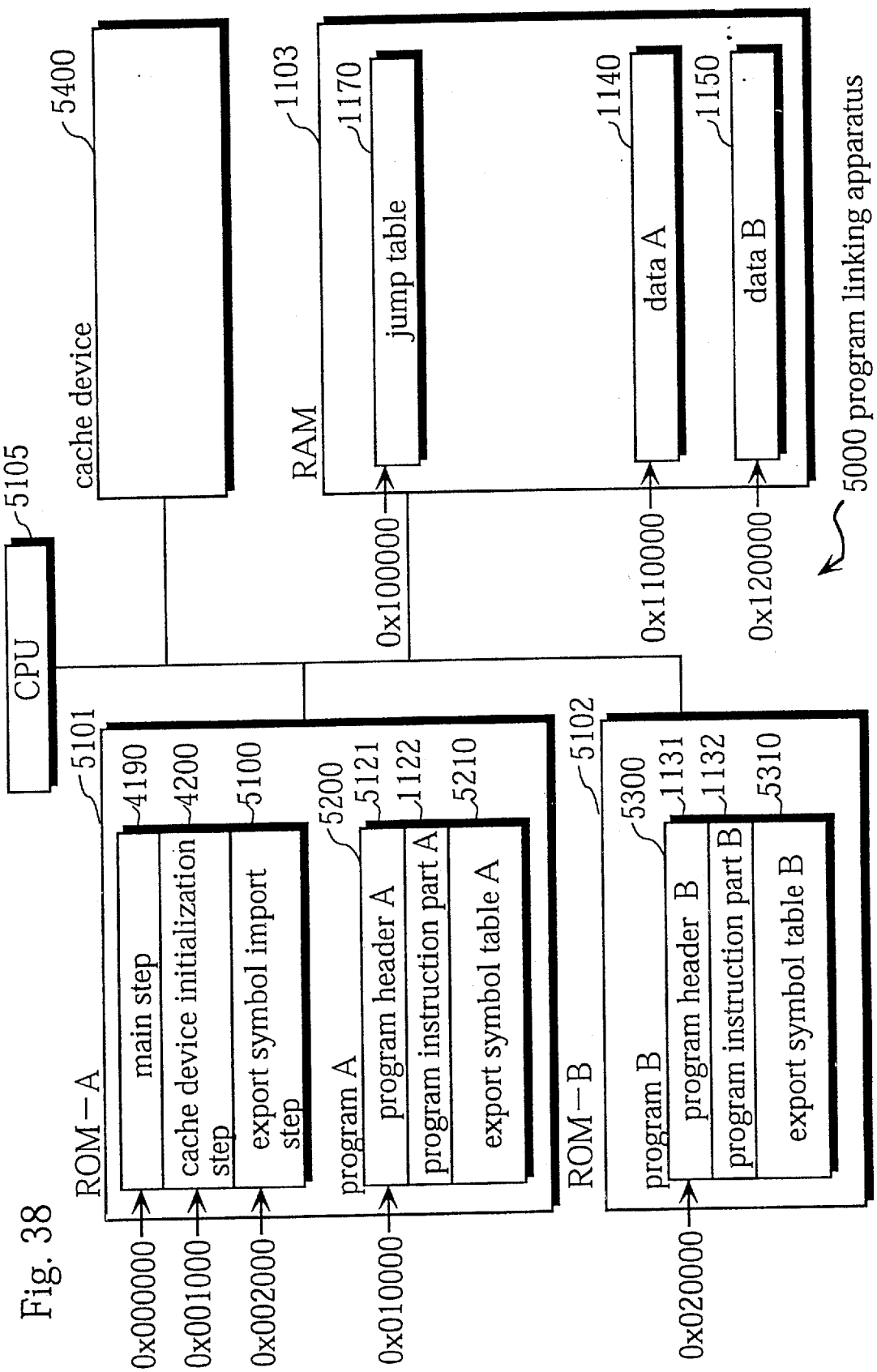
FIG. 38 is a block diagram showing the structure of a program linking apparatus 5000 according to the fifth embodiment of the present invention.

As shown in FIG. 38, the program linking apparatus 5000 includes a CPU 5105, a ROM-A 5101, a ROM-B 5102, a cache device 5400, and a RAM 1103.

The ROM-A 5101, the ROM-B 5102, the cache device 5400, the RAM 1103, and the CPU 5105 are connected with each other by a CPU bus 5104.

The storage areas of the ROM-A 5101, the ROM-B 5102, and the RAM 1103 are located in one address space as in the case of the first embodiment. As a result, the CPU 5105 can access to data stored in the ROM-A 5101, the ROM-B 5102, and the RAM 1103 using one kind of address.

The elements given the same reference numbers as in the first embodiment have the same functions as in the first embodiment. For these elements, no more explanations will given below. The descriptions given below will focus on differences from the first embodiment.

5.1.1. CPU 5105

As in the case of the CPU 1105, the CPU 5105 is a semiconductor device that includes a register, an arithmetic circuit, and a control circuit, and the CPU 5105 decodes commands, performs arithmetic, communicates data between storage devices, performs control, and the like.

The CPU 5105 reads commands stored in the ROM-A 5101, the ROM-B 5102, and the RAM 1103, decodes the read commands, and executes the decoded commands. The CPU 5105 reads data stored in the ROM-A 5101, the ROM-B 5102, and the RAM 1103, and writes data in the RAM 1103.

5.1.2. ROM-A 5101

The ROM-A 5101 is composed of a read only semiconductor memory. In the storage space of the ROM-A 5101, a main step 4190, a cache device initialization step 4200, an export symbol import step 5100, and a program A 5200 are recorded.

5.1.2.1 Main Step 4190

The main step 4190 is located in the address space from the area indicated by the absolute address "0X000000".

The main step 4190 is the same as in the fourth embodiment, so that no more explanation will be given in the present embodiment.

5.1.2.2. Cache Device Initialization Step 4200

The cache device initialization step 4200 is located in the address space from the area indicated by an absolute address "0X001000".

In the cache device initialization step 4200, a cache device, which will be described later, is initialized.

The cache device initialization step 4200 is the same as in the fourth embodiment, so that no more explanation will be given in the present embodiment.

5.1.2.3. Export Symbol Import Step 5100

The export symbol import step 5100 is located in the address space from the area indicated by an absolute address "0X002000".

The export symbol import step 5100 is called from another program with the identifier of a symbol as the argument. When the export symbol import step 5100 is called from another program with the identifier of a symbol as the argument, in the export symbol import step 5100, the identifier of the symbol is received from the other program, an identifier that matches the received identifier is retrieved from an export symbol ID table, and the writing presence/absence flag is referred to. When the writing presence/absence flag indicates "present", data in the export symbol address information table is extracted, the extracted data is returned to the program that has called the export symbol import step 5100 as the absolute address.

On the other hand, when the writing presence/absence flag is "absent", and when the data flag in the export symbol ID table indicates a "code", the absolute address is calculated according to the Expression 3.

Meanwhile, when the data flag in the export symbol ID table indicates a "data", the absolute address is calculated according to the Expression 4.

In the export symbol import step 5100, the calculated absolute address is returned to the program that has called the export symbol import step 5100.

Then, the calculated absolute address is written in data in the export symbol address information table in the export symbol import step 5100

(Data Reference)

In the export symbol import step 5100, when information in the ROM-A 5101, the ROM-B 5102, and the RAM 1103 is referred to, an absolute address to be referred to is searched for from the cache tag unit in the cache device 5400. When the absolute address is found in the cache tag unit in the cache device 5400, the cache effectiveness flag is referred to- When the cache effectiveness flag indicates "effective", the content of the corresponding entry is extracted from the cache data unit. On the other hand, when the cache effective flag indicates "void", the data in the area indicated by the absolute address is extracted from the ROM-A 5101, the ROM-B 5102, or the RAM 1103, and a cache effectiveness flag "effective" and a writing presence/absence flag "present" are written in the cache tag, and the extracted data is written in the cache data unit. Then, a writing presence/absence flag "absent" is returned to the program that has called the export symbol import step 5100.

Meanwhile, when the absolute address is not found in the cache tag unit in the cache device 4400, the data in the area indicated by the absolute address is extracted from the ROM-A 5101, the ROM-B 5102, or the RAM 1103. Then, the cache effectiveness flag is referred to. When a cache tag includes the cache effectiveness flag "void", the absolute address is written as the address, and a cache effectiveness flag "effective" and a writing presence/absence flag "present" are written in the cache tag, and the extracted data is written in the cache data unit. Then, the writing presence/ absence flag "absent" is returned to the program that has called the export symbol import step 5100.

When the cache effectiveness flag indicates "effective" for all the entries, one of the entries is selected at random, and the absolute address is written as the address, and a cache effectiveness flag "effective" and a writing presence/absence flag "present" are written in the cache tag, and the extracted data is written in the cache data unit for the selected entry. Then, the writing presence/absence flag "absent" is returned to the program that has called the export symbol import step 5100.

(Data Writing)

In the export symbol import step 5100, data is written in a cache tag unit and a cache data unit in the cache device 5400 in the same manner as in the export symbol import step 4300 in the fourth embodiment, so that no more explanation will be given in the present embodiment.

5.1.2.4. Program A 5200

Figure 39B:
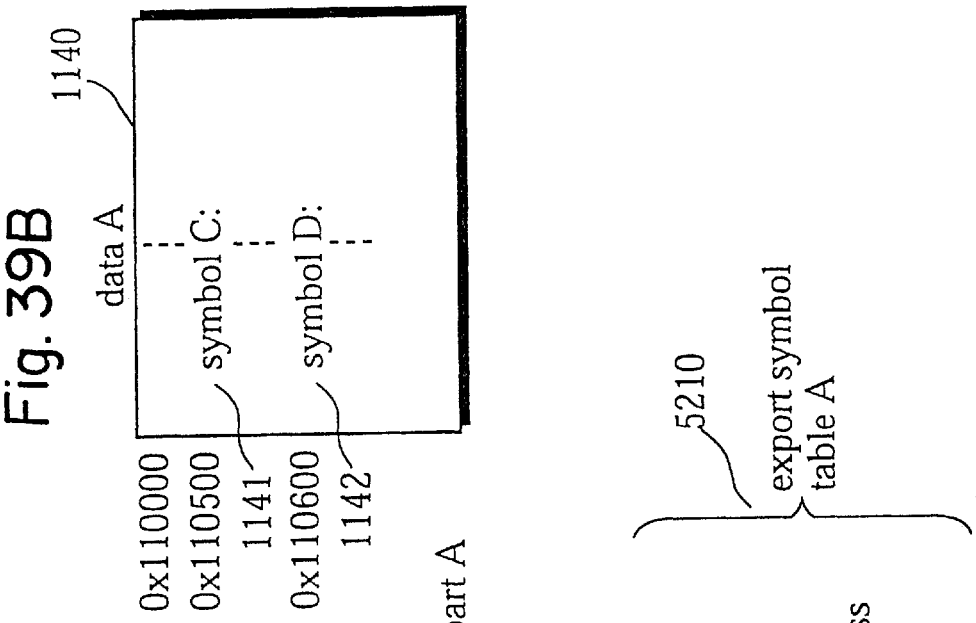
FIG. 39 shows the structure of a program A and data A in the program linking apparatus 5000.
Figure 39A:
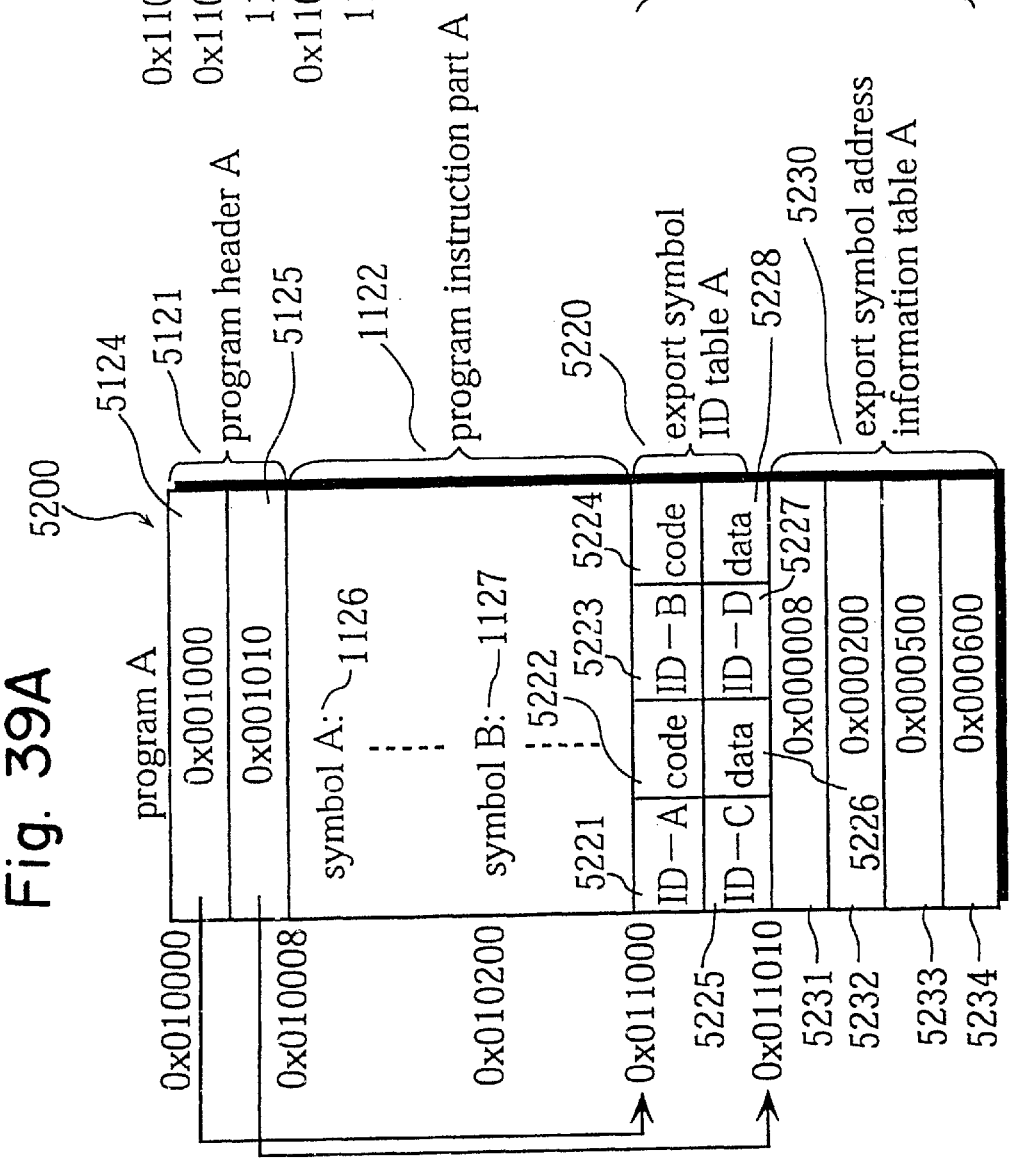

The program A 5200 includes a program header A 5121, a program instruction part A 1122, and an export symbol table A 5210 as shown in FIG. 39.

The program A 5200 is located in the address space from the area indicated by the absolute address "0X010000".

(1) Program Header A 5121

The program header A 5121 is located from the top of the program A 5200, and includes an offset 5124, which indicates the location where the export symbol ID table A 5200 starts, and an offset 5125, which indicates the location where an export symbol address information table A 5230 starts, as shown in FIG. 39. Here, an offset is an address with reference to the location where the program A 5200 starts.

As shown in FIG. 39, the offset 5124 is 0X001000", which is the address indicating the starting location of an export symbol ID table A 5220 in the program A 5200, and the offset 5125 is 0X001010", which is the address indicating the starting location of the export symbol address information table A 5230 in the program A 5200.

(2) Program Instruction Part A 1122

The program instruction part A 1122 is the same as shown in FIG. 3, so that no more explanation will be given in the present embodiment.

(3) Export Symbol Table A 5210

The export symbol table A 5210 includes the export symbol ID table A 5220 and the export symbol address information table A 5230.

The export symbol table A 5210 is located in the address space from the area indicated by an absolute address "0X011000".

(Export Symbol ID Table A 5220)

The export symbol ID table A 5220 is located in the address space from the area indicated by the absolute address "0X011000".

The export symbol ID table A 5220 stores sets of the identifiers of symbols and code flags, each of which indicates whether the corresponding symbol is a code symbol or a data symbol.

More specifically, the export symbol ID table A 5220 stores a set of the identifier 5221 "ID-A" and the code flag 5222 "code" of the symbol A 1126, a set of the identifier 5223 "ID-B" and the code flag 5224 "code" of the symbol B 1127, a set of the identifier 5225 "ID-C" and the code flag 5222 "data" of the symbol C 1141, and a set of the identifier 5227 "ID-D" and the code flag 5228 "data" of the symbol D 1142 as shown in FIG. 39.

(Export Symbol Address Information Table A 5230)

The export symbol address information table A 5230 is located in the address space from the area indicated by an absolute address "0X011010".

The export symbol address information table A 5230 stores addresses of the areas in the program A 5200 where symbols are stored.

Here, an offset is an address with reference to the location where the program A 5200 starts.

More specifically, the export symbol address information table A 5230 stores the addresses 5231, 5232, 5233, and 5234 that indicate the offsets of the areas where the symbols A 1126, B 1127, C 1141, and D 1142 are stored, respectively as shown in FIG. 39.

5.1.3. ROM-B 5102

The ROM-B 5102 is composed of a read only semiconductor memory. In the storage space of the ROM-B 5102, a program B 5300 is recorded.

5.1.3.1. Program B 5300

Figure 40B:
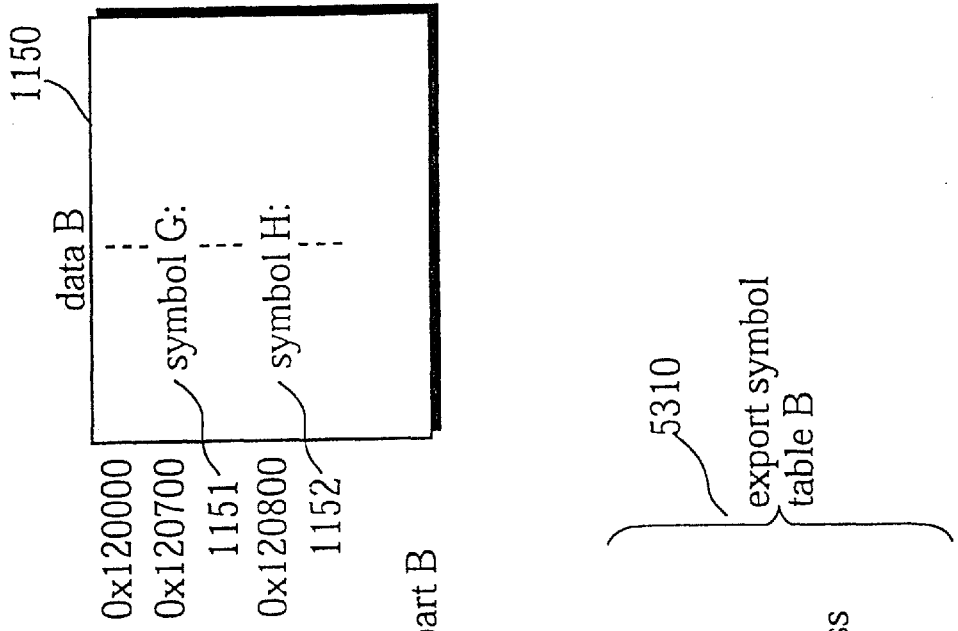
FIG. 40 shows the structure of a program B and data B in the program linking apparatus 5000.
Figure 40A:
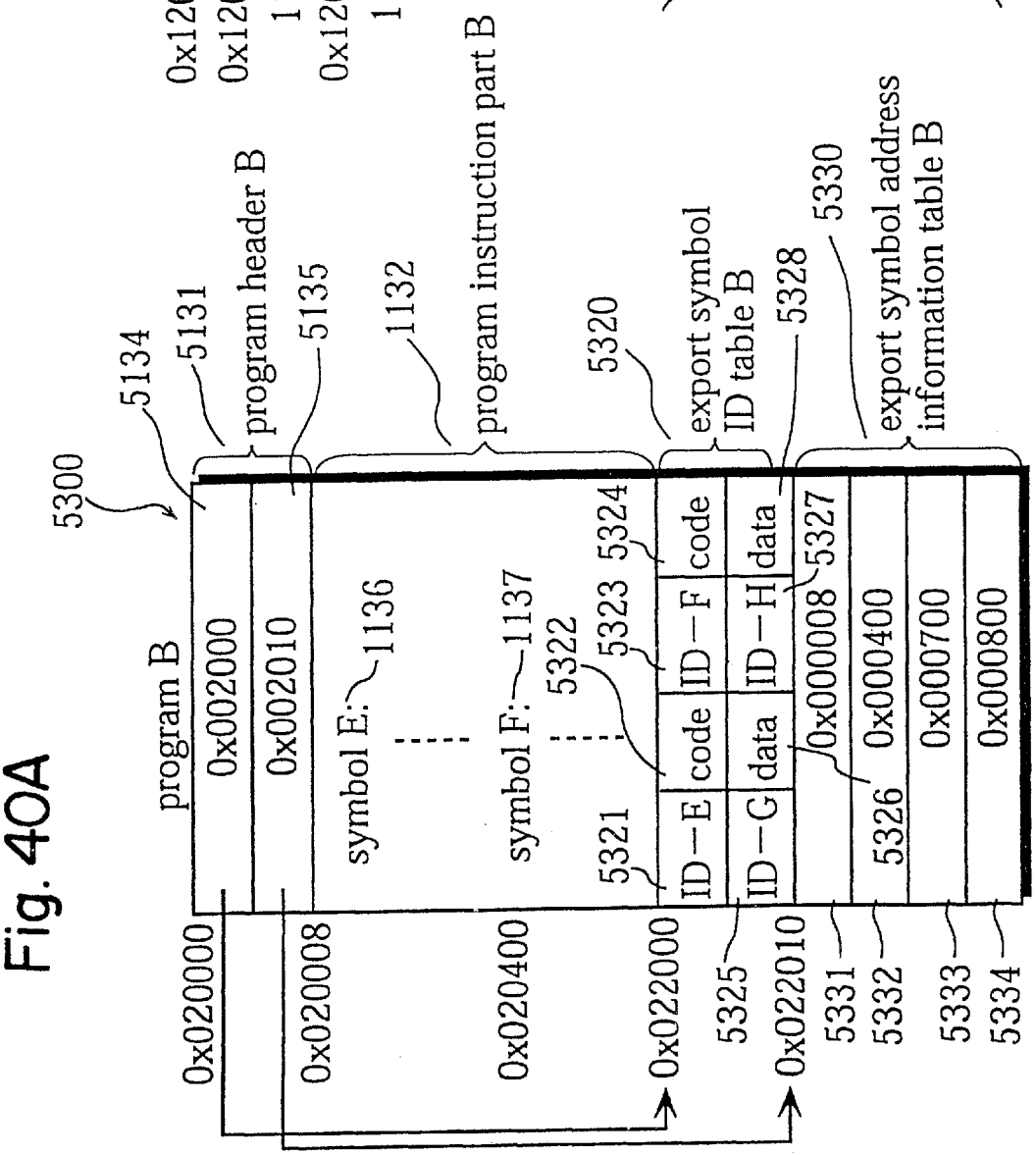

The program B 5300 includes a program header B 5131, a program instruction part B 1132, and an export symbol table B 5310 as shown in FIG. 40.

The program B 5300 is located in the address space from the area indicated by the absolute address "0X020000".

(1) Program Header B 5131

The program header B 5131 is located from the top of the program B 5300, and includes an offset 5134, which indicates the location where an export symbol ID table B 5320 starts, and an offset 5135, which indicates the location where an export symbol address information table B 5330 starts, as shown in FIG. 40. Here, an offset is an address with reference to the location where the program B 5300 starts.

As shown in FIG. 40, the offset 5134 is "0X002000", which is the address indicating the starting location of the export symbol ID table B 5320 in the program B 5300, and the offset 5135 is "0X002010", which is the address indicating the starting location of the export symbol address information table B 5330 in the program B 5300.

(2) Program Instruction Part B 1132

The program instruction part B 1132 is the same as shown in FIG. 5, so that no more explanation will be given in the present embodiment.

(3) Export Symbol Table B 5310

The export symbol table B 5310 includes the export symbol ID table B 5320 and the export symbol address information table B 5330.

The export symbol table B 5310 is located in the address space from the area indicated by the absolute address "0X022000".

(Export Symbol ID Table B 5320)

The export symbol ID table B 5320 is located in the address space from the area indicated by the absolute address "0X022000".

The export symbol ID table B 5320 stores sets of the identifiers of symbols and code flags, each of which indicates whether the corresponding symbol is a code symbol or a data symbol.

More specifically, the export symbol ID table B 5320 stores a set of the identifier 5321 "ID-E" and the code flag 5322 "code" of the symbol E 1136, a set of the identifier 5323 "ID-F" and the code flag 5324 "code" of the symbol F 1137, a set of the identifier 5325 "ID-G" and the code flag 5326 "data" of the symbol G 1151, and a set of the identifier 5327 "ID-H" and the code flag 5328 "data" of the symbol H 1152 as shown in FIG. 40.

(Export Symbol Address Information Table B 5330)

The export symbol address information table A 5330 is located in the address space from the area indicated by an absolute address "0X022010".

The export symbol address information table B 5330 stores addresses of the areas in the program B 5300 where symbols are stored.

Here, an offset is an address with reference to the location where the program B 5300 starts.

More specifically, the export symbol address information table B 5330 stores the addresses 5331, 5332, 5333, and 5334 that indicate the offsets of the areas where the symbols E 1136, F 1137, G 1151, and H 1152 are stored, respectively as shown in FIG. 40.

5.1.4. Cache Device 5400

The cache device 5400 includes a cache tag unit 5410 and a cache data unit 5450 as shown in FIG. 41.

The cache tag unit 5410 is the same as the cache tag unit 4410 in the fourth embodiment, and the cache data unit 5450 is the same as the cache data unit 4450, so that no more explanation of will be given in the present embodiment.

The states of the cache tag unit 5410 and the cache data unit 5450 initialized in the cache device initialization step 4200 are the same as those of the cache tag unit 4410 and the cache data unit 4450, so that no more explanation will be given in the present embodiment.

FIG. 41 shows the states of the cache tag unit 5410 and the cache data unit 5450 after data in the ROM-A 5101, the ROM-B 5102 and the RAM 1103 have been referred to and data are written in the cache device 5400.

As shown in FIG. 41, and address 4401 "0X011020", a cache effectiveness flag 4402 "effective", and a writing presence/absence flag 4403 "present" are stored in the "0"th cache tag. In the entry "0" 4405, data including the address "0X110500" is stored.

In the first cache tag, an address 4401 "0X011000", a cache effectiveness flag 4402 "effective", and a writing presence/absence flag 4403 "absent" are stored. In the entry "1" 4406, an identifier "ID-A" of the symbol A, a code flag that indicates a code, an identifier "ID-B" of the symbol B, and a code flag that indicates a code are stored.

In the second cache tag, an address 4401 "0X011018", a cache effectiveness flag 4402 "effective", and a writing presence/absence flag 4403 "absent" are stored. In the entry "2" 4407, data including an address "0X000200" is stored.

In the "2"nd cache tag, an address 4401 "0X022010", the cache effectiveness flag 4402 "effective", and a writing presence/absence flag 4403 "present" are stored. In the entry "3" 4408, data including an address "0X020008" is stored.

Figure 42B:
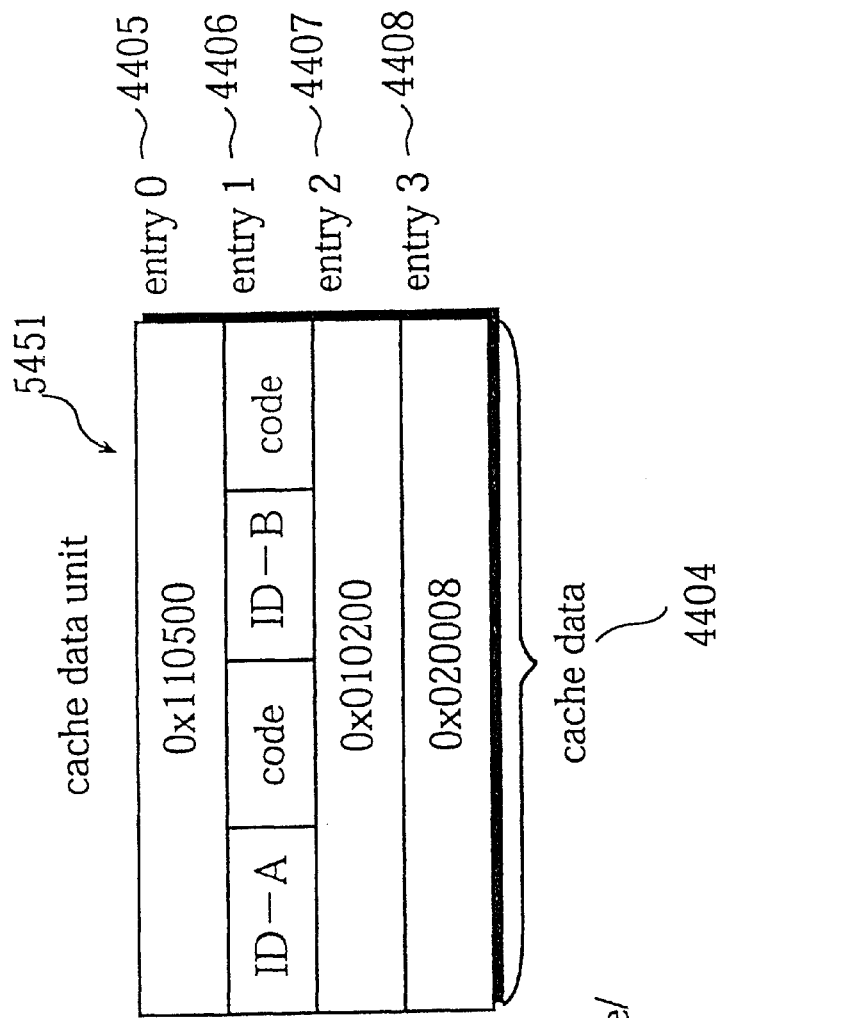
FIG. 42 shows the internal state of a cache device in the program linking apparatus 5000 when data is further written in the cache device.
Figure 42A:
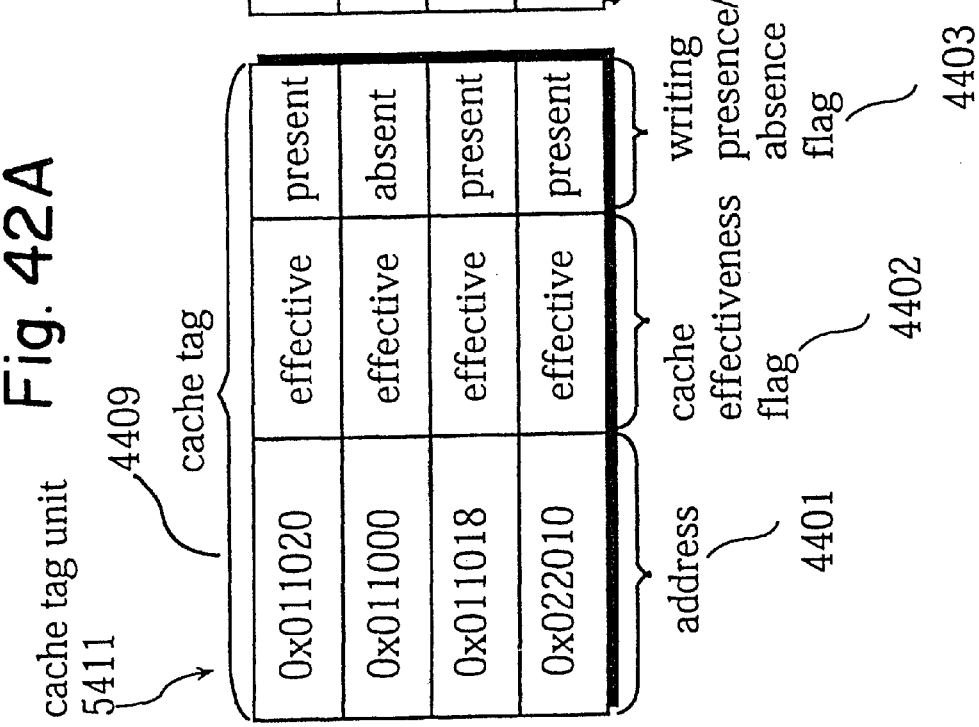

Meanwhile, FIG. 42 shows the states of a cache tag unit 5411 and a cache data unit 5451 after data are written in the entry "2" 4407.

As shown in FIG. 42, a writing presence/absence flag 4403 "present" is written in the "2"nd cache tag and data including an address "0X010200" is stored in the entry "2" 4407.

5.1.5. RAM 1103

The RAM 1103 is composed of a readable/writeable semiconductor memory In the storage area of the RAM 1103, a jump table 1170, data A 1140, and data B 1150 are stored.

The RAM 1103, the jump table 1170, the data A 1140, and the data B 1150 are the same as in the first embodiment, so that no more explanation will be given in the present embodiment.

The arrangement of the jump table 1170 and the export symbol import step 5100 in the address space is shown in FIG. 43.

As shown in FIG. 43, a jump command "JMP 0X002000" is stored in the jump table 1170. Here, the character string "0X002000" indicates the absolute address of the area where the export symbol import step 5100 is stored.

5.2. Operations by Program Linking Apparatus 5000

5.2.1. Operations by CPU 5105

Operations by the CPU 5105 are the same as by the CPU 1105 that are shown by the flowchart in FIG. 8, so that no more explanation will be given in the present embodiment.

5.2.2. Operations in Cache Device Initialization Step 4200

Operations by the cache device initialization step 4200 are the same as by the cache device initialization step 4200 in the fourth embodiment, so that no more explanation will be given in the present embodiment.

5.2.3. Operations in Export Symbol Import Step 5100

Figure 44:
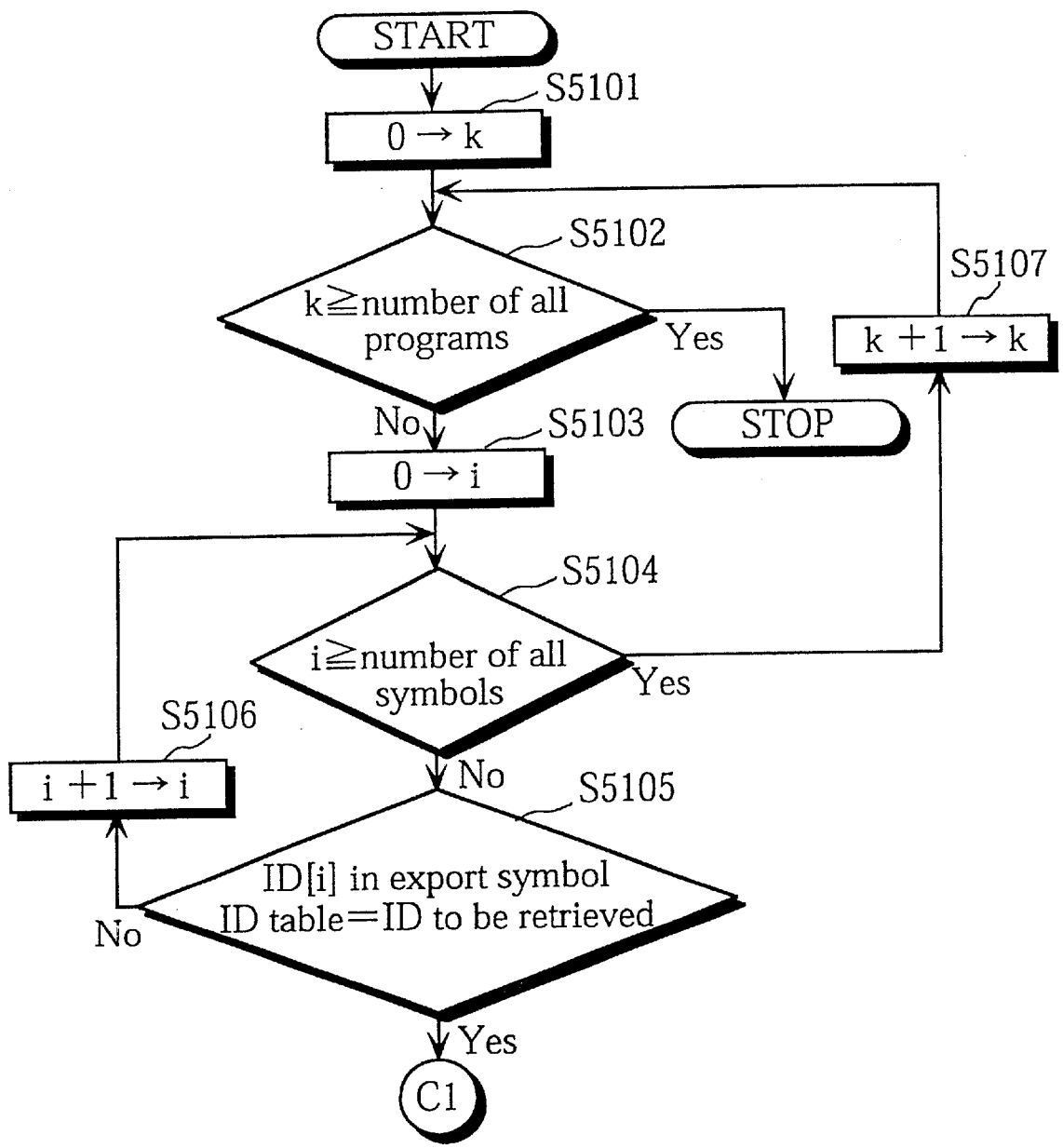
FIG. 44 is a flowchart illustrating operations in the export symbol import step by the program linking apparatus 5000.
Figure 45:
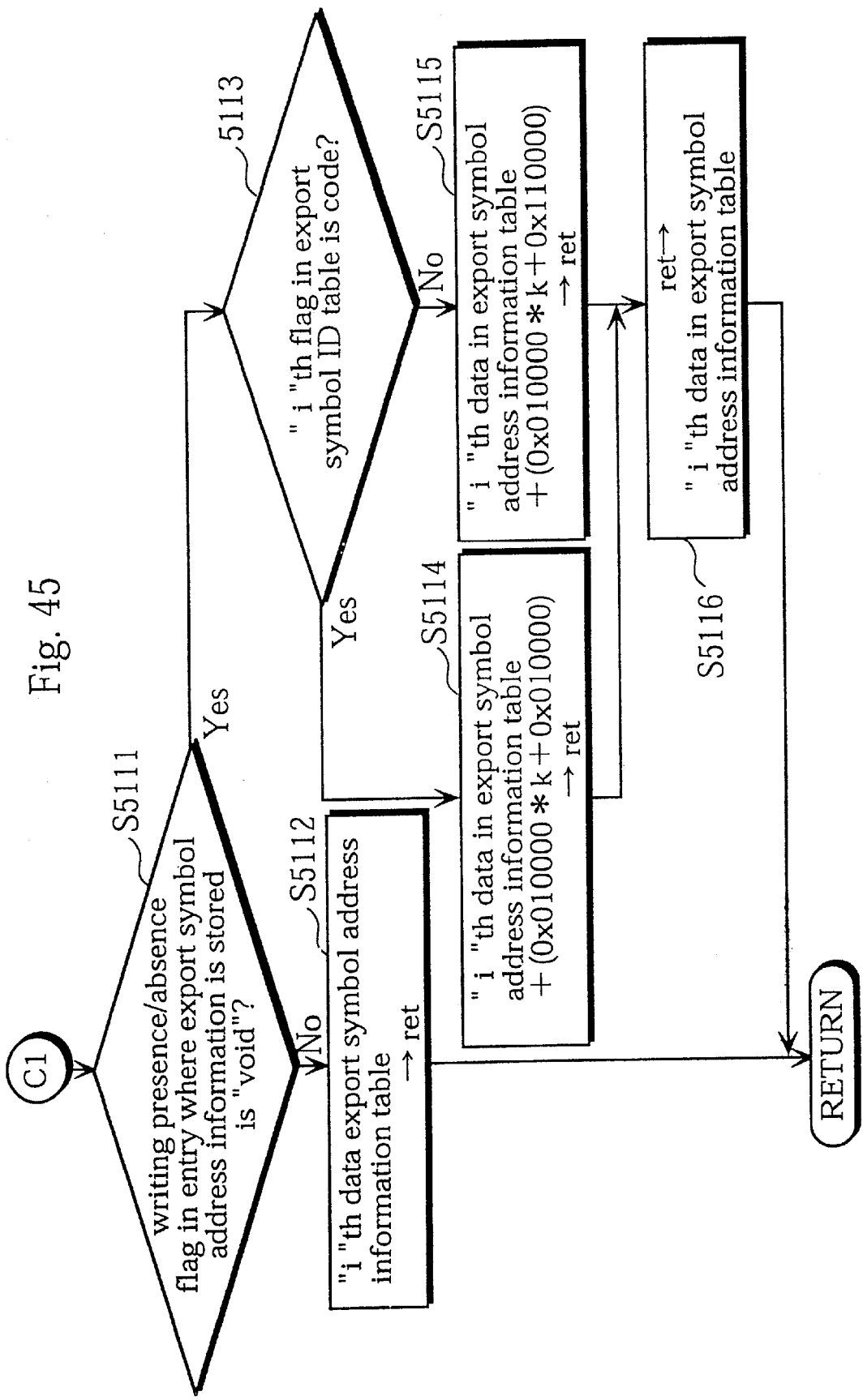
FIG. 45 is a flowchart illustrating operations in the export symbol import step by the program linking apparatus 5000 following the operations in FIG. 44.

An explanation of operations in the export symbol import step 5100 will be given with reference to the flowcharts shown in FIGS. 44 and 45.

In the export symbol import step 5100, the value "0" is substituted into a number "k", which identifies a program (step s5101), and the number "k" is compared with the number of all the programs. When the number "k" is equal to or greater than the number of all the programs (step s5102), the processing ends.

On the other hand, when the number "k" is no greater than the number of the programs (step s5102), the value "0" is substituted into a variable "i", which indicates the number of a symbol (step s5103).

Then, the variable "i" is compared with the number of the symbols. When the variable "i" is equal to or greater than the number of the symbols (step s5104), the value "1" is added to the number "k" (step s5107), and the control is returned to step s5102.

On the other hand, when the variable "i" is no greater than the number of the symbols (step s5104), and when the identifier of a symbol to be retrieved does not match the "i"th identifier in the export symbol ID table (step s5105), the number "1" is added to the variable "i" (step s5106), and the control is returned to step s5104.

Meanwhile, when the identifier of a symbol to be retrieved matches the "i"th identifier in the export symbol ID table (step s5105), when the cache tag corresponding to the data that stores an export symbol address information table includes a writing presence/absence flag "absent" (step s5111), and when the "i"th code flag indicates a "code" in the export symbol ID table (step s5113), the "i"th data in the export symbol address information table, and values "0X010000*k" and "0X010000" are added together, and the result of the addition is substituted into a variable "ret" (step s5114). On the other hand, when the "i"th code flag in the export symbol ID table does not indicate a "code" (step s5113), the "i"th data in the export symbol address information table, values "0X010000*k" and "0X110000" are added together, and the result of the addition is substituted into the variable "ret" (step s5115). Then, the variable "ret" is written in the "i"th data in the export symbol address information table (step s5116), and the processing returns to the program that has called the export symbol import step 5100 with the variable "ret".

Meanwhile, when the cache tag corresponding to the data that stores an export symbol address information table includes a writing presence/absence flag "present" (step s5111), the "i"th data in the export symbol address information table is substituted into the variable "ret" (step s5112), the processing is returned to the program that has called the export symbol import step 5100 with the variable "ret".

Note that although information recorded in the ROM-A 5101, the ROM-B 5102, and the RAM 1103 is directly referred to and updated in the export symbol import step 5100 in the afore-mentioned description, the information is referred to and updated via the cache device 5400. An explanation given below will focus on this point.

Figure 46:
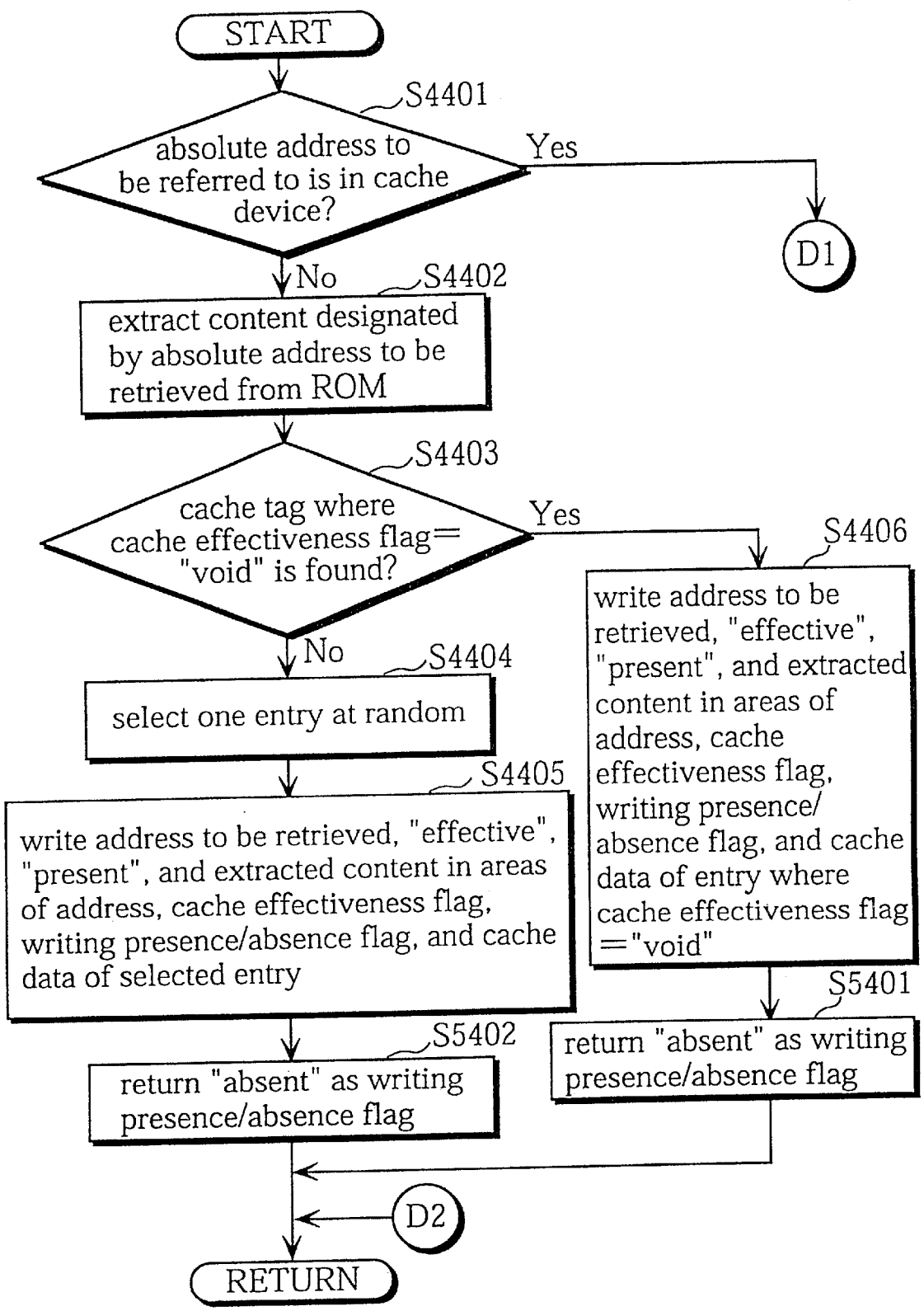
FIG. 46 is a flowchart illustrating operations in the export symbol import step by the program linking apparatus 5000.
Figure 47:
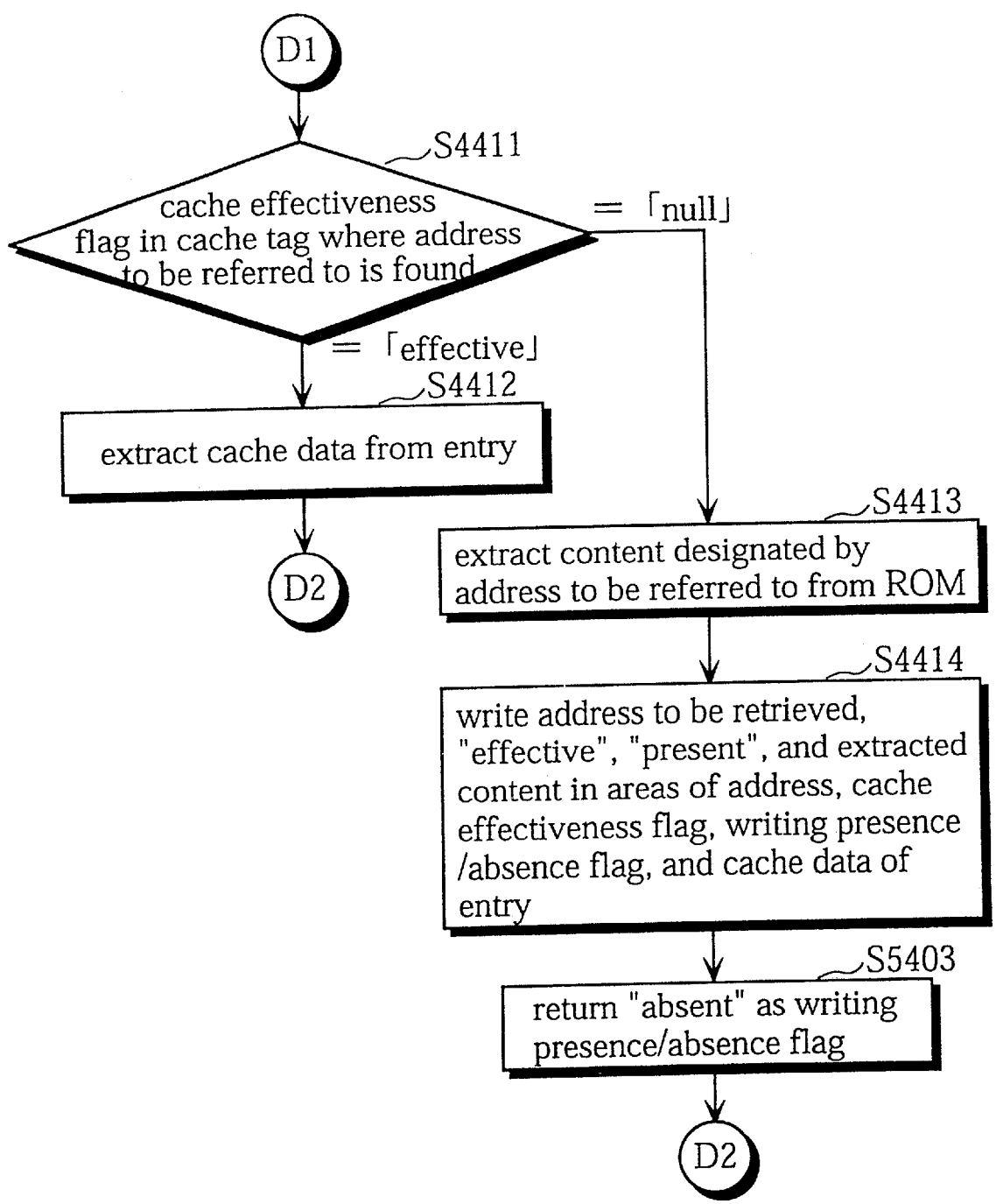
FIG. 47 is a flowchart illustrating operations in the export symbol import step by the program linking apparatus 5000 following the operations in FIG. 46.
Figure 48:
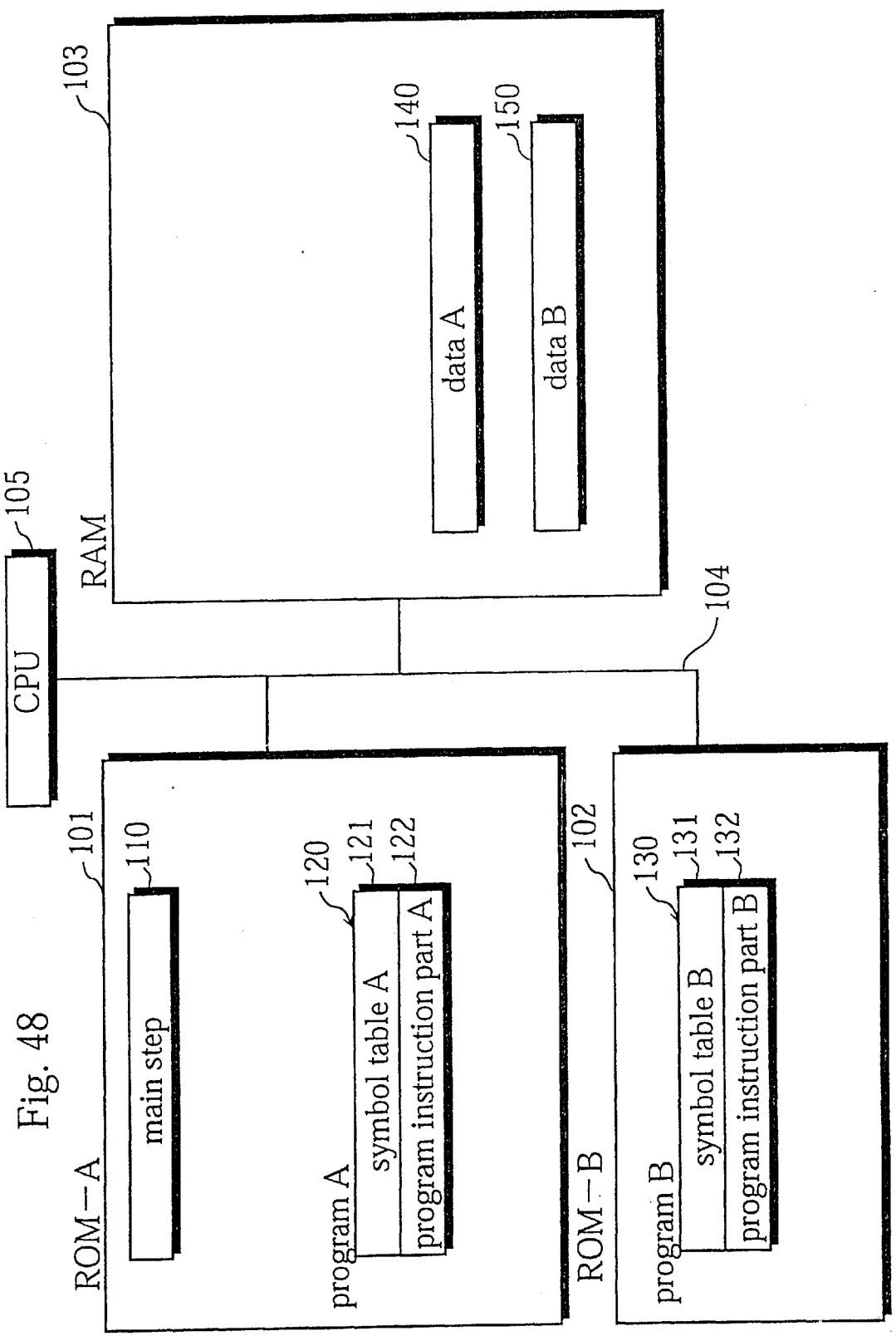
FIG. 48 is a block diagram showing the structure of a conventional program linking apparatus.
Figure 49A:
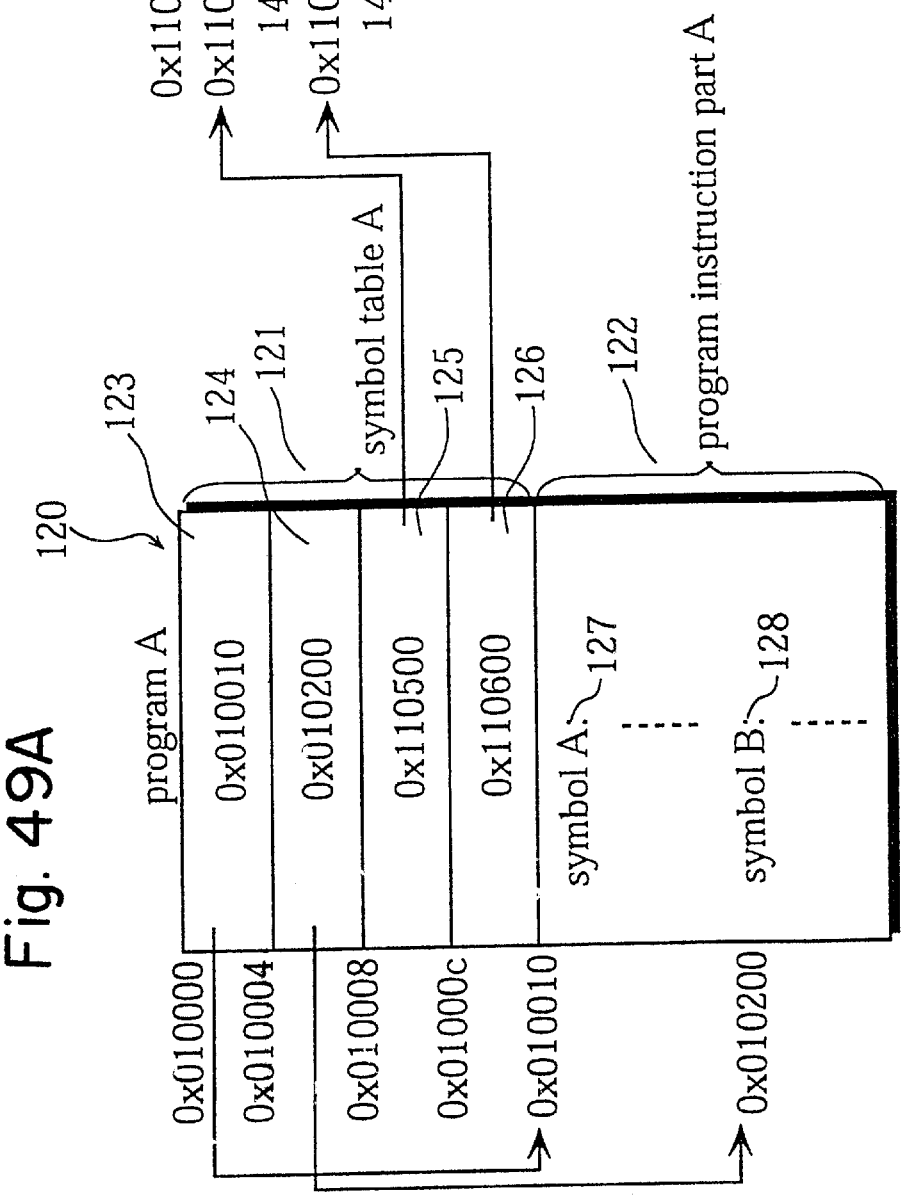
FIG. 49 shows the structure of a program A and data A in the conventional program linking apparatus.
Figure 49B:
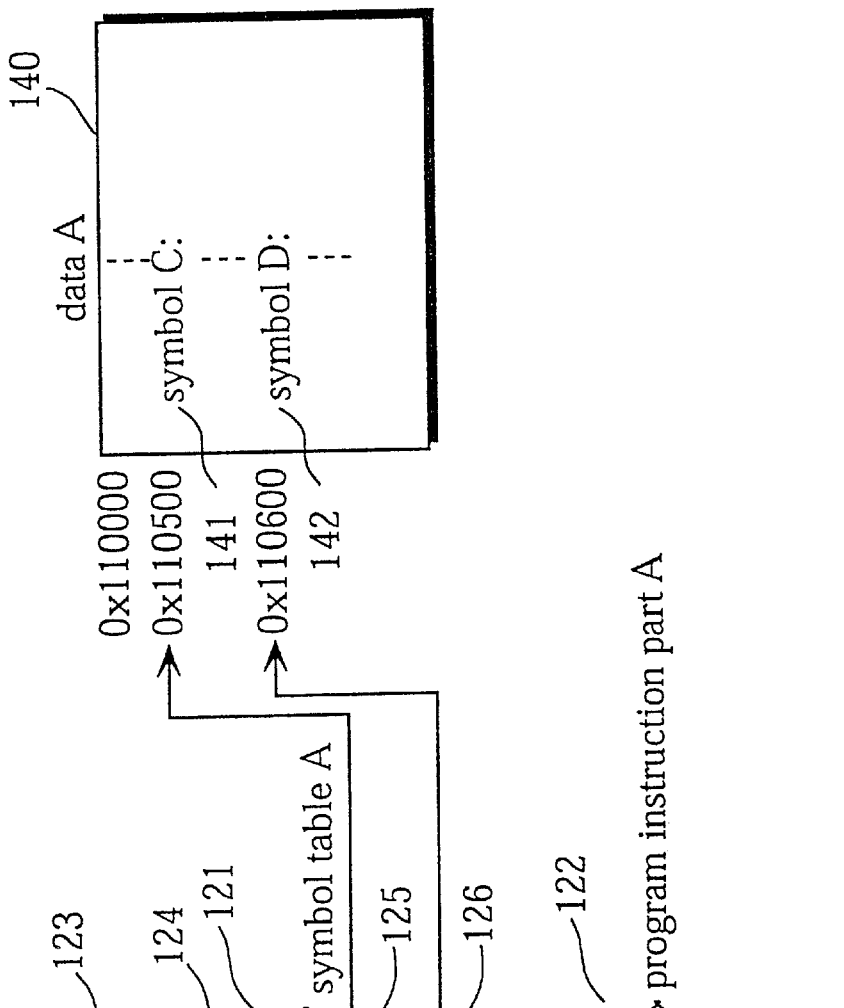
Figure 50B:
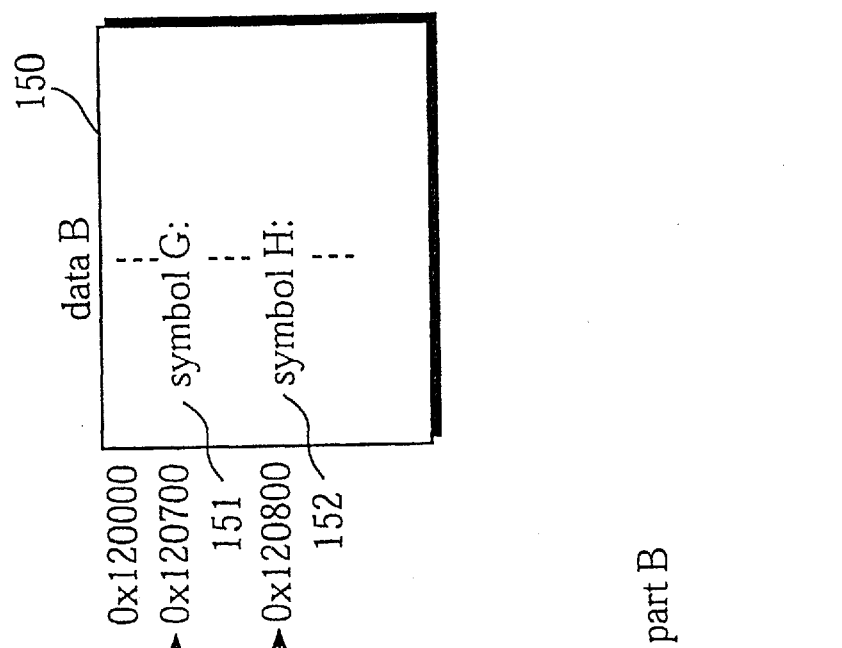
FIG. 50 shows the structure of a program B and data B in the conventional program linking apparatus.
Figure 50A:
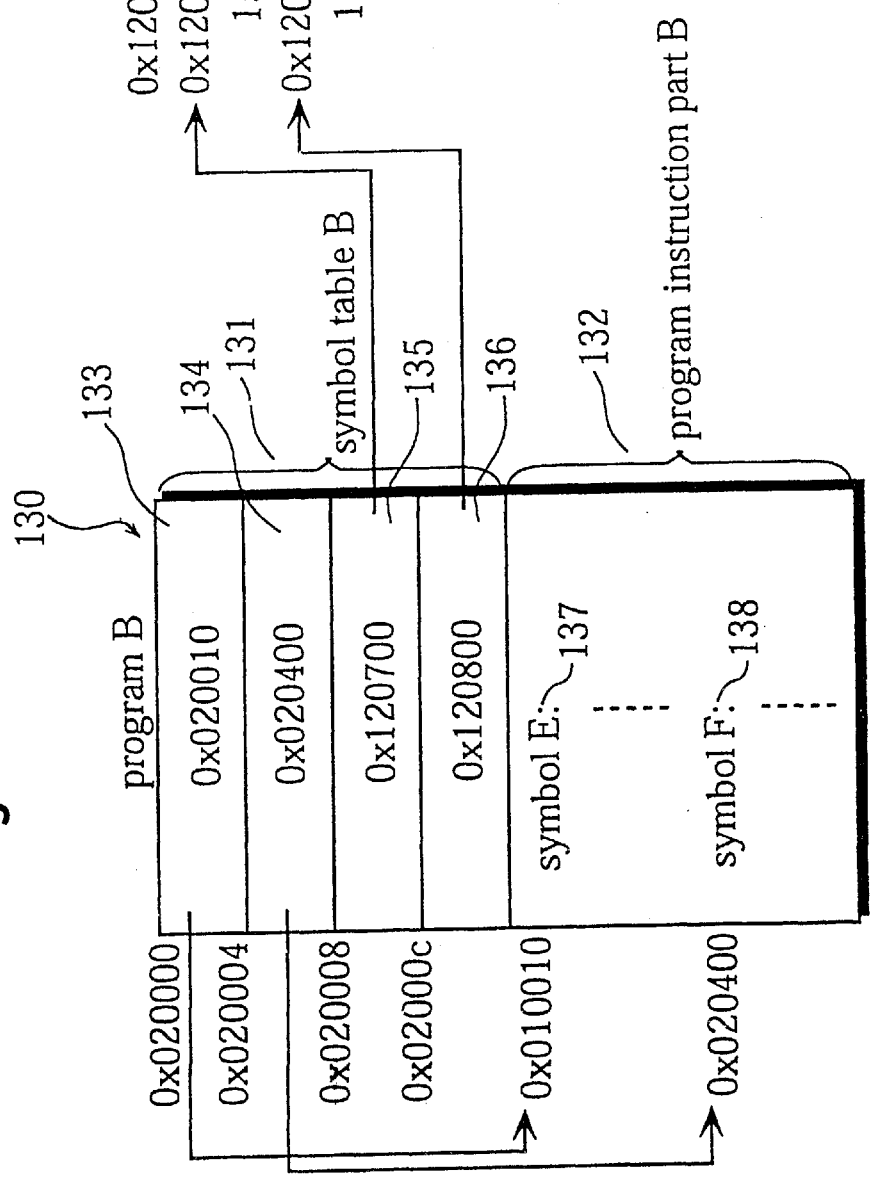
Figure 51:
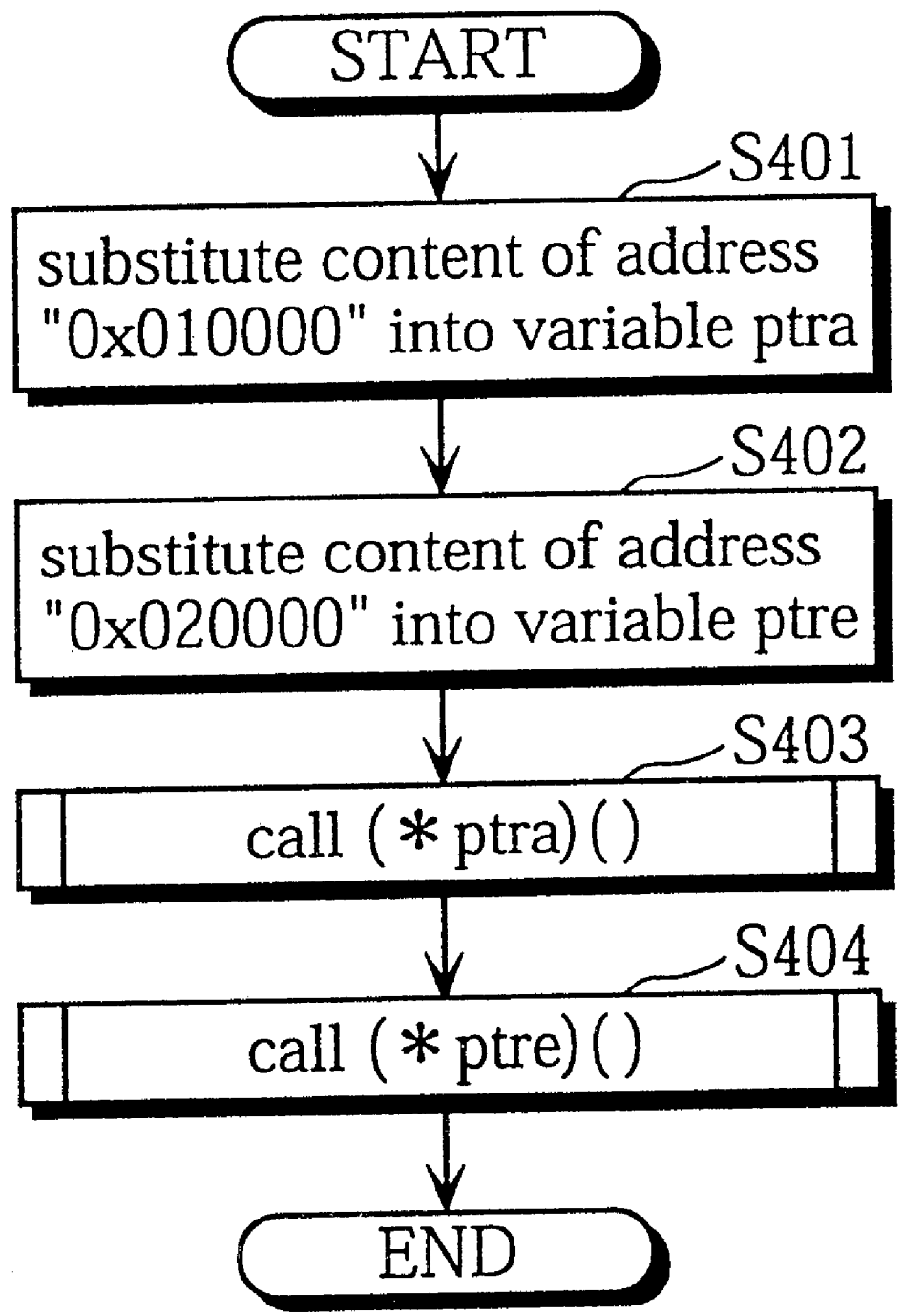
FIG. 51 is a flowchart illustrating the procedure of operations in the main step by the conventional program linking apparatus.

Here, an explanation of operations when information recorded in the ROM-A 5101, the ROM-B 5102, and the RAM 1103 is referred to in the export symbol import step 5100 will be given with reference to the flowcharts shown in FIGS. 46 and 47.

In the export symbol import step 5100, when data recorded in the ROM-A 5101, the ROM-B 5102, and the RAM 1103 is referred to, an absolute address to be referred to is searched for from the cache tag unit in the cache device 5400. When the absolute address is found in the cache tag unit in the cache device 5400 (step s4401), the cache effectiveness flag is referred to. When the cache effectiveness flag indicates "effective" (step s4411), the content of the corresponding entry is extracted from the cache data unit (step s4412), and the processing returns.

On the other hand, when the cache effectiveness flag indicates "void" (step s4411), the data in the area indicated by the absolute address is extracted from the ROM-A 5101, the ROM-B 5102, or the RAM 1103 (step s4413). Then, the absolute address is written as the address, and a cache effectiveness flag "effective" and a writing presence/absence flag "present" are written in the cache tag, and the extracted data is written in the cache data unit (step s4414). A writing presence/absence flag "absent" is returned (step s5403), and the processing returns.

Meanwhile, the absolute address is not found in the cache tag unit in the cache device 5400 (step s4401), the data in the area indicated by the absolute address is extracted from the ROM-A 5101, the ROM-B 5102, or the RAM 1103 (step s4402). Then, when a cache tag that includes a cache effectiveness flag "void" is found (step s4403), the absolute address is written as the address, and a cache effectiveness flag "effective" and a writing presence/absence flag "present" are written in the cache tag, and the extracted data is written in the cache data unit (step s4406). A writing presence/absence flag "absent" is returned (step s5401), and the processing returns.

When the cache effectiveness flag indicates "effective" for all the entries (step s4403), one of the entries is selected at random (step s4404). Then, the absolute address is written as the address and a writing presence/absence flag "present" are written in the cache tag, and the extracted data is written in the cache data unit for the selected entry (step s4405). A writing presence/absence flag "absent" is returned (step s5402), and the processing returns.

Operations when information recorded in the ROM-A 5101, the ROM-B 5102, and the RAM 1103 is updated in the export symbol import step 5100 are the same as those when information recorded in the ROM-A 4101, the ROM-B 4192, and the RAM 1103 is updated in the export symbol import step 4300 shown in FIG. 37 in the fourth embodiment, so that no more explanation will be given in the present embodiment.

5.3. Summary

As has been described, each of the programs and the data is stored in a predetermined location in ROMs, the offsets of the symbols are stored in the programs, and a cache device having a predetermined number of entries is included. In addition, an absolute address of each symbol is created using a predetermined standard and the identifier of the called symbol and the created address are written in the cache device whenever a symbol is called. As a result, when a symbol that has been referred to is referred to again, linkage between programs can be realized via the symbol using the absolute address that has been stored in the cache device according to the present embodiment.

Accordingly, programs need not to store the absolute addresses in themselves, so that the programs recorded in a ROM are independent of the memory map of an embedded microcomputer control system and can be shared by another system having a different memory map.

In addition, even though the sets of the export symbols and the corresponding addresses are not stored in the memory unlike the second and third embodiment, the absolute address of the export symbol that has been converted in the previous reference may remain in the cache at the time of second reference. As a result, the operations in the export symbol import step can be sped up in the present embodiment.

Furthermore, a writing presence/absence flag indicates whether address information that is stored in the export symbol table is an offset or an address, so that the export symbol table can be simplified and the export symbol table in the first embodiment, which is provided with no cache device, can be used. As a result, the same programs can be used regardless of whether a system is provided with a cache device.

6. Other Possible Modifications

Described according to the preferred embodiments, the present invention is not limited to the aforementioned preferred embodiments. Other possible modifications are given below.

(1) The first program is supposed to be stored in a predetermined absolute address and the following program is supposed to be stored at a predetermined interval, and the first data is supposed to be stored in a predetermined absolute address and the following data is supposed to be stored at a predetermined interval in the preferred embodiments. The arrangement of programs and data is not limited to this manner. More specifically, a plurality of programs may be stored at predetermined intervals. Data may be stored in the similar manner.

A table may be included that stores the addresses where the areas starts in which programs and data are stored. In this case, offsets may be converted into absolute addresses using this table in the export symbol import step 1160.

In addition, information on program size and data size may be added to each program header. By doing so, program headers of adjacent programs can be found using the program size information even if programs are adjacent. As a result, programs and pieces of data can be located adjacent to each other. In other words, even if a link list structure is introduced to program headers, the programs and data can be flexibly located.

(2) The number of ROMs is not limited to two. Although each of the programs A and B is supposed to be stored in a different one of the two ROMs in the embodiments, each of more than two programs may be stored in a different one of more than two ROMs. In this case, the first, second, and third programs are stored in the areas indicated by the absolute addresses "0X010000", "0X020000", and "0X030000", respectively. The following programs are stored in the same manner. In addition, the first, second, and third pieces of data are stored in the areas indicated by the absolute addresses "0X110000", "0X120000", and "0X130000", respectively. The following data are also stored in the same manner.

(3) A magic number of a predetermined value may be added to a program header for finding the program header so that the presence and the location of a program can be detected.

(4) Although the variable "XXXXX" is supposed to be stored in the data area indicated by the symbol G in the lines 1304 and 1305 in the program block shown in FIG. 4, the value that has been stored in the data area indicated by the symbol G may be referred to. For instance, the value stored in the data area indicated by the symbol G may be stored in the variable "X".

In addition, the program block indicated by the symbol F is supposed to be called in the lines 1302 and 1303 in the program block shown in FIG. 4 and the variable "XXXXX" is supposed to be stored in the data area indicated by the symbol G in the lines 1304 and 1305, a program block K may be called with the value stored in the data area indicated by a symbol J as the argument. Here, data is written in the data area indicated by the symbol J or the data written in the data area indicated by the symbol J is referred to in the program block K. In this case, the absolute address of the area where the program block K is stored and the absolute address of the data area indicated by the symbol J are calculated in the export symbol import step before the program block K is called, the program block K is called using the calculated absolute addresses, and data is written in the data area indicated by the symbol J or the data written in the data area indicated by the symbol J is referred to.

(5) Although read only semiconductor memories (ROMs) are supposed to be used in the embodiments, a rewriteable storage device such as a flash memory may be used.

(6) An explanation of a digital broadcast reception apparatus will be given below as an example of the application of the program linking apparatus in the embodiments.

A digital broadcast reception apparatus needs to be equipped with different reception units according to different data transmission systems since different digital broadcast businesses often adopt different data transmission systems.

At the broadcasting station of a broadcast business, the digital broadcast transmission apparatus creates coded data strings by compression coding video, audio, and program information, computer programs used by digital broadcast reception apparatus, and the like according to the data transmission system of the broadcast business, multiplexes coded data strings of a plurality of programs to create one transport stream, performs digital modulation on the created transport stream, and transmits the transport stream as digital a broadcast wave.

A digital broadcast reception apparatus that receives digital broadcasting provided by one broadcast business receives digital broadcast waves using a reception system corresponding to the transmission system of the broadcast business, and performs the operations by the digital broadcast transmission apparatus in a retrograde order. More specifically, the digital broadcast reception apparatus performs digital demodulation with a tuner, and separates the plurality of programs that have been multiplexed into the transport stream, extracts a desired program. Then, the digital broadcast reception apparatus performs expansion decoding on video, audio, program information, and the like, and outputs the video, audio, and the program information. In addition, when received, a computer program is stored in the digital broadcast reception apparatus.

When the user receives a digital broadcast provided by another broadcast business, the digital broadcast reception apparatus receives an operation instruction from the user via a remote controller and the like, receives a computer program in the reception system corresponding to the transmission system of the second broadcast business. Then, the digital broadcast reception apparatus rewrites the computer program that has been stored in itself, receives the digital broadcast transmitted by the second broadcast business using the rewritten computer program, and outputs the video, audio, and the program information.

More specifically, the digital broadcast reception apparatus includes an antenna, a tuner, a DSCR (descrambler), a TD (Transport Decoder), an AD (Audio Decoder), a VD (Video Decoder), a VRAM, an image synthesis unit, a speaker, a monitor, a microprocessor, a plurality of flash memories, a scratchpad memory, and a remote controller. The antenna receives digital broadcast waves. The tuner selects the signals of the channel that has been designated by a received broadcast wave, decodes the selected signals, and creates a transport stream (TS) after error correction. The DSCR descrambles the TS. The TD extracts program information, an audio stream, a video stream from the descrambled TS. The AD decodes the extracted audio stream, creates audio signals, and supplies the created audio signals to the speaker. The VD decodes the extracted video stream and creates video signals. The VRAM stores images to be displayed. The image synthesis unit synthesizes the created video signals and the images stored in the VRAM to create synthetic images, and outputs the created synthetic images to the monitor. The speaker outputs audio. The monitor display synthetic images. The flash memories store computer programs. The remote controller receives user operations.

The programs stored in the flash memories include a kernel program and a library program as the operation system (OS), and an electronic program guide program (EPG), a digital broadcast reception program, and a download program as the application programs. The kernel program controls the execution of the computer programs. The library program stores the computer programs commonly used by many computer programs. The EPG selects and displays program information. The digital broadcast reception program demultiplexes transport streams and performs expansion decoding on video, audio, and program information. The download program newly receives a program to be operated by the microprocessor from the digital wave, and writes the received program on a flash memory via the scratchpad memory.

The flash memories and the scratchpad memory have the same structure as the programs and data stored in the ROM-A 1101, the ROM-B 1102, and the RAM 1103 in the program linking apparatus 1000. More specifically, the flash memories and the scratchpad memory stores the same programs and data in the main step 1110, the export symbol import step 1160, the program A 1120, the jump table 1170, and the data A 1140 in the program linking apparatus 1000.

In other words, the kernel program and the library program as the OS and the EPG, the digital broadcast reception program, and the download program as the application programs have the same structure as the programs in the program linking apparatus 1000.

As a result, when the user receives a digital broadcast provided by another broadcast business, the digital broadcast reception apparatus receives an operation instruction from the user via a remote controller and the like, and the download program receives a program in the reception system corresponding to the transmission system of the second broadcast business and writes the received program in the flash memory via the scratchpad memory Then, the digital broadcast reception apparatus receives the digital broadcast provided by the second broadcast business and outputs the video, the audio, and the program information by calling and executing the computer program that has been newly written in the flash memory as in the case of the program linking apparatus 1000. By doing so, the digital broadcast reception apparatus has the same effects as the program linking apparatus 1000.

Note that the computer program that has been stored by the digital broadcast reception apparatus also needs to be changed in the cases, for instance, the first broadcast business changes the transmission system in order to improve the contents of its digital broadcast services, and the originally stored computer program is not described according to the design and does not operate as expected due to defects.

Furthermore, the digital broadcast reception apparatus may have the same structure as the program linking apparatus in any of the embodiments.

Although the explanation of a digital broadcast reception apparatus has been given as an application of the modification of the program linking apparatuses in the embodiments, the embodiments may be applied to other apparatuses such as a reception control apparatus for a cable TV, a terminal for karaoke systems using communication lines, a video-on-demand VCR, an interactive TV set, and an Internet TV apparatus.

In addition, these embodiments may be realized as a set-top box. Usually set on a TV, this apparatus is called "set-top box". A set-top box is connected to a home TV set, and provides additional functions such as a digital broadcast reception apparatus, a reception control apparatus for a cable TV, a terminal for karaoke systems using communication lines, a video-on-demand VCR, an interactive TV set, and an Internet TV apparatus.

Preferred applications of the embodiments are electrical appliances having limited functions rather than general purpose computers (for instance, personal computers), which are provided with high-performance microprocessors and high-capacity memories and to be used for a variety of purposes.

Such electrical appliances are not provided with high-performance microprocessors and high-capacity memories. This is because the expected, limited functions and performance can be realized without high-performance microprocessors and high-capacity memories, and the lower cost helps achieve widespread use.

As a result, even if the program linking apparatuses in the embodiments are applied for electric appliances without high-performance microprocessors and high-capacity memories, a plurality of programs can be linked.

(7) Another preferred embodiment of the present invention is a computer-readable recording medium on which a program linking program that has a computer execute the program linking method that has been described is recorded. A further preferred embodiment of the present invention may be a transmission medium composed of a communication line that transmits the program linking program.

Yet another preferred embodiment of the present invention may be the program linking program that is recorded on the computer-readable recording medium, the program linking program that is transmitted via communication lines, and computer digital signals that compose the program linking program.

(8) The embodiments, the modifications, and part of the embodiments and the modifications may be combined with each other.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included, therein.

What is claimed is:

1. A program linking apparatus for linking and executing one program with another program using a microprocessor, the program linking apparatus comprising:

a first read only semiconductor memory having a first storage area which stores a first program, the first storage area being located in a storage space within the program linking apparatus, the storage space being represented by an absolute address system, wherein the first program includes an executable instruction and a data set associated with the executable instruction, the data set consisting of an instruction identifier which identifies the executable instruction and an instruction address which shows a location of the executable instruction in the first program, the instruction address being an offset address showing a location of the executable instruction relative to a beginning location of the first program;

a second read only semiconductor memory having a second storage area which stores a second program, the second storage area being located in the storage space so as not to overlap the first storage area, wherein the second program includes a call instruction which calls the executable instruction, the call instruction including an instruction identifier that identifies the executable instruction;

absolute address obtaining means for storing beginning location information that shows an absolute address of the beginning location of the first program in the storage space, and for having the microprocessor (a) obtain the instruction identifier which is included in the call instruction in the second program, (b) obtain the data set in the first program that includes the same instruction identifier as the obtained instruction identifier, and (c) obtain an instruction location address that shows a location of the executable instruction in the storage space, using the instruction address included in the obtained data set and the beginning location information; and executing means for having the microprocessor execute the executable instruction stored in the location shown by the obtained instruction location address, to execute the executable instruction called by the call instruction.

2. The program linking apparatus of claim 1, wherein the absolute address obtaining means (a) reads the call instruction from the second program which is stored in the second storage area, and extracts the instruction identifier from the call instruction, (b) extracts the instruction address from the first program which is stored in the first storage area, the instruction address being included in the data set along with the same instruction identifier as the extracted instruction identifier, and (c) adds the extracted instruction address to the beginning location information to obtain the instruction location address.

3. The program linking apparatus of claim 1, wherein the absolute address obtaining means includes:

location information storing means for storing the beginning location information that shows the absolute address of the beginning location of the first program in the storage space; a reference table having a storage area designated for storage of a data set which includes the instruction identifier and the instruction location address;

absolute address creating means for (a) reading the call instruction from the second program stored in the second storage area, and extracting the instruction identifier from the call instruction, (b) extracting, from the first program stored in the first storage area, the data set that includes the same instruction identifier as the extracted instruction identifier, and extracting the instruction address from the extracted data set, and (c) adding the extracted instruction address to the beginning location information to produce the instruction location address;

reference table writing means for writing a data set which includes the extracted instruction identifier and the produced instruction location address into the reference table;

absolute address extraction means for (a) reading the call instruction from the second program stored in the second storage area, (b) extracting the instruction identifier from the call instruction, and (c) extracting, from the reference table, the instruction location address that is stored in association with the extracted instruction identifier to obtain the instruction location address.

4. The program linking apparatus of claim 1, wherein the absolute address obtaining means includes:

location information storing means for storing the beginning location information that shows the absolute address of the beginning location of the first program in the storage space;

a reference table having a storage area designated for storage of a data set which includes the instruction identifier and the instruction location address;

judging means for (a) reading the call instruction from the second program stored in the second storage area, (b) extracting the instruction identifier from the call instruction, and (c) judging whether the extracted instruction identifier exists in the reference table; and registration means for, when the judging means determines that the extracted instruction identifier does not exist in the reference table, (a) extracting, from the first program stored in the first storage area, the data set that includes the same instruction identifier as the extracted instruction identifier, and extracting the instruction address from the extracted data set, (b) adding the extracted instruction address to the beginning location information to produce the instruction location address, and (c) writing a data set including the extracted instruction identifier and the produced instruction location address into the reference table;

wherein the executing means executes the executable instruction called by the call instruction, using the instruction location address produced by the registration means, and wherein in the program linking apparatus, after the executable instruction is executed, the executable instruction called by the call instruction is executed, the absolute address obtaining means further includes:

reading means for, when the judging means determines that the extracted instruction identifier exists in the reference table, reading the instruction location address that is in correspondence with the extracted instruction identifier from the reference table to obtain the instruction location address, wherein the execution means further executes the executable instruction called by the call instruction, using the instruction location address obtained by the reading means.

5. The program linking apparatus of claim 1, wherein the data set included in the first program stored in the first storage area further includes offset information, the offset information showing that the instruction address included in the data set is an offset address, the absolute address obtaining means includes:

location information storing means for storing the beginning location information that shows the absolute address of the beginning location of the first program in the storage space;

a cache table having a storage area designated for storage of a data set which includes an address flag, the instruction identifier and the instruction address, the address flag showing whether the instruction address is the offset address or the absolute address, the instruction identifier identifying the executable instruction, the instruction address showing the location of the executable instruction in the first program, wherein when the address flag indicates the offset address, the instruction address is the offset address, and when the address flag indicates the absolute address, the instruction address is the absolute address;

instruction identifier extracting means for reading the call instruction from the second program stored in the second storage area, and extracting the instruction identifier from the call instruction;

address extracting means for judging whether the extracted instruction identifier exists in the cache table or not, and when it determines that the extracted instruction identifier does not exist in the cache table, extracting the offset information and the instruction address from the first program stored in the first storage area, the offset information being included in the data set along with the same instruction identifier as the extracted instruction identifier;

absolute address creating means for, when the offset information extracted by the address extracting means indicates the offset address, adding the extracted instruction address to the beginning location information to obtain the instruction location address;

cache table writing means for, when the offset information extracted by the address extracting means indicates the offset address, writing the data set including the address flag which indicates the absolute address, the extracted instruction identifier and the instruction location address, into the cache table, as the data set of the address flag, the instruction identifier and the instruction address, wherein the executing means executes the executable instruction called by the call instruction, using the instruction location address obtained by the absolute address creating means, wherein in the program linking apparatus, after the executable instruction is executed, the executable instruction called by the call instruction is further executed, the address extracting means further extracts, from the cache table, the address flag and the instruction address associated with the extracted instruction identifier when it determines that the extracted instruction identifier exists in the cache table, the absolute address creating means, when the address flag extracted by the address extracting means indicates the absolute address, further obtains the instruction location address, and the executing means further executes the executable instruction called by the call instruction, using the instruction location address obtained by the absolute address creating means.

6. The program linking apparatus of claim 1, wherein the absolute address obtaining means includes:

location information storing means for storing the beginning location information that shows the absolute address of the beginning location of the first program in the storage space;

a cache table having a storage area designated for storage of a data set including a writing flag, the instruction identifier and the instruction address, the writing flag showing whether the instruction address is the offset address or the absolute address, the instruction identifier identifying the executable instruction, the instruction address showing the location of the executable instruction in the first program, wherein when the writing flag indicates the offset address, the instruction address is the offset address, and when the writing flag indicates the absolute address, the instruction address is the absolute address;

instruction identifier extracting means for reading the call instruction from the second program stored in the second storage area, and extracting the instruction identifier from the call instruction;

address extracting means for judging whether the extracted instruction identifier exists in the cache table, and when it determines that the extracted instruction identifier does not exist in the cache table, extracting, from the first program stored in the first storage area, the instruction address that is included in the data set along with the same instruction identifier as the extracted instruction identifier, and when it determines that the extracted instruction identifier exists in the cache table, extracting the writing flag and the instruction address that are associated with the extracted instruction identifier from the cache table;

absolute address creating means for, when the address extracting means determines that the extracted instruction identifier does not exist in the cache table or when the writing flag extracted by the address extracting means indicates the offset address, adding the extracted instruction address to the beginning location information to obtain the instruction location address; and cache table writing means for, when the address extracting means determines that the extracted instruction identifier does not exist in the cache table or when the writing flag extracted by the address extracting means indicates the offset address, writing the data set which includes the address flag indicating the absolute address, the extracted instruction identifier and the instruction location address, into the cache table, as the data set of the writing flag, the instruction identifier and the instruction address, wherein the executing means executes the executable instruction called by the call instruction, using the instruction location address obtained by the absolute address creating means, in the program linking apparatus, after the executable instruction is executed, the executable instruction called by the call instruction is further executed, the absolute address creating means, when the writing flag extracted by the address extracting means indicates the absolute address, obtains the instruction location address by employing the instruction address as the instruction location address, and the executing means further executes the executable instruction called by the call instruction, using the instruction location address obtained by the absolute address creating means.

7. The program linking apparatus of claim 1, wherein the second program further includes a variable instruction, the variable instruction including a variable identifier that identifies a variable and giving an instruction to perform an operation related to the variable, the first program further has a variable area and stores a data set including the variable identifier that identifies the variable and a variable address, the data set being stored in correspondence with the variable area, the variable area being an area designated for storage of the variable, the variable address showing a location of the variable area in the first program, the absolute address obtaining means further (a) obtains the variable identifier included in the variable instruction, (b) obtains the data set which includes the same variable identifier as the obtained variable identifier, and (c) obtains the instruction location address in the storage space of the variable area, in which the variable identified by the variable identifier included in the variable instruction is stored, using the beginning location information and the variable address included in the data set, and the executing means further executes the variable instruction, using the variable area indicated by the obtained instruction location address, to perform the operation related to the variable.

8. A program linking apparatus for linking and executing one program with another program using a microprocessor, the program linking apparatus comprising:

a first read only semiconductor memory having a first storage area which stores a first program, the first storage area being located in a storage space within the program liking apparatus, the storage space being represented by an absolute address system, wherein the first program includes an executable instruction and a data set associated with the executable instruction, the data set consisting of an instruction identifier which identifies the executable instruction and an instruction address which shows a location of the executable instruction in the first program, the instruction address being an offset address showing a location of the executable instruction relative to a beginning location of the first program;

a second read only semiconductor memory having a second storage area which stores a second program, the second storage area being located in the storage space so as not to overlap the first storage area, wherein the second program includes a call instruction which calls the executable instruction, the call instruction including an instruction identifier that identifies the executable instruction;

absolute address obtaining means for storing beginning location information that shows an absolute address of the beginning location of the first program in the storage space, and for having the microprocessor (a) obtain the instruction identifier which is included in the call instruction in the second program, (b) obtain the data set in the first program that includes the same instruction identifier as the obtained instruction identifier, and (c) obtain an instruction location address that shows a location of the executable instruction in the storage space, using the instruction address included in the obtained data set and the beginning location information; and executing means for having the microprocessor execute the executable instruction stored in the location shown by the obtained instruction location address, to execute the executable instruction called by the call instruction, wherein, the absolute address obtaining means includes:

location information storing means for storing the beginning location information that shows the absolute address of the beginning location of the first program in the storage space;

a reference table having a storage area designated for storage of a data set which includes the instruction identifier and the instruction location address;

judging means for (a) reading the call instruction from the second program stored in the second storage area, (b) extracting the instruction identifier from the call instruction, and (c) judging whether the extracted instruction identifier exists in the reference table; and registration means for, when the judging means determines that the extracted instruction identifier does not exist in the reference table, (a) extracting, from the first program stored in the first storage area, the data set that includes the same instruction identifier as the extracted instruction identifier, and extracting the instruction address from the extracted data set, (b) adding the extracted instruction address to the beginning location information to produce the instruction location address, and (c) writing a data set including the extracted instruction identifier and the produced instruction location address into the reference table, wherein the executing means executes the executable instruction called by the call instruction, using the instruction location address produced by the registration means, and in the program linking apparatus, after the executable instruction is executed, the executable instruction called by the call instruction is executed, the absolute address obtaining means further includes:

reading means for, when the judging means determines that the extracted instruction identifier exists in the reference table, reading the instruction location address that is in correspondence with the extracted instruction identifier from the reference table to obtain the instruction location address, wherein the execution means further executes the executable instruction called by the call instruction, using the instruction location address obtained by the reading means.

9. A program linking apparatus for linking and executing one program with another program using a microprocessor, the program linking apparatus comprising:

a first read only semiconductor memory having a first storage area which stores a first program, the first storage area being located in a storage space within the program linking apparatus, the storage space being represented by an absolute address system, wherein the first program includes an executable instruction and a data set associated with the executable instruction, the data set consisting of an instruction identifier which identifies the executable instruction and an instruction address which shows a location of the executable instruction in the first program, the instruction address being an offset address showing a location of the executable instruction relative to a beginning location of the first program;

a second read only semiconductor memory having a second storage area which stores a second program, the second storage area being located in the storage space so as not to overlap the first storage area, wherein the second program includes a call instruction which calls the executable instruction, the call instruction including an instruction identifier that identifies the executable instruction;

absolute address obtaining means for storing beginning location information that shows an absolute address of the beginning location of the first program in the storage space, and for having the microprocessor (a) obtain the instruction identifier which is included in the call instruction in the second program, (b) obtain the data set in the first program that includes the same instruction identifier as the obtained instruction identifier, and (c) obtain an instruction location address that shows a location of the executable instruction in the storage space, using the instruction address included in the obtained data set and the beginning location information; and executing means for having the microprocessor execute the executable instruction stored in the location shown by the obtained instruction location address,to execute the executable instruction called by the call instruction, wherein the data set included in the first program stored in the first storage area further includes offset information, the offset information showing that the instruction address included in the data set is an offset address, the absolute address obtaining means includes:

location information storing means for storing the beginning location information that shows the absolute address of the beginning location of the first program in the storage space;

a cache table having a storage area designated for storage of a data set which includes an address flag, the instruction identifier and the instruction address, the address flag showing whether the instruction address is the offset address or the absolute address, the instruction identifier identifying the executable instruction, the instruction address showing the location of the executable instruction in the first program, wherein when the address flag indicates the offset address, the instruction address is the offset address, and when the address flag indicates the absolute address, the instruction address is the absolute address;

instruction identifier extracting means for reading the call instruction from the second program stored in the second storage area, and extracting the instruction identifier from the call instruction;

address extracting means for judging whether the extracted instruction identifier exists in the cache table or not, and when it determines that the extracted instruction identifier does not exist in the cache table, extracting the offset information and the instruction address from the first program stored in the first storage area, the offset information being included in the data set along with the same instruction identifier as the extracted instruction identifier;

absolute address creating means for, when the offset information extracted by the address extracting means indicates the offset address, adding the extracted instruction address to the beginning location information to obtain the instruction location address;

cache table writing means for, when the offset information extracted by the address extracting means indicates the offset address, writing the data set including the address flag which indicates the absolute address, the extracted instruction identifier and the instruction location address, into the cache table, as the data set of the address flag, the instruction identifier and the instruction address, wherein the executing means executes the executable instruction called by the call instruction, using the instruction location address obtained by the absolute address creating means, in the program linking apparatus, after the executable instruction is executed, the executable instruction called by the call instruction is further executed, the address extracting means further extracts, from the cache table, the address flag and the instruction address associated with the extracted instruction identifier when it determines that the extracted instruction identifier exists in the cache table, the absolute address creating means, when the address flag extracted by the address extracting means indicates the absolute address, further obtains the instruction location address, and the executing means further executes the executable instruction called by the call instruction, using the instruction location address obtained by the absolute address creating means.

10. A program linking apparatus for linking and executing one program with another program using a microprocessor, the program linking apparatus comprising:

a first read only semiconductor memory having a first storage area which stores a first program, the first storage area being located in a storage space within the program lining apparatus, the storage space being represented by an absolute address system, wherein the first program includes an executable instruction and a data set associated with the executable instruction, the data set consisting of an instruction identifier which identifies the executable instruction and an instruction address which shows a location of the executable instruction in the first program, the instruction address being an offset address showing a location of the executable instruction relative to a beginning location of the first program;

a second read only semiconductor memory having a second storage area which stores a second program, the second storage area being located in the storage space so as not to overlap the first storage area, wherein the second program includes a call instruction which calls the executable instruction, the call instruction including an instruction identifier that identifies the executable instruction;

absolute address obtaining means for storing beginning location information that shows an absolute address of the beginning location of the first program in the storage space, and for having the microprocessor (a) obtain the instruction identifier which is included in the call instruction in the second program, (b) obtain the data set in the first program that includes the same instruction identifier as the obtained instruction identifier, and (c) obtain an instruction location address that shows a location of the executable instruction in the storage space, using the instruction address included in the obtained data set and the beginning location information; and executing means for having the microprocessor execute the executable instruction stored in the location shown by the obtained instruction location address, to execute the executable instruction called by the call instruction, wherein the absolute address obtaining means includes:

location information storing means for storing the beginning location information that shows the absolute address of the beginning location of the first program in the storage space;

a cache table having a storage area designated for storage of a data set including a writing flag, the instruction identifier and the instruction address, the writing flag showing whether the instruction address is the offset address or the absolute address, the instruction identifier identifying the executable instruction, the instruction address showing the location of the executable instruction in the first program, wherein when the writing flag indicates the offset address, the instruction address is the offset address, and when the writing flag indicates the absolute address, the instruction address is the absolute address;

instruction identifier extracting means for reading the call instruction from the second program stored in the second storage area, and extracting the instruction identifier from the call instruction;

address extracting means for judging whether the extracted instruction identifier exists in the cache table, and when it determines that the extracted instruction identifier does not exist in the cache table, extracting, from the first program stored in the first storage area, the instruction address that is included in the data set along with the same instruction identifier as the extracted instruction identifier, and when it determines that the extracted instruction identifier exists in the cache table, extracting the writing flag and the instruction address that are associated with the extracted instruction identifier from the cache table;

absolute address creating means for, when the address extracting means determines that the extracted instruction identifier does not exist in the cache table or when the writing flag extracted by the address extracting means indicates the offset address, adding the extracted instruction address to the beginning location information to obtain the instruction location address; and cache table writing means for, when the address extracting means determines that the extracted instruction identifier does not exist in the cache table or when the writing flag extracted by the address extracting means indicates the offset address, writing the data set which includes the address flag indicating the absolute address, the extracted instruction identifier and the instruction location address, into the cache table, as the data set of the writing flag, the instruction identifier and the instruction address, wherein the executing means executes the executable instruction called by the call instruction, using the instruction location address obtained by the absolute address creating means, in the program linking apparatus, after the executable instruction is executed, the executable instruction called by the call instruction is further executed, the absolute address creating means, when the writing flag extracted by the address extracting means indicates the absolute address, obtains the instruction location address by employing the instruction address as the instruction location address, and the executing means further executes the executable instruction called by the call instruction, using the instruction location address obtained by the absolute address creating means.

11. A program linking method used in a program linking apparatus for linking and executing one program with another program using a microprocessor, the program linking apparatus comprising:

a first read only semiconductor memory having a first storage area which stores a first program, the first storage area being located in a storage space within the program linking apparatus, the storage space being represented by an absolute address system, wherein the first program includes an executable instruction and a data set associated with the executable instruction, the data set consisting of an instruction identifier which identifies the executable instruction and an instruction address which shows a location of the executable instruction in the first program, the instruction address being an offset address showing a location of the executable instruction relative to a beginning location of the first program;

a second read only semiconductor memory having a second storage area which stores a second program, the second storage area being located in the storage space so as not to overlap the first storage area, wherein the second program includes a call instruction which calls the executable instruction, the call instruction including an instruction identifier that identifies the executable instruction; and absolute address obtaining means for storing beginning location information that shows an absolute address of the beginning location of the first program in the storage space, the program linking method, comprising:

an absolute address obtaining step for having the microprocessor (a) obtain the instruction identifier which is included in the call instruction in the second program, (b) obtain the data set in the first program that includes the same instruction identifier as the obtained instruction identifier, and (c) obtain an instruction location address that shows a location of the executable instruction in the storage space, using the instruction address included in the obtained data set and the beginning location information; and executing step for having the microprocessor execute the executable instruction stored in the location shown by the obtained instruction location address, to execute the executable instruction called by the call instruction.

12. The program liking method of claim 11, wherein the absolute address obtaining step (a) reads the call instruction from the second program which is stored in the second storage area, and extracts the instruction identifier from the call instruction, (b) extracts the instruction address from the first program which is stored in the first storage area, the instruction address being included in the data set along with the same instruction identifier as the extracted instruction identifier, and (c) adds the extracted instruction address to the beginning location information to obtain the instruction location address.

13. The program lining method of claim 11, wherein the absolute address obtaining means includes:

location information storing means for storing the beginning location information that shows the absolute address of the beginning location of the first program in the storage space;

a reference table having a storage area designated for storage of a data set which includes the instruction identifier and the instruction location address;

the absolute address obtaining step includes:

absolute address creating step for (a) reading the call instruction from the second program stored in the second storage area, and extracting the instruction identifier from the call instruction, (b) extracting, from the first program stored in the first storage area, the data set that includes the same instruction identifier as the extracted instruction identifier, and extracting the instruction address from the extracted data set, and (c) adding the extracted instruction address to the beginning location information to produce the instruction location address;

reference table writing step for writing a data set which includes the extracted instruction identifier and the produced instruction location address into the reference table;

absolute address extraction step for (a) reading the call instruction from the second program stored in the second storage area, (b) extracting the instruction identifier from the call instruction, and (c) extracting, from the reference table, the instruction location address that is stored in association with the extracted instruction identifier to obtain the instruction location address.

14. The program linking method of claim 11, wherein the absolute address obtaining means includes:

location information storing means for storing the beginning location information that shows the absolute address of the beginning location of the first program in the storage space; and a reference table having a storage area designated for storage of a data set which includes the instruction identifier and the instruction location address, the absolute address obtaining step includes:

judging step for (a) reading the call instruction from the second program stored in the second storage area, (b) extracting the instruction identifier from the call instruction, and (c) judging whether the extracted instruction identifier exists in the reference table; and registration step for, when the judging means determines that the extracted instruction identifier does not exist in the reference table, (a) extracting, from the first program stored in the first storage area, the data set that includes the same instruction identifier as the extracted instruction identifier, and extracting the instruction address from the extracted data set, (b) adding the extracted instruction address to the beginning location information to produce the instruction location address, and (c) writing a data set including the extracted instruction identifier and the produced instruction location address into the reference table, wherein the executing step executes the executable instruction called by the call instruction, using the instruction location address produced by the registration means, and in the program linking apparatus, after the executable instruction is executed, the executable instruction called by the call instruction is executed, the absolute address obtaining step further includes:

reading step for, when the judging means determines that the extracted instruction identifier exists in the reference table, reading the instruction location address that is in correspondence with the extracted instruction identifier from the reference table to obtain the instruction location address, wherein the execution step further executes the executable instruction called by the call instruction, using the instruction location address obtained by the reading means.

15. The program lining apparatus of claim 11, wherein the data set included in the first program stored in the first storage area further includes offset information, the offset information showing that the instruction address included in the data set is an offset address, the absolute address obtaining means includes:

location information storing means for storing the beginning location information that shows the absolute address of the beginning location of the first program in the storage space; and a cache table having a storage area designated for storage of a data set which includes an address flag, the instruction identifier and the instruction address, the address flag showing whether the instruction address is the offset address or the absolute address, the instruction identifier identifying the executable instruction, the instruction address showing the location of the executable instruction in the first program, wherein when the address flag indicates the offset address, the instruction address is the offset address, and when the address flag indicates the absolute address, the instruction address is the absolute address, the absolute address obtaining step includes:

instruction identifier extracting step for reading the call instruction from the second program stored in the second storage area, and extracting the instruction identifier from the call instruction;

address extracting step for judging whether the extracted instruction identifier exists in the cache table or not, and when it determines that the extracted instruction identifier does not exist in the cache table, extracting the offset information and the instruction address from the first program stored in the first storage area, the offset information being included in the data set along with the same instruction identifier as the extracted instruction identifier;

absolute address creating step for, when the offset information extracted by the address extracting means indicates the offset address, adding the extracted instruction address to the beginning location information to obtain the instruction location address; and cache table writing step for, when the offset information extracted by the address extracting means indicates the offset address, writing the data set including the address flag which indicates the absolute address, the extracted instruction identifier and the instruction location address, into the cache table, as the data set of the address flag, the instruction identifier and the instruction address, wherein the executing step executes the executable instruction called by the call instruction, using the instruction location address obtained by the absolute address creating means, wherein in the program linking apparatus, after the executable instruction is executed, the executable instruction called by the call instruction is further executed, the address extracting step further extracts, from the cache table, the address flag and the instruction address associated with the extracted instruction identifier when it determines that the extracted instruction identifier exists in the cache table, the absolute address creating step, when the address flag extracted by the address extracting means indicates the absolute address, further obtains the instruction location address, and the executing step further executes the executable instruction called by the call instruction, using the instruction location address obtained by the absolute address creating means.

16. The program linking method of claim 11, wherein the absolute address obtaining means includes:

location information storing means for storing the beginning location information that shows the absolute address of the beginning location of the first program in the storage space; and a cache table having a storage area designated for storage of a data set including a writing flag, the instruction identifier and the instruction address, the writing flag showing whether the instruction address is the offset address or the absolute address, the instruction identifier identifying the executable instruction, the instruction address showing the location of the executable instruction in the first program, wherein when the writing flag indicates the offset address, the instruction address is the offset address, and when the writing flag indicates the absolute address, the instruction address is the absolute address, the absolute address obtaining step includes:

instruction identifier extracting step for reading the call instruction from the second program stored in the second storage area, and extracting the instruction identifier from the call instruction;

address extracting step for judging whether the extracted instruction identifier exists in the cache table, and when it determines that the extracted instruction identifier does not exist in the cache table, extracting, from the first program stored in the first storage area, the instruction address that is included in the data set along with the same instruction identifier as the extracted instruction identifier, and when it determines that the extracted instruction identifier exists in the cache table, extracting the writing flag and the instruction address that are associated with the extracted instruction identifier from the cache table;

absolute address creating step for, when the address extracting means determines that the extracted instruction identifier does not exist in the cache table or when the writing flag extracted by the address extracting means indicates the offset address, adding the extracted instruction address to the beginning location information to obtain the instruction location address; and cache table writing step for, when the address extracting means determines that the extracted instruction identifier does not exist in the cache table or when the writing flag extracted by the address extracting means indicates the offset address, writing the data set which includes the address flag indicating the absolute address, the extracted instruction identifier and the instruction location address, into the cache table, as the data set of the writing flag, the instruction identifier and the instruction address, wherein the executing step executes the executable instruction called by the call instruction, using the instruction location address obtained by the absolute address creating means, in the program linking apparatus, after the executable instruction is executed, the executable instruction called by the call instruction is further executed, the absolute address creating step, when the writing flag extracted by the address extracting means indicates the absolute address, obtains the instruction location address by employing the instruction address as the instruction location address, and the executing step further executes the executable instruction called by the call instruction, using the instruction location address obtained by the absolute address creating means.

17. The program linking method of claim 11, wherein the second program further includes a variable instruction, the variable instruction including a variable identifier that identifies a variable and giving an instruction to perform an operation related to the variable, the first program further has a variable area and stores a data set including the variable identifier that identifies the variable and a variable address, the data set being stored in correspondence with the variable area, the variable area being an area designated for storage of the variable, the variable address showing a location of the variable area in the first program, the absolute address obtaining step further (a) obtains the variable identifier included in the variable instruction, (b) obtains the data set which includes the same variable identifier as the obtained variable identifier, and (c) obtains the instruction location address in the storage space of the variable area, in which the variable identified by the variable identifier included in the variable instruction is stored, using the beginning location information and the variable address included in the data set, and the executing step further executes the variable instruction, using the variable area indicated by the obtained instruction location address, to perform the operation related to the variable.

18. A program linking method used in a program linking apparatus for linking and executing one program with another program using a microprocessor, the program linking apparatus comprising:

a first read only semiconductor memory having a first storage area which stores a first program, the first storage area being located in a storage space within the program linking apparatus, the storage space being represented by an absolute address system, wherein the first program includes an executable instruction and a data set associated with the executable instruction, the data set consisting of an instruction identifier which identifies the executable instruction and an instruction address which shows a location of the executable instruction in the first program, the instruction address being an offset address showing a location of the executable instruction relative to a beginning location of the first program;

a second read only semiconductor memory having a second storage area which stores a second program, the second storage area being located in the storage space so as not to overlap the first storage area, wherein the second program includes a call instruction which calls the executable instruction, the call instruction including an instruction identifier that identifies the executable instruction; and absolute address obtaining means for storing beginning location information that shows an absolute address of the beginning location of the first program in the storage space, the program linking method, comprising:

an absolute address obtaining step for having the microprocessor (a) obtain the instruction identifier which is included in the call instruction in the second program, (b) obtain the data set in the first program that includes the same instruction identifier as the obtained instruction identifier, and (c) obtain an instruction location address that shows a location of the executable instruction in the storage space, using the instruction address included in the obtained data set and the beginning location information; and executing step for having the microprocessor execute the executable instruction stored in the location shown by the obtained instruction location address, to execute the executable instruction called by the call instruction, wherein the absolute address obtaining means includes:

location information storing means for storing the beginning location information that shows the absolute address of the beginning location of the first program in the storage space; and a reference table having a storage area designated for storage of a data set which includes the instruction identifier and the instruction location address, the absolute address obtaining step includes:

judging step for (a) reading the call instruction from the second program stored in the second storage area, (b) extracting the instruction identifier from the call instruction, and (c) judging whether the extracted instruction identifier exists in the reference table; and registration step for, when the judging means determines that the extracted instruction identifier does not exist in the reference table, (a) extracting, from the first program stored in the first storage area, the data set that includes the same instruction identifier as the extracted instruction identifier, and extracting the instruction address from the extracted data set, (b) adding the extracted instruction address to the beginning location information to produce the instruction location address, and (c) writing a data set including the extracted instruction identifier and the produced instruction location address into the reference table, wherein the executing means executes the executable instruction called by the call instruction, using the instruction location address produced by the registration means, and in the program linking apparatus, after the executable instruction is executed, the executable instruction called by the call instruction is executed, the absolute address obtaining step further includes:

reading step for, when the judging means determines that the extracted instruction identifier exists in the reference table, reading the instruction location address that is in correspondence with the extracted instruction identifier from the reference table to obtain the instruction location address, wherein the execution step further executes the executable instruction called by the call instruction, using the instruction location address obtained by the reading means.

19. A program linking method used in a program linking apparatus for linking and executing one program with another program using a microprocessor, the program linking apparatus comprising:

a first read only semiconductor memory having a first storage area which stores a first program, the first storage area being located in a storage space within the program linking apparatus, the storage space being represented by an absolute address system, wherein the first program includes an executable instruction and a data set associated with the executable instruction, the data set consisting of an instruction identifier which identifies the executable instruction and an instruction address which shows a location of the executable instruction in the first program, the instruction address being an offset address showing a location of the executable instruction relative to a beginning location of the first program;

a second read only semiconductor memory having a second storage area which stores a second program, the second storage area being located in the storage space so as not to overlap the first storage area, wherein the second program includes a call instruction which calls the executable instruction, the call instruction including an instruction identifier that identifies the executable instruction; and absolute address obtaining means for storing beginning location information that shows an absolute address of the beginning location of the first program in the storage space, the program linking method, comprising:

an absolute address obtaining step for having the microprocessor (a) obtain the instruction identifier which is included in the call instruction in the second program, (b) obtain the data set in the first program that includes the same instruction identifier as the obtained instruction identifier, and (c) obtain an instruction location address that shows a location of the executable instruction in the storage space, using the instruction address included in the obtained data set and the beginning location information; and executing step for having the microprocessor execute the executable instruction stored in the location shown by the obtained instruction location address, to execute the executable instruction called by the call instruction, wherein the data set included in the first program stored in the first storage area further includes offset information, the offset information showing that the instruction address included in the data set is an offset address, the absolute address obtaining means includes:

location information storing means for storing the beginning location information that shows the absolute address of the beginning location of the first program in the storage space; and a cache table having a storage area designated for storage of a data set which includes an address flag, the instruction identifier and the instruction address, the address flag showing whether the instruction address is the offset address or the absolute address, the instruction identifier identifying the executable instruction, the instruction address showing the location of the executable instruction in the first program, wherein when the address flag indicates the offset address, the instruction address is the offset address, and when the address flag indicates the absolute address, the instruction address is the absolute address, the absolute address obtaining step includes:

instruction identifier extracting step for reading the call instruction from the second program stored in the second storage area, and extracting the instruction identifier from the call instruction;

address extracting step for judging whether the extracted instruction identifier exists in the cache table or not, and when it determines that the extracted instruction identifier does not exist in the cache table, extracting the offset information and the instruction address from the first program stored in the first storage area, the offset information being included in the data set along with the same instruction identifier as the extracted instruction identifier;

absolute address creating step for, when the offset information extracted by the address extracting means indicates the offset address, adding the extracted instruction address to the beginning location information to obtain the instruction location address; and cache table writing step for, when the offset information extracted by the address extracting means indicates the offset address, writing the data set including the address flag which indicates the absolute address, the extracted instruction identifier and the instruction location address, into the cache table, as the data set of the address flag, the instruction identifier and the instruction address, wherein the executing step executes the executable instruction called by the call instruction, using the instruction location address obtained by the absolute address creating means, wherein in the program linking apparatus, after the executable instruction is executed, the executable instruction called by the call instruction is further executed, the address extracting step further extracts, from the cache table, the address flag and the instruction address associated with the extracted instruction identifier when it determines that the extracted instruction identifier exists in the cache table, the absolute address creating step, when the address flag extracted by the address extracting means indicates the absolute address, further obtains the instruction location address, and the executing step further executes the executable instruction called by the call instruction, using the instruction location address obtained by the absolute address creating means.

20. A program linking method used in a program linking apparatus for linking and executing one program with another program using a microprocessor, the program linking apparatus comprising:

a first read only semiconductor memory having a first storage area which stores a first program, the first storage area being located in a storage space within the program linking apparatus, the storage space being represented by an absolute address system, wherein the first program includes an executable instruction and a data set associated with the executable instruction, the data set consisting of an instruction identifier which identifies the executable instruction and an instruction address which shows a location of the executable instruction in the first program, the instruction address being an offset address showing a location of the executable instruction relative to a beginning location of the first program;

a second read only semiconductor memory having a second storage area which stores a second program, the second storage area being located in the storage space so as not to overlap the first storage area, wherein the second program includes a call instruction which calls the executable instruction, the call instruction including an instruction identifier that identifies the executable instruction; and absolute address obtaining means for storing beginning location information that shows an absolute address of the beginning location of the first program in the storage space, the program linking method, comprising:

an absolute address obtaining step for having the microprocessor (a) obtain the instruction identifier which is included in the call instruction in the second program, (b) obtain the data set in the first program that includes the same instruction identifier as the obtained instruction identifier, and (c) obtain an instruction location address that shows a location of the executable instruction in the storage space, using the instruction address included in the obtained data set and the beginning location information; and executing step for having the microprocessor execute the executable instruction stored in the location shown by the obtained instruction location address, to execute the executable instruction called by the call instruction, wherein the absolute address obtaining means includes:

location information storing means for storing the beginning location information that shows the absolute address of the beginning location of the first program in the storage space; and a cache table having a storage area designated for storage of a data set including a writing flag, the instruction identifier and the instruction address, the writing flag showing whether the instruction address is the offset address or the absolute address, the instruction identifier identifying the executable instruction, the instruction address showing the location of the executable instruction in the first program, wherein when the writing flag indicates the offset address, the instruction address is the offset address, and when the writing flag indicates the absolute address, the instruction address is the absolute address, the absolute address obtaining step includes:

instruction identifier extracting step for reading the call instruction from the second program stored in the second storage area, and extracting the instruction identifier from the call instruction;

address extracting step for judging whether the extracted instruction identifier exists in the cache table, and when it determines that the extracted instruction identifier does not exist in the cache table, extracting, from the first program stored in the first storage area, the instruction address that is included in the data set along with the same instruction identifier as the extracted instruction identifier, and when it determines that the extracted instruction identifier exists in the cache table, extracting the writing flag and the instruction address that are associated with the extracted instruction identifier from the cache table;

absolute address creating step for, when the address extracting means determines that the extracted instruction identifier does not exist in the cache table or when the writing flag extracted by the address extracting means indicates the offset address, adding the extracted instruction address to the beginning location information to obtain the instruction location address; and cache table writing step for, when the address extracting means determines that the extracted instruction identifier does not exist in the cache table or when the writing flag extracted by the address extracting means indicates the offset address, writing the data set which includes the address flag indicating the absolute address, the extracted instruction identifier and the instruction location address, into the cache table, as the data set of the writing flag, the instruction identifier and the instruction address, wherein the executing step executes the executable instruction called by the call instruction, using the instruction location address obtained by the absolute address creating means, in the program linking apparatus, after the executable instruction is executed, the executable instruction called by the call instruction is further executed, the absolute address creating step, when the writing flag extracted by the address extracting means indicates the absolute address, obtains the instruction location address by employing the instruction address as the instruction location address, and the executing step further executes the executable instruction called by the call instruction, using the instruction location address obtained by the absolute address creating means.

21. A computer program that is recorded on a computer-readable recording medium for use in a program linking apparatus, the program linking apparatus linking and executing one program with another program using a microprocessor, the program linking apparatus comprising:

a first read only semiconductor memory having a first storage area which stores a first program, the first storage area being located in a storage space within the program linking apparatus, the storage space being represented by an absolute address system, wherein the first program includes an executable instruction and a data set associated with the executable instruction, the data set consisting of an instruction identifier which identifies the executable instruction and an instruction address which shows a location of the executable instruction in the first program, the instruction address being an offset address showing a location of the executable instruction relative to a beginning location of the first program;

a second read only semiconductor memory having a second storage area which stores a second program, the second storage area being located in the storage space so as not to overlap the first storage area, wherein the second program includes a call instruction which calls the executable instruction, the call instruction including an instruction identifier that identifies the executable instruction; and absolute address obtaining means for storing beginning location information that shows an absolute address of the beginning location of the first program in the storage space, the computer program comprising:

absolute address obtaining step for having the microprocessor (a) obtain the instruction identifier which is included in the call instruction in the second program, (b) obtain the data set in the first program that includes the same instruction identifier as the obtained instruction identifier, and (c) obtain an instruction location address that shows a location of the executable instruction in the storage space, using the instruction address included in the obtained data set and the beginning location information; and executing step for having the microprocessor execute the executable instruction stored in the location shown by the obtained instruction location address, to execute the executable instruction called by the call instruction.

* * * * *

UNITED STATES PATENT AND TRADEMARK OFFICE
CERTIFICATE OF CORRECTION

PATENT NO. : 6,457,174 B1
DATED : September 24, 2002
INVENTOR(S) : Toyoharu Kuroda, Kiyoshi Owada and Yoshihiko Motohashi It is certified that error appears in the above-identified patent and that said Letters Patent is hereby corrected as shown below:

Column 53,
Line 52, delete "liking" and insert -- linking --;
Line 64, delete "lining" and insert -- linking --;

Column 55,
Line 9, delete "lining" and insert -- linking --.

Signed and Sealed this

Sixth Day of May, 2003

JAMES E. ROGAN
*Director of the United States Patent and Trademark Office*